(12) United States Patent
He et al.

(10) Patent No.: US 8,828,507 B2
(45) Date of Patent: *Sep. 9, 2014

(54) ALIGNMENT FACILITIES FOR OPTICAL DYES

(75) Inventors: Meng He, Murrysville, PA (US); Anil Kumar, Murrysville, PA (US); Peter C. Foller, Richmond, CA (US); Chenguang Li, Monroeville, PA (US); Ruisong Xu, Monroeville, PA (US); Jiping Shao, Monroeville, PA (US)

(73) Assignee: Transitions Optical, Inc., Pinellas Park, FL (US)

( * ) Notice: Subject to any disclaimer, the term of this patent is extended or adjusted under 35 U.S.C. 154(b) by 676 days.

This patent is subject to a terminal disclaimer.

(21) Appl. No.: 13/022,981

(22) Filed: Feb. 8, 2011

(65) Prior Publication Data

US 2011/0128457 A1    Jun. 2, 2011

Related U.S. Application Data

(63) Continuation of application No. 12/329,197, filed on Dec. 5, 2008, now Pat. No. 8,003,005, which is a continuation-in-part of application No. 10/846,603, filed on May 17, 2004, now Pat. No. 7,632,540.

(60) Provisional application No. 60/484,100, filed on Jul. 1, 2003.

(51) Int. Cl.
| | | |
|---|---|---|
| C09K 19/38 | (2006.01) | |
| C09K 19/54 | (2006.01) | |
| C09K 19/60 | (2006.01) | |
| C09K 19/52 | (2006.01) | |
| G02F 1/133 | (2006.01) | |
| G02B 5/30 | (2006.01) | |
| C09K 19/04 | (2006.01) | |
| C09K 19/20 | (2006.01) | |
| G02B 5/23 | (2006.01) | |

(52) U.S. Cl.
CPC .......... *C09K 19/0403* (2013.01); *G02B 5/3016* (2013.01); *C09K 19/38* (2013.01); *C09K 19/52* (2013.01); *C09K 19/60* (2013.01); *C09K 19/2007* (2013.01); *C09K 2013/0448* (2013.01); *G02B 5/23* (2013.01); *C09K 2013/546* (2013.01); *C09K 19/54* (2013.01); *C09K 19/544* (2013.01)
USPC ............... 428/1.1; 252/299.01; 252/299.2; 252/299.5; 252/299.67; 349/88; 349/93; 349/183; 428/1.3

(58) Field of Classification Search
USPC ......... 428/1.1, 1.3; 252/299.01, 299.2, 299.5, 252/299.67; 349/88, 93, 183
See application file for complete search history.

(56) References Cited

U.S. PATENT DOCUMENTS

| | | | | |
|---|---|---|---|---|
| 5,942,157 A | * | 8/1999 | Sutherland et al. | ........... 252/582 |
| 6,706,451 B1 | * | 3/2004 | Sutherland et al. | ............... 430/2 |
| 8,003,005 B2 | * | 8/2011 | He et al. | ............ 252/299.01 |

\* cited by examiner

*Primary Examiner* — Shean C Wu
(74) *Attorney, Agent, or Firm* — The Webb Law Firm

(57) ABSTRACT

Provided are phase-separating polymer systems including a cured polymeric liquid crystal matrix phase and a guest phase including at least one photoactive material where the guest phase separates from the matrix phase during the curing process. Optical elements, including ophthalmic elements and other articles of manufacture including the phase-separating polymer systems are also disclosed. Methods of forming a liquid crystal phase-separating photoactive polymer system are also described.

23 Claims, 1 Drawing Sheet

ALIGNMENT FACILITIES FOR OPTICAL DYES

CROSS-REFERENCE TO RELATED APPLICATIONS

This application is a Continuation of U.S. patent application Ser. No. 12/329,197, filed Dec. 5, 2008 which is a Continuation-In-Part of U.S. application Ser. No. 10/846,603, filed May 17, 2004 which claims the benefit of U.S. Provisional Application Ser. No. 60/484,100, filed Jul. 1, 2003, which disclosures are hereby specifically incorporated herein by reference.

STATEMENT REGARDING FEDERALLY SPONSORED RESEARCH OR DEVELOPMENT

Not applicable.

REFERENCE TO A SEQUENCE LISTING

Not applicable.

BACKGROUND

Various non-limiting embodiments disclosed herein relate to methods of making alignment facilities for optical dyes connected to at least a portion of an optical substrate. Other non-limiting embodiments related to optical elements, such as but not limited to ophthalmic elements, comprising an alignment facility for an optical dye. Still other non-limiting embodiments relate to alignment facilities for optical dyes comprising coatings or sheets of an at least partially ordered liquid crystal material.

Liquid crystal molecules, because of their structure, are capable of being ordered or aligned so as to take on a general direction. As used herein with reference to the order or alignment of a material or structure, the term "general direction" refers to the predominant arrangement or orientation of the material or structure. More specifically, because liquid crystal molecules have rod- or disc-like structures, a rigid long axis, and strong dipoles, liquid crystal molecules can be ordered or aligned by interaction with an external force or another structure such that the long axis of each of the molecules takes on an orientation that is generally parallel to a common axis. For example, if an electric or magnetic field is applied to a cell containing a disordered, fluid-mixture of liquid crystal molecules, the long axis of essentially all of the liquid crystal molecules can be ordered in a direction relative to the applied field. Once the field is removed, however, the molecules will again randomly distribute themselves in fluid-mixture.

It is also possible to align liquid crystal molecules with an oriented surface. That is, liquid crystal molecules can be applied to a surface that has been oriented, for example by rubbing, grooving, or photo-alignment methods, and subsequently aligned such that the long axis of each of the liquid crystal molecules takes on an orientation that is generally parallel to the general direction of orientation of the surface.

Aligning a liquid crystal material with an oriented surface as discussed above generally involves holding the liquid crystal material on the oriented surface at a temperature above the melting point of the liquid crystal material for some period of time to allow the liquid crystal molecules to align themselves. Although the time required for alignment depends on several factors, generally speaking, the thicker the layer of the liquid crystal material applied to the oriented surface, the longer the time required to fully align the liquid crystal material. Further, for some thick layers of liquid crystal materials, full alignment may not be achieved.

Photochromic compounds, dichroic compounds, and photochromic-dichroic compounds may be incorporated into a coating, a substrate or an organic material, for example a polymer coating. When photochromic compounds, dichroic compounds, and photochromic-dichroic compounds undergo a change from one state to another, the molecules of the photochromic compound, dichroic compound, or photochromic-dichroic compound may undergo a conformational change from a first conformational state to a second conformational state. In addition to a change in color and/or polarizing capability of the compounds, this conformational change may result in a change in the amount of space that the compound occupies. However, for certain photochromic compounds, dichroic compounds, or compounds photochromic-dichroic materials to effectively align and/or transition from one state to another, for example to transition from a clear state to a colored state, to transition from a colored state to a clear state, to transition from a non-polarized state to a polarized state, and/or to transition from a polarized state to a non-polarized state, the photochromic compound, dichroic compound, or photochromic-dichroic compound must be in an chemical environment that is sufficiently flexible to allow the compound to transition from a first conformational state to the second conformational state at a rate that is sufficient to provide the desired response over an acceptable time frame. Therefore, new polymeric materials are necessary to further develop photochromic, dichroic, and photochromic-dichroic materials and articles.

BRIEF SUMMARY OF THE DISCLOSURE

Various non-limiting embodiments disclosed herein relate to methods of making alignment facilities for an optical dye and alignment facilities made thereby. For example, one non-limiting embodiment provides a method of making an alignment facility for an optical dye on at least a portion of an ophthalmic substrate, the method comprising forming a first at least partial coating on at least a portion of the ophthalmic substrate, the first at least partial coating comprising an at least partially ordered liquid crystal material having at least a first general direction; and forming at least one additional at least partial coating on at least a portion of the first at least partial coating, the at least one additional at least partial coating comprising an at least partially ordered liquid crystal material having at least a second general direction that is generally parallel to at least the first general direction.

Other non-limiting embodiments disclosed herein provide for polymer systems comprising at least one photoactive material, for example, photochromic compounds and photochromic-dichroic compounds. According to certain non-limiting embodiments, these polymer systems may be phase-separating polymer systems. In one embodiment, the present disclosure provides for phase-separating polymer systems comprising an at least partially cured matrix phase comprising a polymeric residue of at least a first liquid crystal monomer, and a guest phase comprising at least one photoactive material and at least one liquid crystal material. According to these non-limiting embodiments, at least a portion of the guest phase separates from at least a portion of the matrix phase during the at least partial curing of the polymeric residue of the at least first liquid crystal monomer. The at least one photoactive material may be selected from photochromic compounds and photochromic-dichroic compounds. Examples of the first liquid crystal monomers and liquid crystal materials are described in detail herein.

Another non-limiting embodiment of the present disclosure provides for optical elements. According to these non-limiting embodiments, the optical elements comprise a substrate and an at least partial layer on at least a portion of a surface of the substrate, where the layer comprises a liquid crystal phase-separated system. The liquid crystal phase-separated system comprises an at least partially cured matrix phase comprising a polymeric residue of at least a first liquid crystal monomer, and a guest phase comprising at least one photoactive material and at least one liquid crystal material. According to these non-limiting embodiments, the photoactive material is selected from photochromic compounds, dichroic compounds, and photochromic-dichroic compounds. At least one of the first liquid crystal monomer of the matrix phase and the at least one liquid crystal material of the guest phase comprises a mesogen containing compound having a structure represented by Formula I:

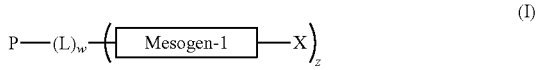
(I)

where P, L, X, Mesogen-1, "w", and "z" are as described herein. According to these non-limiting embodiments, at least a portion of the guest phase separates from at least a portion of the matrix phase during the at least partial curing of the polymeric residue of at least the first liquid crystal monomer.

Further non-limiting embodiments of the present disclosure provide articles of manufacture. According to these non-limiting embodiments, the articles of manufacture comprise an at least partially cured matrix phase comprising a polymeric residue of at least a first liquid crystal monomer, and a guest phase comprising at least one photoactive material and at least one second liquid crystal monomer or residue thereof. According to these non-limiting embodiments, the photoactive material is selected from photochromic compounds and photochromic-dichroic compounds. At least one of the first liquid crystal monomer of the matrix phase and the at least one second liquid crystal monomer of the guest phase comprises at least one mesogen containing compound having a structure represented by Formula I, where P, L, X, Mesogen-1, "w", and "z" are as described herein. According to these non-limiting embodiments, at least a portion of the guest phase separates from at least a portion of the matrix phase during the at least partial curing of the polymeric residue of at least the first liquid crystal monomer.

Still other non-limiting embodiments of the present disclosure provide methods for forming liquid crystal phase-separating photochromic, dichroic, or photochromic-dichroic polymer systems. According to specific non-limiting embodiments, the method comprising providing a phase-separating polymer forming composition comprising a matrix phase forming material comprising at least a first liquid crystal monomer, a guest phase forming material comprising at least one liquid crystal material, and at least one photoactive material selected from photochromic compounds or photochromic-dichroic compounds; at least partially ordering at least a portion of the at least first liquid crystal monomer of the matrix phase forming material and at least a portion of the at least one liquid crystal material of the guest phase forming material such that the at least partially ordered portion of the at least first liquid crystal monomer of the matrix phase forming material has a first general direction and the at least partially ordered portion of the at least one liquid crystal material of the guest phase forming material has a second general direction that is generally parallel to the first general direction; causing at least a portion of the guest phase forming material to separate from at least a portion of the matrix phase forming material by polymerization induced phase-separation or solvent induced phase-separation, wherein the at least one photoactive material selectively concentrates in the guest phase forming material; and at least partially curing at least a portion of the matrix phase forming material to produce an at least partially cured matrix phase.

BRIEF DESCRIPTION OF THE SEVERAL VIEWS OF THE DRAWING(S)

Various non-limiting embodiments disclosed herein will be better understood when read in conjunction with the drawings, in which.

DETAILED DESCRIPTION

Figure 1:
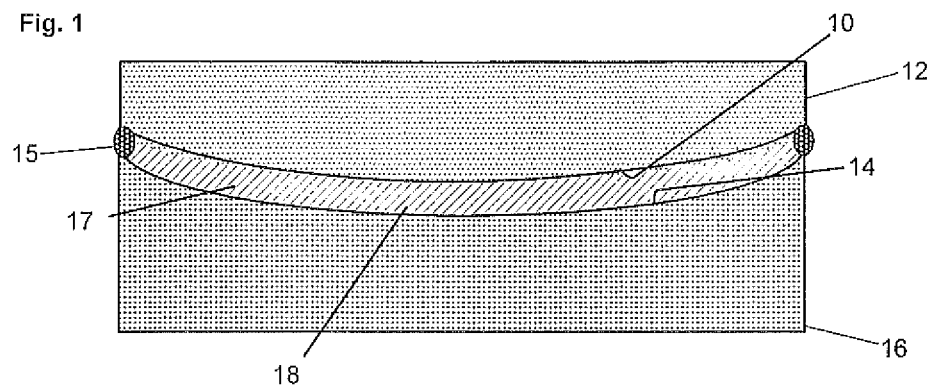
FIG. 1 is a schematic, cross-sectional view of an overmolding assembly according to one non-limiting embodiment disclosed herein.

As used in this specification and the appended claims, the articles "a," "an," and "the" include plural referents unless expressly and unequivocally limited to one referent.

Additionally, for the purposes of this specification, unless otherwise indicated, all numbers expressing quantities of ingredients, reaction conditions, and other properties or parameters used in the specification are to be understood as being modified in all instances by the term "about." Accordingly, unless otherwise indicated, it should be understood that the numerical parameters set forth in the following specification and attached claims are approximations. At the very least, and not as an attempt to limit the application of the doctrine of equivalents to the scope of the claims, numerical parameters should be read in light of the number of reported significant digits and the application of ordinary rounding techniques.

Further, while the numerical ranges and parameters setting forth the broad scope of the invention are approximations as discussed above, the numerical values set forth in the Examples section are reported as precisely as possible. It should be understood, however, that such numerical values inherently contain certain errors resulting from the measurement equipment and/or measurement technique.

In the present disclosure and the appended claims, it should be appreciated that where listings of possible structural features, such as, for example substituent groups, are provided herein using headings or subheadings, such as, for example: (a), (b) . . . ; (1), (2) . . . ; (i), (ii) . . . ; etc., these headings or subheadings are provided only for convenience of reading and are not intended to limit or indicate any preference for a particular structural feature or substituent.

The present disclosure describes several different features and aspects of the invention with reference to various exemplary embodiments. It is understood, however, that the invention embraces numerous alternative embodiments, which may be accomplished by combining any of the different features, aspects, and embodiments described herein in any combination that one of ordinary skill in the art would find useful.

Various non-limiting embodiments disclosed herein are directed toward methods of making alignment facilities for optical dyes using one or more liquid crystal materials. As used herein the term "optical dye" means a dye that can affect one or more optical properties of an object to which it is connected. For example, although not limiting herein, an optical dye can affect one or more of the color, polarization, UV-absorption, and emission (e.g., fluorescence and phosphorescence) properties of the coating or substrate to which it is connected. Optical dyes that are useful in conjunction with the various non-limiting embodiments disclosed herein include a wide variety of organic dyes, inorganic dyes, and mixtures thereof. Non-limiting examples of optical dyes include fixed-tint dyes, as well as dichroic and/or photochromic dyes.

As used herein the term "alignment facility" means a structure that can facilitate the positioning of one or more other structures or materials that are exposed, directly or indirectly, to at least a portion of the facility. Thus, the alignment facilities according to various non-limiting embodiments disclosed herein can be used to facilitate the positioning of an optical dye. More specifically, the optical dye can be aligned by direct and/or indirect interaction with the alignment facility. As used herein the term "align" means bring into suitable arrangement or position by interaction with another material, compound or structure. For example, although not limiting herein, the alignment facilities according to various non-limiting embodiments disclosed herein can directly facilitate the positioning of an optical dye that is in direct contact with the alignment facility. Alternatively, the alignment facility can indirectly facilitate the positioning of an optical dye by facilitating the positioning of another structure or material, for example and without limitation, a coating of a liquid crystal material with which the optical dye is in contact.

While not limiting herein, the alignment facilities according to various non-limiting embodiments disclosed herein can directly and/or indirectly facilitate the positioning of an optical dye that is optically anisotropic. As used herein the term "anisotropic" means having at least one property that differs in value when measured in at least one different direction. Thus, optically anisotropic dyes have at least one optical property that differs in value when measured in at least one different direction. One non-limiting example of an optically anisotropic dye is a dichroic dye. As used herein the term "dichroic" means capable absorbing one of two orthogonal plane polarized components of at least transmitted radiation more strongly than the other. As used herein, the terms "linearly polarize" or "linearly polarization" mean to confine the vibrations of the electromagnetic vector of light waves to one direction. Accordingly, dichroic dyes are capable of absorbing one of two orthogonal plane polarized components of transmitted radiation more strongly than the other, thereby resulting in linear polarization of the transmitted radiation. However, while dichroic dyes are capable of preferentially absorbing one of two orthogonal plane polarized components of transmitted radiation, if the molecules of the dichroic dye are not aligned, no net linear polarization of transmitted radiation will be achieved. That is, due to the random positioning of the molecules of the dichroic dye, selective absorption by the individual molecules can cancel each other such that no net or overall linear polarizing effect is achieved. Thus, it is generally necessary to align the molecules of the dichroic dye in order to achieve a net linear polarization. The alignment facilities according to various non-limiting embodiments disclosed herein can be used to facilitate the positioning of an optically anisotropic dye, such as a dichroic dye, thereby achieving a desired optical property or effect.

Further, various non-limiting embodiments disclosed herein provide methods of making an alignment facility for an optical dye on at least a portion of an optical substrate, such as, but not limited to, an ophthalmic substrate. As used herein the term "optical" means pertaining to or associated with light and/or vision. As used herein the term "ophthalmic" means pertaining to or associated with the eye and vision. Non-limiting examples of optical substrates that can be used in conjunction with various non-limiting embodiments disclosed herein include ophthalmic substrates, and substrates for use in optical elements and devices. Examples of optical elements and devices include, but are not limited to, ophthalmic optical displays, windows, and mirrors. As used herein the term "display" means the visible or machine-readable representation of information in words, numbers, symbols, designs or drawings. As used herein the term "window" means an aperture adapted to permit the transmission of radiation therethrough. Non-limiting examples of windows include automotive and aircraft transparencies, filters, shutters, and optical switches. As used herein the term "mirror" means a surface that specularly reflects a large fraction of incident light.

Non-limiting examples of ophthalmic elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors. Further non-limiting examples of ophthalmic substrates include lenses, partially formed lenses, and lens blanks.

Non-limiting examples of organic materials suitable for use in forming ophthalmic substrates according to various non-limiting embodiments disclosed herein include, but are not limited to, the art-recognized polymers that are useful as ophthalmic substrates, e.g., organic optical resins that are used to prepare optically clear castings for optical applications, such as ophthalmic lenses. Specific, non-limiting examples of organic materials that may be used to form the ophthalmic substrates disclosed herein include polymeric materials, for examples, homopolymers and copolymers, prepared from the monomers and mixtures of monomers disclosed in U.S. Pat. Nos. 5,962,617 and in 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Non-limiting examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea urethane) polymers, which are prepared, for example, by the reaction of a polyurethane prepolymer and a diamine curing agent, a composition of one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating polymer network products.

Still further, the substrates according to various non-limiting embodiments disclosed herein can be untinted, tinted, linearly polarizing, photochromic, or tinted-photochromic substrates. As used herein with reference to substrates the term "untinted" means substrates that are essentially free of coloring agent additions (such as, but not limited to, conventional dyes) and have an absorption spectrum for visible radiation that does not vary significantly in response to actinic radiation. Further, as used herein with reference to substrates, the term "tinted" means substrates that have a coloring agent addition (such as, but not limited to, conventional dyes) and an absorption spectrum for visible radiation that does not vary significantly in response to actinic radiation. As used herein the term "linearly polarizing" with reference to substrates refers to substrates that are adapted to linearly polarize radiation.

As used herein with the term "photochromic" with reference to compounds and substrates refers to compounds and substrates having an absorption spectrum for visible radiation that varies in response to at least actinic radiation. As used herein the term "actinic radiation" means electromagnetic radiation that is capable of causing a response. Actinic radiation includes, for example and without limitation, visible and ultraviolet radiation. Further, as used herein with reference to substrates, the term "tinted-photochromic" means substrates containing a coloring agent addition as well as a photochromic material, and having an absorption spectrum for visible radiation that varies in response to at least actinic radiation. Thus for example, in one non-limiting embodiment, the tinted-photochromic substrate can have a first color characteristic of the coloring agent and a second color characteristic of the combination of the coloring agent the photochromic material when exposed to actinic radiation. Photochromic-dichroic dyes and compounds may also be used in specific embodiments herein. As used herein, the term "photochromic-dichroic" includes materials that possess both photochromic properties (i.e., having an absorption spectrum for visible radiation that varies in response to at least actinic radiation) and dichroic properties (i.e., capable of absorbing one of two orthogonal plane polarized components of at least transmitted radiation more strongly than the other).

Various non-limiting embodiments of methods of making alignment facilities for optical dyes will now be described. One non-limiting embodiment provides a method of making an alignment facility for an optical dye on at least a portion of an ophthalmic substrate, the method comprising forming a first at least partial coating comprising an at least partially ordered liquid crystal material having at least a first general direction on at least a portion of the ophthalmic substrate, and thereafter forming at least one additional at least partial coating comprising an at least partially ordered liquid crystal material on at least a portion of the first at least partial coating. Further, according to this non-limiting embodiment, the at least partially ordered portion of the liquid crystal material of the at least one additional at least partial coating can have at least a second general direction that is generally parallel to the first general direction of the first at least partial coating. As previously discussed, as used herein with reference to order or alignment of a material or structure, the term "general direction" refers to the predominant arrangement or orientation of the material, compound or structure. Further, it will be appreciated by those skilled in the art that a material or a structure can have a general direction even though there is some variation within the arrangement of the material or structure, provided that the material or structure has at least one predominate arrangement. Further, as used herein with reference to the general direction of the liquid crystal materials, the terms "first" and "second" are not intended as ordinal numbers or to indicate a chorological order, but instead are used for clarity in referring to various general directions herein.

As discussed above, according to various non-limiting embodiments disclosed herein, the at least partially ordered liquid crystal material of the first at least partial coating can have at least a first general direction. That is, the at least partially ordered liquid crystal material can have one predominate direction throughout the material, or it can have different regions having different general directions. For example, the at least partially ordered liquid crystal material of the first at least partial coating can have a first region having a first general direction, and a second region adjacent the first region having a second general direction that is different from the first general direction. Further, the at least partially ordered liquid crystal material of the first at least partial coating can have a plurality of regions, wherein each region has a general direction that is the same or different from the remaining regions and that together form a pattern or design. As discussed herein below in more detail, the at least one additional at least partial coating can also have a plurality of regions having general directions that are generally parallel to the general directions of the first at least partial coating and that together form essentially the same pattern or design as that of the first at least partial coating.

As used herein the term "coating" means a supported film derived from a flowable composition, which may or may not have a uniform thickness. Further, as used herein the term coating specifically excludes polymeric sheets. As used herein the term "sheet" means a pre-formed film having a generally uniform thickness and capable of self-support. As used herein the term "on" means directly connected to an object (such as, but not limited to, a substrate or a coating) or indirectly connected to an object through one or more other coatings, sheets or other structures.

More specifically, according to various non-limiting embodiments, forming the first at least partial coating can comprise applying a liquid crystal material on at least a portion of the ophthalmic substrate, at least partially ordering at least a portion of the liquid crystal material such that the at least partially ordered portion of the liquid crystal material has at least a first general direction, and at least partially setting at least a portion of the at least partially ordered liquid crystal material.

Suitable methods of applying liquid crystal materials to at least a portion of a substrate according to various non-limiting embodiments disclosed herein include, without limitation: spin coating, spray coating, spray and spin coating, curtain coating, flow coating, dip coating, injection molding, casting, roll coating, wire coating, overlaying, and combinations thereof. For example, although not limiting herein, in one specific non-limiting embodiment, liquid crystal material of the first at least partial coating can be applied to at least a portion of the ophthalmic substrate by spin coating, and thereafter at least partially ordered.

As used herein the term "order" means bring into a suitable arrangement or position, such as by aligning with another structure or material, or by some other force or effect. Thus, as used herein the term "order" encompasses both contact methods of ordering a material, such as aligning with another structure or material, and non-contact methods of ordering a material, such as by exposure to an external force or effect. The term "order" also encompasses combinations of contact and non-contact methods.

Non-limiting examples of methods of at least partially ordering liquid crystal materials according to various non-limiting embodiments disclosed herein include exposing the at least a portion of the liquid crystal material to at least one of: a magnetic field, an electric field, linearly polarized infrared radiation, linearly polarized ultraviolet radiation, linearly polarized visible radiation and a shear force. In addition to the aforementioned methods of at least partially ordering a liquid crystal material, as discussed in more detail below, the liquid crystal materials according to various non-limiting embodiments disclosed herein can be at least partially ordered by aligning the at least a portion of the liquid crystal material with another material or structure, such as an orientation facility.

In one non-limiting embodiment, the liquid crystal material of the first at least partial coating is at least partially ordered by exposing at least a portion of the liquid crystal material to a shear force. For example, although not limiting herein, according to this non-limiting embodiment an optical or ophthalmic substrate with the liquid crystal material on at least a portion of its surface can be placed in a centrifuge and the centrifuge can be rotated such that the substrate traverses the perimeter of the centrifuge and that the liquid crystal material flows relative to the surface of the substrate.

Additionally, according to various non-limiting embodiments disclosed herein, at least partially ordering at least a portion of the liquid crystal material of the first at least partial coating can occur at essentially the same time as applying the liquid crystal material to at least portion of the substrate, or it can occur after applying the liquid crystal material to the substrate. For example, in one non-limiting embodiment wherein applying the liquid crystal material and at least partially ordering at least a portion of the liquid crystal material occur at essentially the same time, the liquid crystal material can be applied to at least a portion of at least one surface of the ophthalmic substrate using an application technique that can introduce a shear force to at least a portion of the liquid crystal material, thereby ordering the long axis of the molecules of the liquid crystal material in a general direction that is generally parallel to the direction of the shear force during application. For example, although not limiting herein, the liquid crystal material of the first at least partial coating can be curtain coated onto at least a portion of at least one surface of the ophthalmic substrate such that a shear force are introduced to the liquid crystal material due to the relative movement of the surface of the ophthalmic substrate with respect to the liquid crystal material being applied. The shear force can cause at least a portion of the molecules of the liquid crystal material to be ordered such that the long axis of the liquid crystal molecules have a general direction that is generally parallel to the direction of the movement of the ophthalmic substrate.

In another non-limiting embodiment wherein applying the liquid crystal material of the first at least partial coating occurs before at least partially ordering at least a portion of the liquid crystal material, the liquid crystal material can be applied, for example, by spin coating, and, thereafter, the liquid crystal material can be at least partially ordered. For example the liquid crystal material can be at least partially ordered by exposing at least a portion of the liquid crystal material to a magnetic field, an electric field, linearly polarized infrared radiation, linearly polarized ultraviolet radiation, linearly polarized visible radiation and/or a shear force. Additionally or alternatively, at least a portion of the liquid crystal material can be at least partially ordered by alignment with at least a portion of an orientation facility, as discussed in more detail herein below.

As discussed above, after at least a portion of the liquid crystal material of the first at least partial coating is at least partially ordered, the at least partially ordered liquid crystal material is at least partially set. As used herein the term "set" means to fix the liquid crystal material in a desired orientation. Non-limiting examples of methods of at least partially setting liquid crystal materials include at least partially drying a solvent from the liquid crystal material, and at least partially curing the liquid crystal material, for example by at least partially cross-linking the liquid crystal material and/or at least partially polymerizing the liquid crystal material. Non-limiting methods of at least partially polymerizing a liquid crystal material include photo-induced polymerization, thermally-induced polymerization, and combinations thereof. Further, photo-induced polymerization includes, but is not limited to, polymerization induced by ultraviolet light, polymerization induced by visible light, and combinations thereof.

Generally the thickness of the first at least partial coating can be any thickness necessary to achieve the total desired thickness of the alignment facility when added together with the thickness of the additional at least partial coating(s), which are described below in more detail. For example and without limitation, according to various non-limiting embodiments, the first at least partial coating can have a thickness ranging from: 0.5 to 20 microns, 0.5 to 10 microns, and 2 to 8 microns. Further, although not limiting herein, according to certain non-limiting embodiments, the thickness of the first at least partial coating can be less than that of the at least one additional at least partial coating.

As discussed above, according to various non-limiting embodiments disclosed herein, after forming the first at least partial coating, at least one additional at least partial coating comprising a liquid crystal material is formed on at least a portion of the first at least partial coating. More particularly, according to various non-limiting embodiments disclosed herein, forming the at least one additional at least partial coating can comprise applying a liquid crystal material to at least a portion of the first at least partial coating; at least partially ordering at least a portion of the liquid crystal material such that the at least partially ordered portion of the liquid crystal material has at least a second general direction that is generally parallel to at least the first general direction of the liquid crystal material of the first at least partial coating; and at least partially setting at least a portion of the liquid crystal material. Non-limiting methods of applying and at least partially setting the liquid crystal material of the at least one additional at least partial coating are set forth above in detail with respect to the first at least partial coating.

As previously discussed, liquid crystal materials are generally capable of being aligned with one or more other structures or materials such that the long axis of the molecules of the liquid crystal material take on a general direction that is generally parallel to the general direction of the structure with which the molecules are aligned. More specifically, although not limiting herein, according to various non-limiting embodiments disclosed herein, the liquid crystal material of the at least one additional at least partial coating can be at least partially ordered by aligning at least a portion of the liquid crystal material with at least a portion of the at least partially ordered liquid crystal material of the first at least partial coating such that the long axis of the molecules of the liquid crystal material of the at least one additional at least partial coating are generally parallel to at least the first general direction of the at least partially ordered liquid crystal material of the first at least partial coating. Thus, in this manner, the general direction of the liquid crystal material of the first at least partial coating can be transferred to the liquid crystal material of the at least one additional at least partially coating. Further, if the liquid crystal material of the first at least partial coating comprises a plurality of regions having general directions that together form a design or pattern (as previously described), that design or pattern can be transferred to the liquid crystal material of the at least one additional at least partial coating by aligning the liquid crystal material of the at least one additional at least partial coating with liquid crystal material of the first at least partial coating. Additionally, although not required, according to various non-limiting embodiments disclosed herein the at least one additional at least partial coating can be exposed to at least one of: a magnetic field, an electric field, linearly polarized infrared radiation, linearly polarized ultraviolet radiation, and linearly polarized visible radiation while being at least partially aligned with at least a portion of the liquid crystal material of the first at least partial coating.

As discussed above with respect to the first at least partial coating, according to various non-limiting embodiments, the at least one additional at least partial coating can have any thickness necessary to achieve the desired overall thickness of the alignment facility. Thus, for example and without limitation, according to various non-limiting embodiments disclosed herein, the at least one additional at least partial coating can have a thickness ranging from 1 micron to 25 microns, and can further have a thickness ranging from 5 microns to 20 microns. According to still another non-limiting embodiment, at least one additional at least partial coating can have a thickness greater than 6 microns, and can further have a thickness of at least 10 microns.

As previously discussed, the time required to fully align thick layer of a liquid crystal material with an oriented surface can be substantial. Further, in some instances, only a portion of the liquid crystal material immediately adjacent oriented surface may be aligned. Thus, according to various non-limiting embodiments wherein thicker alignment facilities are desired, the alignment facilities can comprise a plurality of additional at least partial coatings, each having an independently selected thickness that, when added together with the thickness of the first at least partial coating, form an alignment facility having the desired overall thickness. More specifically, according to various non-limiting embodiments disclosed herein, the method of forming the alignment facility can comprise forming a first at least partial coating comprising a liquid crystal material (as previously described), and thereafter successively forming a plurality of additional at least partial coatings. That is, after forming the first at least partial coating, a plurality of additional at least partial coatings can be formed by successively applying a liquid crystal material to at least a portion of a preceding coating, at least partially ordering at least a portion of the liquid crystal material such that the at least partially ordered portion of the liquid crystal material has at least one general direction that is generally parallel to a general direction of the preceding coating, and at least partially setting at least a portion of the liquid crystal material. Further, each of the at least partial coatings can have an independently selected thickness. For example and without limitation, each of the additional at least partial coatings can have a thickness ranging from 1 micron to 25 microns, and can further have a thickness ranging from 5 microns to 20 microns. According to another non-limiting embodiment, each of the additional at least partial coatings can have a thickness greater than 6 microns, and can further have a thickness of at least 10 microns.

According to one non-limiting embodiment, forming a plurality of additional at least partial coatings can comprise successively forming at least two additional at least partial coatings. In another non-limiting embodiment, forming a plurality of additional at least partial coatings can comprises successively forming at least three additional at least partial coatings. Although according to these non-limiting embodiments each of the plurality of additional at least partial coatings is formed in succession, according to various non-limiting embodiments, the time required to successively form the plurality of coatings can be less than the time required to apply and align a single coating of the same liquid crystal material having the same thickness as the plurality of coatings.

Further, as discussed above, it is possible to 'transfer' a general direction (or plurality of general directions that can together form a pattern or design) from one coating to the next by at least partially aligning each successive coating with at least a portion of the immediately preceding coating. For example, although not limiting herein, if the first at least partial coating comprises a plurality of regions having a plurality of general directions that together form a design, that design can be transferred to the at least one additional coating by alignment of the at least one additional at least partial coating with the first at least partial coating as discussed above. Further, where the alignment facility comprises a plurality of additional at least partial coatings, the design can be transferred to each of the additional at least partial coatings by successively aligning each coating with the preceding coating.

As previously discussed, the thickness of the first at least partial coating and the thickness and number of additional at least partial coatings, can be chosen so as to achieve the desired overall thickness of the alignment facility. Although not limiting herein, according to one non-limiting embodiment, the sum of the thickness of the first at least partial coating and the thickness of the at least one additional at least partial coating can range from 10 microns to 50 microns. According to another non-limiting embodiment, the sum of the thickness of the first at least partial coating and the at least one additional at least partial coating can range from 20 microns to 40 microns. According to still another non-limiting embodiment, this sum can be greater than 20 microns, and further can be at least 22 microns.

Another non-limiting embodiment provides a method of making an alignment facility for an optical dye on at least a portion of an optical substrate, the method comprising forming a first at least partial coating comprising an at least partially ordered liquid crystal material having at least a first general direction on at least a portion of the optical substrate, and forming at least one additional at least partial coating comprising an at least partially ordered liquid crystal material having at least a second general direction that is generally parallel to at least the first general direction of the liquid crystal material of the first at least partial coating on at least a portion of the first at least partial coating; wherein a sum of a thickness of the first at least partial coating and a thickness of the at least one additional at least partial coating is greater than 20 microns.

Still another non-limiting embodiment provides a method of making an alignment facility for an optical dye on at least a portion of an optical substrate, the method comprising forming an at least partial coating comprising an at least partially ordered liquid crystal material having at least a first general direction on at least a portion of the optical substrate, the at least partial coating having a thickness of at least 6 microns. According to this non-limiting embodiment, forming the at least partial coating can comprise applying a liquid crystal material to at least a portion of the optical substrate such that the liquid crystal material has a thickness of greater than 6 microns, at least partially ordering at least a portion of the liquid crystal material such that at least a portion of the at least partially ordered liquid crystal material has at least a first general direction, and at least partially setting at least a portion of the at least partially ordered liquid crystal material. Although not limiting herein, according to this non-limiting embodiment, the at least partial coating can have thickness of at least 10 microns, and further can have a thickness ranging from 50 to 1000 microns.

As previous mentioned, ordering a liquid crystal material by aligning the liquid crystal material with another structure having an oriented surface can take a substantial amount of time and/or can result in alignment of only certain portions of the liquid crystal material adjacent the oriented surface. However, the inventors have observed that by using certain non-contact methods of ordering, or combinations of contact and non-contact methods of ordering, faster and/or more complete ordering liquid crystal materials can result. Thus, according to the above-mentioned non-limiting embodiment, although not required, at least partially ordering at least a portion of the liquid crystal material can comprise at least one of exposing at least a portion of the liquid crystal material to a magnetic field or an electric field. Additionally, according to this non-limiting embodiment, ordering at least a portion of the liquid crystal material can comprise exposing at least a portion of the liquid crystal material to a magnetic field or an electric field while aligning the at least a portion of the liquid crystal material with another structure, such as, but not limited to a coating of an least partially ordered liquid crystal material or an orientation facility. Non-limiting examples of orientation facilities are described below in more detail.

For example, according to one specific non-limiting embodiment forming the at least partial coating can comprise applying a solution or mixture of a liquid crystal polymer in a solvent or carrier to at least a portion of the optical substrate such that the liquid crystal polymer has a thickness of greater than 6 microns. Thereafter, according to this non-limiting embodiment, at least a portion of the liquid crystal polymer can be at least partially ordered by exposing the at least a portion of the liquid crystal polymer to at least one of a magnetic field and an electric field. Further, at least a portion of the liquid crystal polymer can be at least partially ordered by exposing the portion to at least one of a magnetic field and an electric field while aligning the at least a portion with another structure. After at least partially ordering at least a portion of the liquid crystal polymer, at least a portion of the liquid crystal polymer can be at least partially setting, for example by drying at least a portion of the liquid crystal polymer as discussed above.

Referring now to FIG. 1, one non-limiting embodiment provides a method of making an alignment facility comprising an at least partial coating comprising an at least partially ordered liquid crystal material having at least a first general direction on at least a portion of an optical substrate by placing at least a portion of a surface 10 of an optical substrate 12 adjacent a surface 14 of a transparent mold 16 to define a molding region 17. The surface 14 of transparent mold 16 can be concave or spherically negative, or it can have any other configuration as desired or required. Further, although not required, a gasket or spacer 15 can be placed between optical substrate 12 and transparent mold 16 to provide a desired offset and/or contain the liquid crystal material. After positioning the optical substrate 12, a liquid crystal material 18 can be introduced into the molding region 17 defined by the surface 10 of the optical substrate 12 and the surface 14 of the transparent mold 16, such that at least a portion of the liquid crystal material 18 is caused to flow therebetween. Thereafter, at least a portion of the liquid crystal material 18 can be at least partially ordered, for example, by exposure to an electric field, a magnetic field, linearly polarized infrared radiation, linearly polarized ultraviolet radiation, and/or linearly polarized visible radiation and at least partially polymerized. After polymerization, the optical substrate with the at least partial coating of an at least partially ordered liquid crystal material connected to at least a portion of a surface thereof can be released from the mold.

Alternatively, the liquid crystal material 18 can be introduced onto surface 14 of transparent mold 16 prior to placing at least a portion of surface 10 of the optical substrate 12 adjacent thereto such that at least a portion of surface 10 contacts at least a portion of the liquid crystal material 18, thereby causing the liquid crystal material 18 to flow between surface 10 and surface 14. Thereafter, the liquid crystal material 18 can be at least partially ordered and polymerized as discussed above. After polymerization, the optical substrate 12 with the at least partial coating of liquid crystal material 18 connected thereto can be released from the mold.

Although not shown in FIG. 1, additionally or alternatively, an orientation facility having at least a first general direction can be imparted onto at least a portion of the surface of the transparent mold prior to introducing the liquid crystal material into the mold and/or onto at least a portion of the surface of the optical substrate prior to contacting the surface of the optical substrate with the liquid crystal material. Further, according to this non-limiting embodiment, at least partially ordering at least a portion of the liquid crystal material can comprise at least partially aligning at least a portion of the liquid crystal material with at least a portion of the orientation facility on the surface of the mold and/or at least a portion of the orientation facility on the surface of the optical substrate. Additionally, as discussed above, at least a portion of the liquid crystal material of the at least partial coating can be exposed to a magnetic field, an electric field, linearly polarized infrared radiation, linearly polarized ultraviolet radiation and/or linearly polarized visible radiation during alignment to facilitate the processes.

Although not limiting herein, it is contemplated that the aforementioned overmolding methods of making at least partial coatings can be particularly useful in forming coatings on multi-focal ophthalmic lenses, or for forming at least partial coatings for other applications where relatively thick alignment facilities are desired.

Non-limiting examples of liquid crystal materials suitable for use in the alignment facilities according to various non-limiting embodiments disclosed herein include liquid crystal polymers, liquid crystal pre-polymers, liquid crystal monomers, and liquid crystal mesogens. For example, according to one non-limiting embodiment, the liquid crystal materials of the first at least partial coating and the at least one additional at least partial coating can be independently chosen from liquid crystal polymers, liquid crystal pre-polymers, liquid crystal monomers, and liquid crystal mesogens. As used herein the term "pre-polymer" means partially polymerized materials.

Liquid crystal monomers that are suitable for use in conjunction with various non-limiting embodiments disclosed herein include mono- as well as multi-functional liquid crystal monomers. Further, according to various non-limiting embodiments disclosed herein, the liquid crystal monomer can be a cross-linkable liquid crystal monomer, and can further be a photocross-linkable liquid crystal monomer. As used herein the term "photocross-linkable" means a material, such as a monomer, a pre-polymer or a polymer, that can be cross-linked on exposure to actinic radiation. For example, photo-cross-linkable liquid crystal monomers include those liquid crystal monomers that are cross-linkable on exposure to ultra-violet radiation and/or visible radiation, either with or without the use of polymerization initiators.

Non-limiting examples of cross-linkable liquid crystal monomers suitable for use in accordance with various non-limiting embodiments disclosed herein include liquid crystal monomers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers and blends thereof. Non-limiting examples of photocross-linkable liquid crystal monomers suitable for use in the at least partial coatings of the alignment facilities according to various non-limiting embodiments disclosed herein include liquid crystal monomers having functional groups chosen from acrylates, methacrylates, alkynes, epoxides, thiols, and blends thereof.

Liquid crystal polymers and pre-polymers that are suitable for use in conjunction with various non-limiting embodiments disclosed herein include main-chain liquid crystal polymers and pre-polymers and side-chain liquid crystal polymers and pre-polymers. In main-chain liquid crystal polymers and pre-polymers, rod- or disc-like groups and/or liquid crystal mesogens are primarily located within polymer backbone. In side-chain polymers and pre-polymers, the rod- or disc-like groups and/or liquid crystal mesogens primarily are located within the side chains of the polymer. Additionally, according to various non-limiting embodiments disclosed herein, the liquid crystal polymer or pre-polymer can be cross-linkable, and further can be photocross-linkable.

Non-limiting examples of liquid crystal polymers and pre-polymers that are suitable for use in accordance with various non-limiting embodiments disclosed herein include, but are not limited to, main-chain and side-chain polymers and pre-polymers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and blends thereof. Non-limiting examples of photocross-linkable liquid crystal polymers and pre-polymers that are suitable for use in the at least partial coatings of the alignment facilities according to various non-limiting embodiments disclosed herein include those polymers and pre-polymers having functional groups chosen from acrylates, methacrylates, alkynes, epoxides, thiols, and blends thereof.

Liquid crystals mesogens that are suitable for use in conjunction with various non-limiting embodiments disclosed herein include thermotropic liquid crystal mesogens and lyotropic liquid crystal mesogens. Further, non-limiting examples of liquid crystal mesogens that are suitable for use in conjunction with various non-limiting embodiments disclosed herein include columatic (or rod-like) liquid crystal mesogens and discotic (or disc-like) liquid crystal mesogens.

Further, although not limiting herein, the methods of making alignment facilities according to various non-limiting embodiments disclosed herein can further comprise forming an at least partial primer coating on at least a portion of the optical substrate prior to applying any of the various at least partial coatings comprising a liquid crystal material thereto to facilitate one or more of adhesion and wetting of at least a portion of the optical substrate by the liquid crystal material. Non-limiting examples of primer coatings that can be used in conjunction with various non-limiting embodiments disclosed herein include coatings comprising coupling agents, at least partial hydrolysates of coupling agents, and mixtures thereof. As used herein "coupling agent" means a material having at least one group capable of reacting, binding and/or associating with a group on at least one surface. In one non-limiting embodiment, a coupling agent can serve as a molecular bridge at the interface of at least two surfaces that can be similar or dissimilar surfaces. Although not limiting herein, coupling agents, can be monomers, oligomers, pre-polymers and/or polymers. Such materials include, but are not limited to, organo-metallics such as silanes, titanates, zirconates, aluminates, zirconium aluminates, hydrolysates thereof and mixtures thereof. As used herein the phrase "at least partial hydrolysates of coupling agents" means that at least some to all of the hydrolyzable groups on the coupling agent are hydrolyzed. In addition to coupling agents and/or hydrolysates of coupling agents, the primer coatings can comprise other adhesion enhancing ingredients. For example, although not limiting herein, the primer coating can further comprise an adhesion-enhancing amount of an epoxy-containing material. Adhesion-enhancing amounts of an epoxy-containing material when added to the coupling agent containing coating composition can improve the adhesion of a subsequently applied coating as compared to a coupling agent containing coating composition that is essentially free of the epoxy-containing material. Other non-limiting examples of primer coatings that are suitable for use in conjunction with the various non-limiting embodiments disclosed herein include those described U.S. Pat. Nos. 6,602,603 and 6,150,430, which are hereby specifically incorporated by reference. Further, according to one non-limiting embodiment, the primer coating can serve as a barrier coating to prevent interaction of the coating ingredients with the substrate surface and vice versa.

Another non-limiting embodiment of a method of making an alignment facility for an optical dye on at least a portion of an ophthalmic substrate comprises imparting an orientation facility having at least one general direction to at least portion of the ophthalmic substrate, forming a first at least partial coating comprising an at least partially ordered liquid crystal material having at least a first general direction that is generally parallel to at least one general direction of the orientation facility on at least a portion of the orientation facility, and thereafter forming at least one additional at least partial coating comprising an at least partially ordered liquid crystal material having at least a second general direction that is generally parallel to at least the first general direction of the first at least partial coating on at least a portion of the first at least partial coating. Suitable non-limiting methods of forming at least partial coating comprising a liquid crystal material, as well as suitable non-limiting examples of liquid crystal materials that can be used to form such coatings, are set forth above.

As used herein the term "orientation facility" means a mechanism that can facilitate the positioning of one or more other structures that are exposed, directly and/or indirectly, to at least a portion of the orientation facility. Although not required, as discussed above with respect to the various at least partial coatings comprising liquid crystal materials, the orientation facilities according to various non-limiting embodiments disclosed herein can comprise a first ordered region having a first general direction and at least one second ordered region adjacent the first ordered region having an second general direction that is different from the first general direction. Further, the orientation facilities can have a plurality of regions, each of which has a general direction that is the same or different from the remaining regions, so as to form a desired pattern or design. Additionally, the orientation facilities can comprise one or more different types of orientation facilities.

Non-limiting examples of orientation facilities that can be used in conjunction with various other non-limiting embodiments disclosed herein include at least partial coatings comprising an at least partially ordered alignment medium, at least partially ordered polymer sheets, at least partially treated surfaces, Langmuir-Blodgett films, and combinations thereof.

For example, although not limiting herein, according to various non-limiting embodiments wherein the orientation facility comprises an at least partial coating comprising an at least partially ordered alignment medium, imparting the orientation facility can comprise applying an alignment medium to at least a portion of the optical substrate and at least partially ordering the alignment medium. Non-limiting methods of ordering at least a portion of the alignment medium include those methods of ordering the at least partial coating comprising a liquid crystal material described above. For example, although not limiting herein, in one non-limiting embodiment, the alignment medium can be at least partially ordered by exposure to at least one of: a magnetic field, an electric field, linearly polarized infrared radiation, linearly polarized ultraviolet radiation, linearly polarized visible radiation and a shear force. Additionally, when the alignment medium is a photo-orientation material (discussed below), the alignment medium can be ordered using linearly polarized ultraviolet radiation. Non-limiting examples of suitable alignment media that can be used in conjunction with various non-limiting embodiments disclosed herein include photo-orientation materials, and rubbed-orientation materials.

Non-limiting examples of photo-orientation materials that are suitable for use as an alignment medium in conjunction with various non-limiting embodiments disclosed include photo-orientable polymer networks. Specific, non-limiting examples of suitable photo-orientable polymer networks include azobenzene derivatives, cinnamic acid derivatives, coumarine derivatives, ferulic acid derivatives, and polyimides. For example, according to one non-limiting embodiment, the orientation facility can comprise at least one at least partial coating comprising an at least partially ordered photo-orientable polymer network chosen from azobenzene derivatives, cinnamic acid derivatives, coumarine derivatives, ferulic acid derivatives, and polyimides. Specific non-limiting examples of cinnamic acid derivatives that can be used as an alignment medium in conjunction with various non-limiting embodiments disclosed herein include polyvinyl cinnamate and polyvinyl esters of paramethoxycinnamic acid.

As used herein the term "rubbed-orientation material" means a material that can be at least partially ordered by rubbing at least a portion of a surface of the material with another suitably textured material. For example, although not limiting herein, in one non-limiting embodiment, the rubbed-orientation material can be rubbed with a suitably textured cloth or a velvet brush. Non-limiting examples of rubbed-orientation materials that are suitable for use as an alignment medium in conjunction with various non-limiting embodiments disclosed herein include (poly)imides, (poly)siloxanes, (poly)acrylates, and (poly)coumarines. Thus, for example, although not limiting herein, in one non-limiting embodiment, the at least partial coating comprising the alignment medium can be an at least partial coating comprising a polyimide that has been rubbed with velvet or a cloth so as to at least partially order at least a portion of the surface of the polyimide.

Further, as discussed above, the orientation facilities according to certain non-limiting embodiments disclosed herein can comprise an at least partially ordered polymer sheet. For example, although not limiting herein, a sheet of polyvinyl alcohol ("PVA") can be at least partially ordered by stretching the polymer sheet to at least, and thereafter the sheet can be connected to at least a portion of a surface of the optical substrate to form the orientation facility. Alternatively, the ordered polymer sheet can be made by a method that at least partially orders the polymer chains during fabrication, for example and without limitation, by extrusion. Still further, the at least partially ordered polymer sheet can be made using photo-orientation methods. For example and without limitation, an sheet of a photo-orientation material can be formed, for example by cast, and at least partially ordered by exposure to linearly polarized UV radiation.

Still further, the orientation facilities according to various non-limiting embodiments disclosed herein can comprise an at least partially treated surface. As used herein, the term "treated surface" refers to at least a portion of a surface that has been physically altered to create at least one ordered region on least a portion of the surface. Non-limiting examples of at least partially treated surfaces include at least partially rubbed surfaces, at least partially etched surfaces, and at least partially embossed surfaces. Further, the at least partially treated surfaces can be patterned, for example using a photolithographic or interferographic process. Non-limiting examples of at least partially treated surfaces that are useful in forming the orientation facilities according to various non-limiting embodiments disclosed herein include, chemically etched surfaces, plasma etched surfaces, nano-etched surfaces (such as surfaces etched using a scanning tunneling microscope or an atomic force microscope), laser etched surfaces, and electron-beam etched surfaces.

In one specific non-limiting embodiment, wherein the orientation facility comprises an at least partially treated surface, imparting the orientation facility can comprise depositing a metal salt (such as a metal oxide or metal fluoride) onto at least a portion of a surface, and thereafter etching the deposit to form the orientation facility. Non-limiting examples of suitable techniques for depositing a metal salt include plasma vapor deposition, chemical vapor deposition, and sputtering. Non-limiting examples of etching processes are set forth above.

As used herein the term "Langmuir-Blodgett films" means one or more at least partially ordered molecular films on a surface. For example, although not limiting herein, a Langmuir-Blodgett film can be formed by dipping a substrate into a liquid one or more times so that it is at least partially covered by a molecular film and then removing the substrate from the liquid such that, due to the relative surface tensions of the liquid and the substrate, the molecules of the molecular film are at least partially ordered in a general direction. As used herein, the term molecular film refers to monomolecular films (i.e., monolayers) as well as films comprising more than one monolayer.

Another non-limiting embodiment provides a method of making an alignment facility for an optical dye on at least a portion of an optical substrate comprising forming an at least partial coating comprising an at least partially ordered phase-separated polymer on at least a portion of the optical substrate. According to this non-limiting embodiment, forming the at least partial coating can comprise applying a phase-separating polymer system comprising a matrix phase forming material and a guest phase forming material onto at least a portion of the optical substrate, and thereafter, at least partially ordering at least a portion of the matrix phase forming material and at least a portion of the guest phase forming material such that at least a portion of the matrix phase forming material has at least a first general direction and at least a portion of the guest phase forming material has at least a second general direction that is generally parallel to at least the first general direction. After at least partially ordering, at least a portion of the guest phase forming material can be separated from at least a portion of the matrix phase forming material by at least one of polymerization induced phase-separation and solvent induced phase-separation to form a matrix phase and a guest phase.

According to various non-limiting embodiments disclosed herein, the matrix phase forming material can comprise a liquid crystal material chosen from liquid crystal monomers, liquid crystal pre-polymers, and liquid crystal polymers. Further, according to various non-limiting embodiments, the guest phase forming material can comprise a liquid crystal material chosen from liquid crystal mesogens, liquid crystal monomers, and liquid crystal polymers and pre-polymers. Non-limiting examples of such materials are set forth in detail herein.

Non-limiting methods of at least partially ordering at least a portion of the of the matrix phase forming material and at least a portion of the guest phase forming material of the phase-separating polymer system include those set forth above for ordering liquid crystal materials. For example, although not limiting herein, at least partially ordering at least a portion of the matrix phase forming material and at least a portion of the guest phase forming material can comprise exposing the portions to at least one of: a magnetic field, an electric field, linearly polarized infrared radiation, linearly polarized ultraviolet radiation, linearly polarized visible radiation and a shear force. Further, at least partially ordering the portions can comprise at least partially aligning the portions with an orientation facility, as described in more detail below.

As previously discussed, after at least partially ordering at least a portion of the matrix phase forming material and the guest phase forming material, at least a portion of the guest phase forming material can be separated from at least a portion of the matrix phase forming material by at least one of polymerization induced phase separation and solvent induced phase separation. For clarity the separation of the matrix and guest phase forming materials is described herein in relation to the guest phase forming material being separated from the matrix phase forming material, however, it should be appreciated that this language is intended to cover any separation between the two phase forming materials. That is, this language is intended to cover separation of the guest phase forming material from the matrix phase forming material and separation of the matrix phase forming material from the guest phase forming material, as well as, simultaneous separation of both phase forming materials, or any combination thereof. Although not limiting herein, it is generally believed that during phase separation, the components of the phase-separating system (i.e., the matrix and guest phase forming materials) will separate from each other by first forming a gel of nanoscale (that is, nanometer sized) zones of each phase forming material. These zones will subsequently coalesce into distinct phase regions.

In one specific non-limiting embodiment, the phase-separating polymer system can comprise a mixture of a matrix phase forming material comprising a liquid crystal monomer and a guest phase forming material comprising at least one liquid crystal mesogen. According to this non-limiting embodiment, causing a least a portion of the guest phase forming material to separate from at least a portion of the matrix phase forming material can comprise polymerization induced phase-separation. That is, at least a portion of the liquid crystal monomer of the matrix phase can be polymerized and thereby separated from at least a portion of the at least one liquid crystal mesogen of the guest phase forming material. Non-limiting methods of polymerization that can be used in conjunction with various non-limiting embodiments disclosed herein include photo-induced polymerization and thermally-induced polymerization.

In another specific non-limiting embodiment, the phase-separating polymer system can comprise a mixture of a matrix phase forming material comprising a liquid crystal monomer and a guest phase forming material comprising a low viscosity liquid crystal monomer having a different functionality from the liquid crystal monomer of the matrix phase. As used herein, the term "low viscosity liquid crystal monomer," refers to a liquid crystal monomer mixture or solution that is freely flowing at room temperature. According to this non-limiting embodiment, causing at least a portion of the guest phase forming material to separate from at least a portion of the matrix phase forming material can comprise polymerization induced phase-separation. That is, at least a portion of the liquid crystal monomer of the matrix phase can be polymerized under conditions that do not cause the liquid crystal monomer of the guest phase to polymerize. During polymerization of the matrix phase forming material, the guest phase forming material will separate from the matrix phase forming material. Thereafter, in certain non-limiting embodiments, the liquid crystal monomer of the guest phase forming material can be polymerized in a separate polymerization process.

In another specific non-limiting embodiment, the phase-separating polymer system can comprise a solution, in at least one common solvent, of a matrix phase forming material comprising a liquid crystal polymer and a guest phase forming material comprising a liquid crystal polymer that is different from the liquid crystal polymer of the matrix phase forming material. According to this non-limiting embodiment, causing at least a portion of the guest phase forming material to separate from the matrix phase forming material can comprise solvent induced phase-separation. That is, at least a portion of the at least one common solvent can be evaporated from the mixture of liquid crystal polymers, thereby causing the two phases to separate from each other.

Another non-limiting embodiment provides a method of making an alignment facility for an optical dye on at least a portion of an optical substrate comprising imparting an orientation facility to at least a portion of the optical substrate and forming an at least partial coating comprising an at least partially ordered phase-separated polymer on at least a portion of the orientation facility. According to this non-limiting embodiment, a phase-separating polymer system comprising a matrix phase forming material comprising a liquid crystal material and a guest phase forming material comprising a liquid crystal material can be applied on at least a portion of the orientation facility. Thereafter, at least a portion of the matrix phase forming material and at least a portion of the guest phase forming material of the phase-separating polymer system can be at least partially ordered such that the at least partially ordered portion of the matrix phase forming material has at least a first general direction and the at least partially ordered portion of the guest phase forming material has at least a second general direction that is generally parallel to at least the first general direction. After at least partially ordering at least a portion of the matrix phase forming material and the guest phase forming material, at least a portion of the guest phase forming material is separated from at least a portion of the matrix phase forming material by at least one of polymerization induced phase-separation and solvent induced phase-separation.

Further, according to this non-limiting embodiment, at least partially ordering at least a portion of the matrix phase forming material and at least a portion of the guest phase forming material can comprise aligning the portions with at least a portion of the orientation facility. Further, although not required, at least a portion of the matrix phase forming material and the at least a portion of the guest phase forming material can be exposed to at least one of: a magnetic field, an electric field, linearly polarized infrared radiation, linearly polarized ultraviolet radiation, linearly polarized visible radiation and a shear force to at least partially order the portion, either alone or in combination with aligning the portion with the orientation facility. Non-limiting methods of imparting the orientation facility, as well as suitable non-limiting methods and materials for forming the at least partial coating comprising the phase-separated polymer are set forth above in detail.

Generally speaking, the thickness of the at least partial coating comprising the at least partially ordered phase-separated polymer of the alignment facilities according to various non-limiting embodiments disclosed herein can be chosen so as to achieve the desired overall thickness of the alignment facility. For example and without limitation, according to various non-limiting embodiments, the thickness of the at least partial coating comprising the phase-separated polymer can range from: 1 micron to 100 microns, from 10 microns to 50 microns, and from 20 microns to 40 microns.

As previously discussed, generally, the time required to align a liquid crystal material will depend, in part, upon the thickness of the liquid crystal material. However, by forming an at least partial coating comprising a phase-separated polymer according to various non-limiting embodiments disclosed herein, the time required to align the liquid crystal materials of the phase-separating polymer system can be reduced as compared to the time required to align a single-phase coating of a liquid crystal material having the same thickness. For example, in one non-limiting embodiment, an at least partial coating comprising a phase-separated polymer and having a thickness ranging from 15 to 20 microns can be formed on at least a portion of a orientation facility comprising an at least partially ordered photo-orientation material. Further, according to this non-limiting embodiment, at least partially aligning at least a portion of the matrix phase and at least a portion of the guest phase of the phase-separating polymer system can comprise waiting less than 30 minutes.

Another non-limiting embodiment provides a method of making an alignment facility for an optical dye, the method comprising forming a sheet comprising (i) an at least partially ordered liquid crystal polymer having at least a first general direction, and (ii) an at least partially ordered liquid crystal material distributed within at least a portion of the at least partially ordered liquid crystal polymer. Further, according to this non-limiting embodiment, the at least partially ordered liquid crystal material distributed within the at least a portion of the at least partially ordered liquid crystal polymer can have at least a second general direction that is generally parallel to at least the first general direction of the liquid crystal polymer.

For example, although not limiting herein, according to one non-limiting embodiment, forming the sheet comprising the at least partially ordered liquid crystal polymer and the at least partially ordered liquid crystal material distributed within at least a portion the at least partially ordered liquid crystal polymer can comprise applying a phase-separating polymer system comprising a matrix phase forming material comprising a liquid crystal material and a guest phase forming material comprising a liquid crystal material on to at least a portion a substrate. Thereafter, at least a portion of the matrix phase forming material and at least a portion of the guest phase forming material can be at least partially ordered. After at least partially ordering at least a portion of the phase forming materials, at least a portion of the guest phase forming material can be separated from at least a portion of the matrix phase forming material by at least one of polymerization induced phase-separation and solvent induced phase-separation, and the at least partially ordered, phase-separated polymer coating can be removed from the substrate to form the sheet.

According to another non-limiting embodiment, forming the sheet comprising the at least partially ordered liquid crystal polymer matrix and the at least partially ordered liquid crystal material distributed within at least a portion the at least partially ordered liquid crystal polymer matrix can comprise forming an at least partially ordered liquid crystal polymer sheet, and imbibing at least one liquid crystal mesogen into at least a portion of the at least partially ordered liquid crystal polymer sheet. For example, according to this non-limiting embodiment, a sheet comprising a liquid crystal polymer can be formed and at least partially ordered by a method of forming a polymer sheet that can at least partially order the liquid crystal polymer during formation, for example, by extrusion. Alternatively, a liquid crystal polymer can be cast onto a substrate and at least partially ordered by one of the non-limiting methods of at least partially ordering liquid crystal materials set forth above. For example, although not limiting herein, at least a portion of the liquid crystal material can be exposed to a magnetic or an electric field. After being at least partially ordered, the liquid crystal polymer can be at least partially set and removed from the substrate to form a sheet comprising an at least partially ordered liquid crystal polymer matrix. Still further, a liquid crystal polymer sheet can be cast, at least partially set, and subsequently stretched to form sheet comprising an at least partially ordered liquid crystal polymer.

After forming the sheet comprising the at least partially ordered liquid crystal polymer, at least one liquid crystal mesogen can be imbibed into at least a portion of the liquid crystal polymer sheet. For example, although not limiting herein, liquid crystal mesogens can be imbibed into at least a portion of the liquid crystal polymer by applying a solution or mixture of the liquid crystal mesogens in a carrier to a portion of the liquid crystal polymer and, thereafter, allowing the liquid crystal mesogens to diffuse into the liquid crystal polymer sheet, either with or without heating. Alternatively, the liquid crystal polymer sheet can be immersed into a solution or mixture of the liquid crystal mesogens in a carrier and the liquid crystal mesogens can be imbibed into the liquid crystal polymer sheet by diffusion, either with or without heating.

According to still another non-limiting embodiment, forming the sheet comprising the at least partially ordered liquid crystal polymer and the at least partially ordered liquid crystal material distributed within at least a portion of the at least partially ordered liquid crystal polymer can comprise forming a liquid crystal polymer sheet, imbibing at least a portion of the liquid crystal polymer sheet with at least one liquid crystal mesogen, and thereafter at least partially ordering at least portion of the liquid crystal polymer and at least a portion of the at least one liquid crystal mesogen distributed therein. Although not limiting herein, for example, at least a portion of the liquid crystal polymer sheet and at least a portion of the at least one liquid crystal mesogen distributed therein can be at least partially ordered by stretching the liquid crystal polymer sheet. Further according to this non-limiting embodiment, the liquid crystal polymer sheet can be formed using conventional polymer processing techniques, such as, but not limited to, extrusion and casting.

Generally speaking, the sheets comprising the at least partially ordered liquid crystal polymer and the at least partially ordered liquid crystal material distributed therein according to various non-limiting embodiments disclosed herein can have any thickness necessary so as to achieve the desired overall thickness of the alignment facility. For example, in one non-limiting embodiment, the thickness of the sheet can range from 1 micron to 100 microns. In another non-limiting embodiment, the thickness of the sheet can range from 10 microns to 50 microns. In still another non-limiting embodiment, the thickness of the sheet can range from 20 microns to 40 microns.

According to specific non-limiting embodiments, the present disclosure provides for a phase-separating polymer system comprising at least one photoactive material. According to certain non-limiting embodiments, the present disclosure provides a phase-separating polymer system comprising an at least partially cured matrix phase comprising a polymeric residue of at least a first liquid crystal monomer, and a guest phase comprising at least one photoactive material and at least one liquid crystal material, wherein at least a portion of the guest phase separates from at least a portion of the matrix phase during the at least partial curing of the polymeric residue of the at least first liquid crystal monomer, for example by polymerization induced phase-separation. Non-limiting embodiments of the phase-separating polymer systems disclosed herein, include systems which may phase separate by either polymerization induced phase-separation and solvent induced phase-separation. According to these embodiments, the at least one photoactive material may be selected from photochromic compounds, dichroic compounds, and photochromic-dichroic compounds. As used herein the term "residue" when used in reference to a monomer in a polymerization means that which remains of the monomer once it is incorporated into the polymeric structure. As used herein the terms "curing", "cure", "cured" or "at least partially cured" include an at least partial polymerization and/or at least partial cross linking process.

According to certain non-limiting embodiments, at least one photoactive material may comprise at least one photochromic compound. The at least one photochromic compound may comprise a compound with a photochromic group chosen from a thermally or non-thermally reversible pyran, a thermally or non-thermally reversible oxazine, or a thermally or non-thermally reversible fulgide. Alternatively or in addition, the at least one photochromic compound may comprise inorganic photochromic compounds.

Non-limiting examples of thermally reversible photochromic pyrans from which the at least one photochromic compound may be chosen and that may be used in conjunction with various non-limiting embodiments disclosed herein include benzopyrans, naphthopyrans, e.g., naphtho[1,2-b]pyrans, naphtho[2,1-b]pyrans, indeno-fused naphthopyrans, such as those disclosed in U.S. Pat. No. 5,645,767 at col. 2, line 16 to col. 12, line 57; heterocyclic-fused naphthopyrans, such as those disclosed in U.S. Pat. Nos. 5,723,072 at col. 2, line 27 to col. 15, line 55; 5,698,141 at col. 2, line 11 to col. 19, line 45; 6,153,126 at col. 2, line 26 to col. 8, line 60; and 6,022,497 at col. 2, line 21 to col. 11, line 46, which are all hereby incorporated by reference; spiro-9-fluoreno[1,2-b]pyrans; phenanthropyrans; quinopyrans; fluoroanthenopyrans; spiropyrans, e.g., spiro(benzindoline)naphthopyrans, spiro(indoline)benzopyrans, spiro(indoline)naphthopyrans, spiro(indoline)quinopyrans and spiro(indoline)pyrans. More specific examples of naphthopyrans and the complementary organic photochromic substances are described in U.S. Pat. No. 5,658,501 at col. 1, line 64 to col. 13, line 17, which is hereby specifically incorporated by reference herein. Spiro (indoline)pyrans are also described in the text, *Techniques in Chemistry*, Volume III, "Photochromism", Chapter 3, Glenn H. Brown, Editor, John Wiley and Sons, Inc., New York, 1971, which is hereby incorporated by reference.

Non-limiting examples of thermally reversible photochromic oxazines from which the photochromic compounds may be chosen and that may be used in conjunction with various non-limiting embodiments disclosed herein include benzoxazines, naphthoxazines, and spiro-oxazines, e.g., spiro(indoline)naphthoxazines, spiro(indoline)pyridobenzoxazines, spiro(benzindoline) pyridobenzoxazines, spiro(benzindoline)naphthoxazines, spiro(indoline)benzoxazines, spiro(indoline)fluoranthenoxazine, and spiro(indoline)quinoxazine.

Non-limiting examples of thermally reversible photochromic fulgides from which the photochromic compounds may be chosen and that may be used in conjunction with various non-limiting embodiments disclosed herein include: fulgimides, and the 3-furyl and 3-thienyl fulgides and fulgimides, which are disclosed in U.S. Pat. No. 4,931,220 at column 2, line 51 to column 10, line 7, which is hereby specifically incorporated by reference, and mixtures of any of the aforementioned photochromic materials/compounds. Non-limiting examples of non-thermally reversible photochromic compounds from which the photochromic compounds may be chosen and that may be used in conjunction with various non-limiting embodiments disclosed herein include the photochromic compounds disclosed in U.S. Patent Application Publication 2005/0004361 at paragraphs [0314] to [0317] which disclosure is hereby specifically incorporated herein by reference.

In certain non-limiting embodiments, the photochromic compound may be an inorganic photochromic compound. Non-limiting examples of suitable include crystallites of silver halide, cadmium halide and/or copper halide. Other non-limiting examples of inorganic photochromic materials may be prepared by the addition of europium(II) and/or cerium(II) to a mineral glass, such as a soda-silica glass. According to one non-limiting embodiment, the inorganic photochromic compounds may be added to molten glass and formed into particles that are incorporated into the compositions of the present disclosure to form microparticles comprising such particulates. The glass particulates may be formed by any of a number of various methods known in the art. Suitable inorganic photochromic materials are further described in Kirk Othmer Encyclopedia of Chemical Technology, 4th ed., volume 6, pages 322-325, the disclosure of which is incorporated by reference herein.

As set forth herein, in certain non-limiting embodiments the at least one photochromic compound may be at least one photochromic pyran. According to these non-limiting embodiments, the at least one photochromic compound may be represented by Formula II:

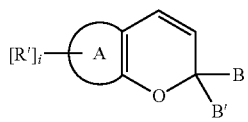

(II)

With reference to Formula II, A may be a substituted or unsubstituted aromatic ring or a substituted or unsubstituted fused aromatic ring chosen from: naphtho, benzo, phenanthro, fluorantheno, antheno, quinolino, thieno, furo, indolo, indolino, indeno, benzofuro, benzothieno, thiopheno, indeno-fused naphtho, heterocyclic-fused naphtho, or heterocyclic-fused benzo. According to these non-limiting embodiments, the possible substituents on the aromatic or fused aromatic ring are disclosed in U.S. Pat. Nos. 5,458,814; 5,466,398; 5,514,817; 5,573,712; 5,578,252; 5,637,262; 5,650,098; 5,651,923; 5,698,141; 5,723,072; 5,891,368; 6,022,495; 6,022,497; 6,106,744; 6,149,841; 6,248,264; 6,348,604; 6,736,998; 7,094,368; 7,262,295; and 7,320,826, the disclosures of which are incorporated by reference herein. According to Formula II, "i" may be the number of substituent(s) R' (which may be the same or different) attached to ring A and may range from 0 to 10. Further, with reference to Formula II, B and B' may each independently represent a group chosen from:

- a metallocenyl group (such as those described in U.S. Patent Application Publication 2007/0278460 at paragraph [0008] to [0036] which disclosure is specifically incorporated by reference herein);
- an aryl group that is mono-substituted with a reactive substituent or a compatiblizing substituent (such as those discussed in U.S. Patent Application Publication 2007/0278460 at paragraph [0037] to [0059] which disclosure is specifically incorporated by reference herein);
- 9-julolidinyl, an unsubstituted, mono-, di- or tri-substituted aryl group chosen from phenyl and naphthyl, an unsubstituted, mono- or di-substituted heteroaromatic group chosen from pyridyl, furanyl, benzofuran-2-yl, benzofuran-3-yl, thienyl, benzothien-2-yl, benzothien-3-yl, dibenzofuranyl, dibenzothienyl, carbazoyl, benzopyridyl, indolinyl and fluorenyl, wherein the aryl and heteroaromatic substituents are each independently: hydroxy, aryl, mono- or di-($C_1$-$C_{12}$)alkoxyaryl, mono- or di-($C_1$-$C_{12}$)alkylaryl, haloaryl, $C_3$-$C_7$ cycloalkylaryl, $C_3$-$C_7$ cycloalkyl, $C_3$-$C_7$ cycloalkyloxy, $C_3$-$C_7$ cycloalkyloxy($C_1$-$C_{12}$)alkyl, $C_3$-$C_7$ cycloalkyloxy($C_1$-$C_{12}$)alkoxy, aryl($C_1$-$C_{12}$)alkyl, aryl($C_1$-$C_{12}$)alkoxy, aryloxy, aryloxy($C_1$-$C_{12}$)alkyl, aryloxy($C_1$-$C_{12}$)alkoxy, mono- or di-($C_1$-$C_{12}$)alkylaryl($C_1$-$C_{12}$)alkyl, mono- or di-($C_1$-$C_{12}$)alkoxyaryl($C_1$-$C_{12}$)alkyl, mono- or di-($C_1$-$C_{12}$)alkylaryl($C_1$-$C_{12}$)alkoxy, mono- or di-($C_1$-$C_{12}$)alkoxyaryl($C_1$-$C_{12}$)alkoxy, amino, mono- or di-($C_1$-$C_{12}$)alkylamino, diarylamino, piperazino, N—($C_1$-$C_{12}$)alkylpiperazino, N-arylpiperazino, aziridino, indolino, piperidino, morpholino, thiomorpholino, tetrahydroquinolino, tetrahydroisoquinolino, pyrrolidino, $C_1$-$C_{12}$ alkyl, $C_1$-$C_{12}$ haloalkyl, $C_1$-$C_{12}$ alkoxy, mono($C_1$-$C_{12}$) alkoxy($C_1$-$C_{12}$) alkyl, acryloxy, methacryloxy, halogen or —C(=O)$R^1$, wherein $R^1$ represents a group, such as, —O$R^2$, —N($R^3$)$R^4$, piperidino or morpholino, wherein $R^2$ represents a group, such as, allyl, $C_1$-$C_6$ alkyl, phenyl, mono($C_1$-$C_6$)alkyl substituted phenyl, mono($C_1$-$C_6$) alkoxy substituted phenyl, phenyl($C_1$-$C_3$)alkyl, mono ($C_1$-$C_6$)alkyl substituted phenyl($C_1$-$C_3$)alkyl, mono($C_1$-$C_6$)alkoxy substituted phenyl($C_1$-$C_3$)alkyl, $C_1$-$C_6$ alkoxy($C_2$-$C_4$)alkyl or $C_1$-$C_6$ haloalkyl, and $R^3$ and $R^4$ each independently represents a group, such as, $C_1$-$C_6$ alkyl, $C_5$-$C_7$ cycloalkyl or a substituted or an unsubstituted phenyl, wherein said phenyl substituents are each independently $C_1$-$C_6$ alkyl or $C_1$-$C_6$ alkoxy;
- an unsubstituted or mono-substituted group chosen from pyrazolyl, imidazolyl, pyrazolinyl, imidazolinyl, pyrrolidino, phenothiazinyl, phenoxazinyl, phenazinyl and acridinyl, wherein said substituents are each independently $C_1$-$C_{12}$ alkyl, $C_1$-$C_{12}$ alkoxy, phenyl or halogen;
- a 4-substituted phenyl, the substituent being a dicarboxylic acid residue or derivative thereof, a diamine residue or derivative thereof, an amino alcohol residue or derivative thereof, a polyol residue or derivative thereof, —(CH$_2$)—, —(CH$_2$)$_k$— or —[O—(CH$_2$)$_k$]$_q$—, wherein "k" represents an integer ranging from 2 to 6 and "q" represents an integer ranging from 1 to 50, and wherein the substituent is connected to an aryl group of another photochromic material;
- a group represented by:

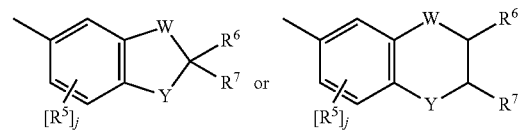

wherein W represents a group, such as, —CH$_2$— or oxygen; Y represents a group, such as, oxygen or substituted nitrogen, provided that when Y represents substituted nitrogen, W represents —CH$_2$—, the substituted nitrogen substituents being hydrogen, $C_1$-$C_{12}$ alkyl or $C_1$-$C_{12}$ acyl; each $R^5$ independently represents a group, such as, $C_1$-$C_{12}$ alkyl, $C_1$-$C_{12}$ alkoxy, hydroxy or halogen; $R^6$ and $R^7$ each independently represent a group, such as, hydrogen or $C_1$-$C_{12}$ alkyl; and "j" represents an integer ranging from 0 to 2; or
- a group represented by:

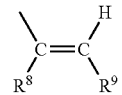

wherein $R^8$ represents a group, such as, hydrogen or $C_1$-$C_{12}$ alkyl, and $R^9$ represents a group, such as, an unsubstituted, mono- or di-substituted naphthyl, phenyl, furanyl or thienyl, wherein said naphthyl, phenyl, furanyl and thienyl substituents are each independently $C_1$-$C_{12}$ alkyl, $C_1$-$C_{12}$ alkoxy or halogen. Alternatively, B and B' may represent groups that together form a fluoren-9-ylidene or mono- or di-substituted fluoren-9-ylidene, each of said fluoren-9-ylidene substituents independently being $C_1$-$C_{12}$ alkyl, $C_1$-$C_{12}$ alkoxy or halogen.

Further, with reference to Formula II, R' may be a substituent on a ring in Formula II, wherein if R' is a substituent on an sp³ hybridized carbon, each R' may be independently selected from: a metallocenyl group; a reactive substituent or a compatiblizing substituent; perhalo($C_1$-$C_{10}$)alkyl, a perhalo($C_2$-$C_{10}$)alkenyl, a perhalo($C_3$-$C_{10}$)alkynyl, a perhalo($C_1$-$C_{10}$) alkoxy or a perhalo($C_3$-$C_{10}$)cycloalkyl; a group represented by —O($CH_2$)$_a$($CJ_2$)$_b$$CK_3$, wherein K is a halogen, J is hydrogen or halogen, "a" is an integer ranging from 1 to 10, and "b" is an integer ranging from 1 to 10; a silicon-containing group represented by one of

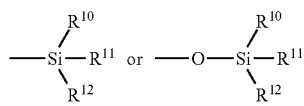

wherein $R^{10}$, $R^{11}$, and $R^{12}$ are each independently $C_1$-$C_{10}$ alkyl, $C_1$-$C_{10}$ alkoxy or phenyl; hydrogen, hydroxy, $C_1$-$C_6$ alkyl, chloro, fluoro, $C_3$-$C_7$ cycloalkyl, allyl or $C_1$-$C_8$ haloalkyl; morpholino, piperidino, pyrrolidino, an unsubstituted, mono- or di-substituted amino, wherein said amino substituents are each independently $C_1$-$C_6$ alkyl, phenyl, benzyl or naphthyl; an unsubstituted, mono-, di- or tri-substituted aryl group chosen from phenyl, naphthyl, benzyl, phenanthryl, pyrenyl, quinolyl, isoquinolyl, benzofuranyl, thienyl, benzothienyl, dibenzofuranyl, dibenzothienyl, carbazolyl or indolyl, wherein the aryl group substituents are each independently halogen, $C_1$-$C_6$ alkyl or $C_1$-$C_6$ alkoxy; —C(=O)$R^{13}$, wherein $R^{13}$ is hydrogen, hydroxy, $C_1$-$C_6$ alkyl, $C_1$-$C_6$ alkoxy, amino, mono- or di-($C_1$-$C_6$)alkylamino, morpholino, piperidino, pyrrolidino, an unsubstituted, mono- or di-substituted phenyl or naphthyl, an unsubstituted, mono- or di-substituted phenoxy, an unsubstituted, mono- or di-substituted phenylamino, wherein said phenyl, naphthyl, phenoxy, and phenylamino substituents are each independently $C_1$-$C_6$ alkyl or $C_1$-$C_6$ alkoxy; —$OR^{14}$, wherein $R^{14}$ is $C_1$-$C_6$ alkyl, phenyl ($C_1$-$C_3$)alkyl, mono($C_1$-$C_6$)alkyl substituted phenyl($C_1$-$C_3$)alkyl, mono($C_1$-$C_6$)alkoxy substituted phenyl($C_1$-$C_3$)alkyl, $C_1$-$C_6$ alkoxy($C_2$-$C_4$)alkyl, $C_3$-$C_7$ cycloalkyl, mono($C_1$-$C_4$) alkyl substituted $C_3$-$C_7$ cycloalkyl, $C_1$-$C_8$ chloroalkyl, $C_1$-$C_8$ fluoroalkyl, allyl or $C_1$-$C_6$ acyl, —CH($R^{15}$)$R^{16}$, wherein $R^{15}$ is hydrogen or $C_1$-$C_3$ alkyl, and $R^{16}$ is —CN, —$CF_3$ or —$COOR^7$, wherein $R^7$ is hydrogen or $C_1$-$C_3$ alkyl, or —C(=O)$R^{18}$, wherein $R^{18}$ is hydrogen, $C_1$-$C_6$ alkyl, $C_1$-$C_6$ alkoxy, amino, mono- or di-($C_1$-$C_6$)alkylamino, an unsubstituted, mono- or di-substituted phenyl or naphthyl, an unsubstituted, mono- or di-substituted phenoxy or an unsubstituted, mono- or di-substituted phenylamino, wherein said phenyl, naphthyl, phenoxy and phenylamino substituents are each independently $C_1$-$C_6$ alkyl or $C_1$-$C_6$ alkoxy; a 4-substituted phenyl, the substituent being a dicarboxylic acid residue or derivative thereof, a diamine residue or derivative thereof, an amino alcohol residue or derivative thereof, a polyol residue or derivative thereof, —($CH_2$)—, —($CH_2$)$_k$— or —[O—($CH_2$)$_k$]$_q$—, wherein "k" is an integer ranging from 2 to 6 and "q" is an integer ranging from 1 to 50, and wherein the substituent is connected to an aryl group on another photochromic material; —CH($R^{19}$)$_2$, wherein $R^{19}$ is —CN or —$COOR^{20}$, wherein $R^{20}$ is hydrogen, $C_1$-$C_6$ alkyl, $C_3$-$C_7$ cycloalkyl, phenyl($C_1$-$C_3$)alkyl, mono($C_1$-$C_6$)alkyl substituted phenyl($C_1$-$C_3$)alkyl, mono($C_1$-$C_6$)alkoxy substituted phenyl($C_1$-$C_3$)alkyl or an unsubstituted, mono- or di-substituted phenyl or naphthyl, wherein said phenyl and naphthyl substituents are each independently $C_1$-$C_6$ alkyl or $C_1$-$C_6$ alkoxy; —CH($R^{21}$)$R^{22}$, wherein $R^{21}$ is hydrogen, $C_1$-$C_6$ alkyl or an unsubstituted, mono- or di-substituted phenyl or naphthyl, wherein said phenyl and naphthyl substituents are each independently $C_1$-$C_6$ alkyl or $C_1$-$C_6$ alkoxy, and $R^{22}$ is —C(=O)$OR^{23}$, —C(=O)$R^{24}$ or —$CH_2OR^{25}$, wherein $R^{23}$ is hydrogen, $C_1$-$C_6$ alkyl, $C_3$-$C_7$ cycloalkyl, phenyl($C_1$-$C_3$) alkyl, mono($C_1$-$C_6$)alkyl substituted phenyl($C_1$-$C_3$)alkyl, mono($C_1$-$C_6$)alkoxy substituted phenyl($C_1$-$C_3$)alkyl or an unsubstituted, mono- or di-substituted phenyl or naphthyl, wherein said phenyl and naphthyl substituents are each independently $C_1$-$C_6$ alkyl or $C_1$-$C_6$ alkoxy, $R^{24}$ is hydrogen, $C_1$-$C_6$ alkyl, amino, mono($C_1$-$C_6$)alkylamino, di($C_1$-$C_6$) alkylamino, phenylamino, diphenylamino, (mono- or di-($C_1$-$C_6$)alkyl substituted phenyl)amino, (mono- or di-($C_1$-$C_6$) alkoxy substituted phenyl)amino, di(mono- or di-($C_1$-$C_6$) alkyl substituted phenyl)amino, di(mono- or di-($C_1$-$C_6$) alkoxy substituted phenyl)amino, morpholino, piperidino or an unsubstituted, mono- or di-substituted phenyl or naphthyl, wherein said phenyl or naphthyl substituents are each independently $C_1$-$C_6$ alkyl or $C_1$-$C_6$ alkoxy, and $R^{25}$ is hydrogen, —C(=O)$R^{23}$, $C_1$-$C_6$ alkyl, $C_1$-$C_3$ alkoxy ($C_1$-$C_6$)alkyl, phenyl($C_1$-$C_6$)alkyl, mono-alkoxy substituted phenyl($C_1$-$C_6$) alkyl or an unsubstituted, mono- or di-substituted phenyl or naphthyl, wherein said phenyl or naphthyl substituents are each independently $C_1$-$C_6$ alkyl or $C_1$-$C_6$ alkoxy; or two R' groups on the same atom together form an oxo group, a spiro-carbocyclic group containing 3 to 6 carbon atoms or a spiro-heterocyclic group containing 1 to 2 oxygen atoms and 3 to 6 carbon atoms including the spirocarbon atom, said spiro-carbocyclic and spiro-heterocyclic groups being annellated with 0, 1 or 2 benzene rings; or when R' is a substituent on an sp² hybridized carbon, each R' may be independently: hydrogen; $C_1$-$C_6$ alkyl; chloro; fluoro; bromo; $C_3$-$C_7$ cycloalkyl; an unsubstituted, mono- or di-substituted phenyl, wherein said phenyl substituents are each independently $C_1$-$C_6$ alkyl or $C_1$-$C_6$ alkoxy; —$OR^{26}$ or —OC(=O)$R^{26}$ wherein $R^{26}$ is hydrogen, amine, alkylene glycol, polyalkylene glycol, $C_1$-$C_6$ alkyl, phenyl($C_1$-$C_3$) alkyl, mono($C_1$-$C_6$)alkyl substituted phenyl($C_1$-$C_3$)alkyl, mono($C_1$-$C_6$)alkoxy substituted phenyl($C_1$-$C_3$)alkyl, ($C_1$-$C_6$)alkoxy($C_2$-$C_4$)alkyl, $C_3$-$C_7$ cycloalkyl, mono($C_1$-$C_4$) alkyl substituted $C_3$-$C_7$ cycloalkyl or an unsubstituted, mono- or di-substituted phenyl, wherein said phenyl substituents are each independently $C_1$-$C_6$ alkyl or $C_1$-$C_6$ alkoxy; a reactive substituent or a compatiblizing substituent; a 4-substituted phenyl, said phenyl substituent being a dicarboxylic acid residue or derivative thereof, a diamine residue or derivative thereof, an amino alcohol residue or derivative thereof, a polyol residue or derivative thereof, —($CH_2$)—, —($CH_2$)$_k$— or —[O—($CH_2$)$_k$]$_q$—, wherein "k" is an integer ranging from 2 to 6, and "q" is an integer ranging from 1 to 50, and wherein the substituent is connected to an aryl group on another photochromic material; —N($R^{27}$)$R^{28}$, wherein $R^{27}$ and $R^{28}$ are each independently hydrogen, $C_1$-$C_8$ alkyl, phenyl, naphthyl, furanyl, benzofuran-2-yl, benzofuran-3-yl, thienyl, benzothien-2-yl, benzothien-3-yl, dibenzofuranyl, dibenzothienyl, benzopyridyl, fluorenyl, $C_1$-$C_8$ alkylaryl, $C_3$-$C_8$ cycloalkyl, $C_4$-$C_{16}$ bicycloalkyl, $C_5$-$C_{20}$ tricycloalkyl or $C_1$-$C_{20}$ alkoxy($C_1$-$C_6$)alkyl, or $R^{27}$ and $R^{28}$ come together with the nitrogen atom to form a $C_3$-$C_{20}$ hetero-bicycloalkyl ring or a $C_4$-$C_{20}$ hetero-tricycloalkyl ring; a nitrogen containing ring represented by:

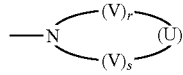

wherein each -V- is independently chosen for each occurrence from —$CH_2$—, —$CH(R^{29})$—, —$C(R^{29})_2$—, —CH(aryl)-, —C(aryl)$_2$- and —$C(R^{29})$(aryl)-, wherein each $R^{29}$ is independently $C_1$-$C_6$ alkyl and each aryl is independently phenyl or naphthyl; -U- is -V-, —O—, —S—, —S(O)—, —$SO_2$—, —NH—, —$N(R^{29})$— or —N(aryl)-; "s" is an integer ranging from 1 to 3; and "r" is an integer ranging from 0 to 3, provided that if "r" is 0 then -U- is the same as -V-; a group represented by:

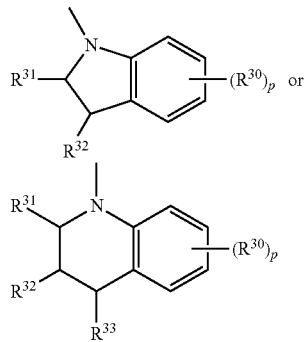

wherein each $R^{30}$ is independently $C_1$-$C_6$ alkyl, $C_1$-$C_6$ alkoxy, fluoro or chloro; $R^{31}$, $R^{32}$ and $R^{33}$ are each independently hydrogen, $C_1$-$C_6$ alkyl, phenyl or naphthyl, or $R^{31}$ and $R^{32}$ together form a ring of 5 to 8 carbon atoms; and "p" is an integer ranging from 0 to 3; or a substituted or an unsubstituted $C_4$-$C_{18}$ spirobicyclic amine or a substituted or an unsubstituted $C_4$-$C_{18}$ spirotricyclic amine, wherein said substituents are each independently aryl, $C_1$-$C_6$ alkyl, $C_1$-$C_6$ alkoxy or phenyl($C_1$-$C_6$)alkyl;

or R' may be a metallocenyl group; perfluoroalkyl or perfluoroalkoxy; —C(=O)$R^{34}$ or —$SO_2R^{34}$, wherein each $R^{34}$ is independently hydrogen, $C_1$-$C_6$ alkyl, —$OR^{35}$ or —$NR^{36}R^{37}$, wherein $R^{35}$, $R^{36}$ and $R^{37}$ are each independently hydrogen, $C_1$-$C_6$ alkyl, $C_5$-$C_7$ cycloalkyl, alkylene glycol, polyalkylene glycol or an unsubstituted, mono- or di-substituted phenyl, wherein said phenyl substituents are each independently $C_1$-$C_6$ alkyl or $C_1$-$C_6$ alkoxy; —C(=C($R^{33})_2$)$R^{39}$ wherein each $R^{33}$ is independently —C(=O)$R^{34}$, —$OR^{35}$, —OC(=O)$R^{35}$, —$NR^{36}R^{37}$, hydrogen, halogen, cyano, $C_1$-$C_6$ alkyl, $C_5$-$C_7$ cycloalkyl, alkylene glycol, polyalkylene glycol or an unsubstituted, mono- or di-substituted phenyl, wherein said phenyl substituents are each independently $C_1$-$C_6$ alkyl or $C_1$-$C_6$ alkoxy, and $R^{39}$ is hydrogen, $C_1$-$C_6$ alkyl, $C_5$-$C_7$ cycloalkyl, alkylene glycol, polyalkylene glycol or an unsubstituted, mono- or di-substituted phenyl, wherein said phenyl substituents are each independently $C_1$-$C_6$ alkyl or $C_1$-$C_6$ alkoxy; or —C≡$CR^{40}$ or —C≡N wherein $R^{40}$ is —C(=O)$R^{34}$, hydrogen, $C_1$-$C_6$ alkyl, $C_5$-$C_7$ cycloalkyl or an unsubstituted, mono- or di-substituted phenyl, wherein said phenyl substituents are each independently $C_1$-$C_6$ alkyl or $C_1$-$C_6$ alkoxy; or a least one pair of adjacent R' groups together form a group represented by:

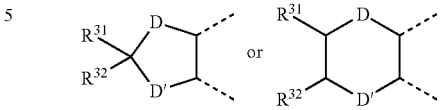

wherein D and D' are each independently oxygen or the group —$NR^{27}$—; or two R' groups on adjacent atoms come together form an aromatic or heteroaromatic fused group, said fused group being benzo, indeno, dihydronaphthalene, indole, benzofuran, benzopyran or thianaphthene.

According to certain non-limiting embodiments, at least one photoactive material may comprise at least one dichroic compound. Suitable dichroic compounds are described in detail in U.S. Pat. No. 7,097,303 at column 7, lines 6 to 60, the disclosure of which is incorporated by reference herein. Other non-limiting examples of suitable conventional dichroic compounds include azomethines, indigoids, thioindigoids, merocyanines, indans, quinophthalonic dyes, perylenes, phthaloperines, triphenodioxazines, indoloquinoxalines, imidazo-triazines, tetrazines, azo and (poly)azo dyes, benzoquinones, naphthoquinones, anthroquinone and (poly)anthroquinones, anthropyrimidinones, iodine and iodates. In another non-limiting embodiment, the at least one dichroic compound may be at least one polymerizable dichroic compound. That is, according to this non-limiting embodiment, the at least one dichroic material can comprise at least one group that is capable of being polymerized (i.e., a "polymerizable group" or "reactive group"). For example, although not limiting herein, in one non-limiting embodiment the at least one dichroic compound can have at least one alkoxy, polyalkoxy, alkyl, or polyalkyl substituent terminated with at least one polymerizable group. As described herein, dichroic compounds are capable of absorbing one of two orthogonal plane polarized components of transmitted radiation more strongly than the other, thereby resulting in linear polarization of the transmitted radiation. However, while dichroic compounds are capable of preferentially absorbing one of two orthogonal plane polarized components of transmitted radiation, if the molecules of the dichroic compound are not aligned, no net linear polarization of transmitted radiation will be achieved. That is, due to the random positioning of the molecules of the dichroic compound, selective absorption by the individual molecules can cancel each other such that no net or overall linear polarizing effect is achieved. Thus, it is generally necessary to align the molecules of a dichroic compound in order to achieve a net linear polarization. An alignment facility such as described herein may be used to facilitate the positioning of an optically anisotropic compound, such as a dichroic compound or photochromic-dichroic compound, thereby achieving a desired optical property or effect.

According to certain non-limiting embodiments, at least one photoactive material may comprise at least one photochromic-dichroic compound. As used herein the term "photochromic-dichroic" means displaying both photochromic and dichroic properties under certain conditions, which properties are at least detectable by instrumentation. Accordingly, "photochromic-dichroic compounds" are compounds displaying both photochromic and dichroic (i.e., linearly polarizing) properties under certain conditions, which properties are at least detectable by instrumentation. Thus, photochromic-dichroic compounds have an absorption spectrum for at least visible radiation that varies in response to at least actinic radiation and are capable of absorbing one of two orthogonal plane polarized components of at least transmitted radiation more strongly than the other. Additionally, as with conventional photochromic compounds discussed above, the photochromic-dichroic compounds disclosed herein can be thermally reversible. That is, the photochromic-dichroic compounds can switch from a first state to a second state in response to actinic radiation and revert back to the first state in response to thermal energy. Non-limiting examples of suitable photochromic-dichroic compounds that may be included in the guest phases described herein include those disclosed in U.S. Patent Application Publication 2005/0012998 at paragraphs [0089] to [0339], which disclosure is incorporated by reference herein. In addition, a general structure for certain photochromic-dichroic compounds suitable for use herein is presented in U.S. Pat. No. 7,342,112 at column 5, line 35 to column 31, line 3 and Table V spanning columns 97-102, which disclosure is incorporated by reference herein.

Further, according to various non-limiting embodiments disclosed herein, the guest phase may be adapted to allow the at least one photoactive material (i.e., the at least one photochromic compound, at least one dichroic compound, and/or at least one photochromic-dichroic compound) to switch from a first state to the second state at a desired rate and to revert back to the first state at a desired rate. Generally speaking, conventional photochromic/dichroic compounds can undergo a transformation from one isomeric form to another isomeric form in response to actinic radiation, with each isomeric form having a characteristic absorption spectrum and/or polarization characteristic. The photochromic compound, dichroic compound, or photochromic-dichroic compounds according to various non-limiting embodiments disclosed herein may undergo such an isomeric transformation. The rate or speed at which this isomeric transformation (and the reverse transformation) occurs depends, in part, upon the properties of material (i.e., the guest phase) surrounding the at least one photoactive material (i.e., the at least one photochromic compound, at least one dichroic compound, and/or at least one photochromic-dichroic compound). Although not limiting herein, it is believed by the inventors the rate of transformation of the photochromic/dichroic compound(s) will depend, in part, upon the flexibility of the guest phase; that is, the mobility or viscosity of the components that make up the guest phase. In particular, while not limiting herein, it is believed that the rate of transformation of the photochromic compound(s), dichroic compound(s), and/or photochromic-dichroic compound(s) will generally be faster in guest phases having a flexible composition than in guest phases having a stiff or rigid composition. Therefore, according to certain non-limiting embodiments disclosed herein, the guest phase may be adapted to allow the at least one photochromic compound(s), dichroic compound(s), and/or photochromic-dichroic compound(s) to transform between various isomeric states at desired rates. For example, although not limiting herein, the guest phase can be adapted by adjusting one or more of the structure, molecular weight, degree of polymerization, and the cross-link density of the at least one liquid crystal material.

For example, according to various non-limiting embodiments disclosed herein, the at least one photochromic-dichroic compound can have a first state having a first absorption spectrum, a second state having a second absorption spectrum that is different from the first absorption spectrum, and can be adapted to switch from the first state to the second state in response to at least actinic radiation and to revert back to the first state in response to thermal energy. Further, the dichroic or photochromic-dichroic compound can be dichroic (i.e., linearly polarizing) in one or both of the first state and the second state. For example, although not required, the dichroic or photochromic-dichroic compounds can be linearly polarizing in an activated colored state and non-polarizing in the bleached or faded (i.e., not activated) state. As used herein, the term "activated state" refers to the photochromic/dichroic compounds when exposed to sufficient actinic radiation to cause the at least a portion of the photochromic/dichroic compounds to switch from a first state to a second state. Further, although not required, the dichroic or photochromic-dichroic compounds can be dichroic in both the first and second states. While not limiting herein, for example, the dichroic or photochromic-dichroic compounds can linearly polarize visible radiation in both the activated state and the bleached state. Further, in this embodiment, the dichroic or photochromic-dichroic compounds can linearly polarize visible radiation in an activated state and can linearly polarize UV radiation in the bleached state.

In certain non-limiting embodiments of the phase-separating system described herein, the first liquid crystal monomer of the matrix phase and/or the at least one liquid crystal material of the guest phase may be a commercially available or known liquid crystal monomer or liquid crystal material, respectively. Alternatively, in specific non-limiting embodiments of the phase-separating polymer system described herein, at least one of the first liquid crystal monomer of the matrix phase and the at least one liquid crystal material of the guest phase may comprise at least one mesogen containing compound having a structure represented by Formula I:

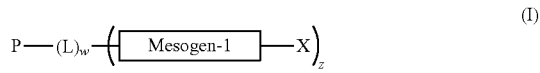

(I)

In Formula I, each X may be independently represented by: (i) a group —R; (ii) a group represented by the structure -$(L)_y$-R; (iii) a group represented by the structure -(L)-R; (iv) a group represented by the structure -$(L)_w$-Q; (v) a group represented by the structure:

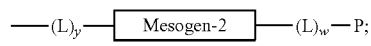

(vi) a group represented by -$(L)_y$-P; or (vii) a group represented by -$(L)_w$-[$(L)_w$-P]$_y$. Specific non-limiting examples of certain suitable mesogen containing compounds represented by Formula I may be found in U.S. application Ser. No. 12/163,116, filed Jun. 27, 2008, at paragraphs [0021]-[0046], [0051]-[0055], and [0147]-[0213], including Table 1, which disclosure is incorporated by reference herein. Further, in Formula I, each group P represents a reactive group. As used herein, the term "reactive group" means an atom, bond, or functional group that may react to form a bond, such as a covalent, polar covalent, or ionic bond with another molecule. For example, in certain non-limiting embodiments, a reactive group may react with a group, react with a comonomer or react with a reactive group on a developing polymer such that the structure corresponding to Formula I or a residue thereof is incorporated into the polymer. According to various non-limiting embodiment, each group P may be independently selected from reactive group such as a group Q, hydrogen, aryl, hydroxy($C_1$-$C_{18}$)alkyl, $C_1$-$C_{18}$ alkyl, $C_1$-$C_{18}$ alkoxy, amino($C_1$-$C_{18}$)alkylene, $C_1$-$C_{18}$ alkylamino, di-($C_1$-$C_{18}$)alkylamino, $C_1$-$C_{18}$ alkyl($C_1$-$C_{18}$)alkoxy, $C_1$-$C_{18}$ alkoxy($C_1$-

$C_{18}$)alkoxy, nitro, poly($C_1$-$C_{18}$)alkyl ether, ($C_1$-$C_{18}$)alkyl ($C_1$-$C_{18}$)alkoxy($C_1$-$C_{18}$)alkylene, polyethyleneoxy, polypropyleneoxy, ethylene, acryloyl, acryloyloxy($C_1$-$C_{18}$) alkylene, methacryloyl, methacryloyloxy($C_1$-$C_{18}$)alkylene, 2-chloroacryloyl, 2-phenylacryloyl, acryloylphenylene, 2-chloroacryloylamino, 2-phenylacryloylamino, oxetanyl, glycidyl, cyano, isocyanato($C_1$-$C_{18}$)alkyl, itaconic acid ester, vinyl ether, vinyl ester, a styrene derivative, main-chain and side-chain liquid crystal polymers, siloxane derivatives, ethyleneimine derivatives, maleic acid derivatives, fumaric acid derivatives, unsubstituted cinnamic acid derivatives, cinnamic acid derivatives that are substituted with at least one of methyl, methoxy, cyano and halogen, or substituted or unsubstituted chiral or non-chiral monovalent or divalent groups chosen from steroid radicals, terpenoid radicals, alkaloid radicals and mixtures thereof, wherein the substituents are independently chosen from $C_1$-$C_{18}$ alkyl, $C_1$-$C_{18}$ alkoxy, amino, $C_3$-$C_{10}$ cycloalkyl, $C_1$-$C_{18}$alkyl($C_1$-$C_{18}$)alkoxy, fluoro($C_1$-$C_{18}$)alkyl, cyano, cyano($C_1$-$C_{18}$)alkyl, cyano($C_1$-$C_{18}$)alkoxy or mixtures thereof.

Further, although not limiting herein, in certain non-limiting embodiments P may be a reactive group comprising a polymerizable group, wherein the polymerizable group may be any functional group adapted to participate in a polymerization reaction. Non-limiting examples of polymerization reactions include those described in the definition of "polymerization" in *Hawley's Condensed Chemical Dictionary Thirteenth Edition*, 1997, John Wiley & Sons, pages 901-902, which disclosure is incorporated herein by reference. For example, although not limiting herein, polymerization reactions include: "addition polymerization," in which free radicals are the initiating agents that react with the double bond of a monomer by adding to it on one side at the same time producing a new free electron on the other side; "condensation polymerization," in which two reacting molecules combine to form a larger molecule with elimination of a small molecule, such as a water molecule; and "oxidative coupling polymerization." In an additional non-limiting embodiment, P may be an unsubstituted or substituted ring opening metathesis polymerization precursor. Further, non-limiting examples of polymerizable groups include hydroxy, acryloyloxy, methacryloyloxy, 2-(acryloyloxy)ethylcarbamyl, 2-(methacryloyloxy)ethylcarbamyl, isocyanato, aziridine, allyloxycarbonyloxy, and epoxy, e.g., oxiranylmethyl. In other non-limiting embodiments, P may have a structure having a plurality of reactive groups, such as the reactive groups disclosed herein. For example, in certain non-limiting embodiments, P may have a structure having from 2 to 4 reactive groups, as described herein. In certain non-limiting embodiment, having multiple reactive groups on P may allow for more effective incorporation into a polymer or allow for cross-linking between individual polymer strands. Suitable non-limiting examples of P groups with multiple reactive groups include diacryloyloxy($C_1$-$C_{18}$)alkyl; diacryloyloxyaryl; triacryloyloxy($C_1$-$C_{18}$)alkyl; triacryloyloxyaryl; tetraacryloyloxy($C_1$-$C_{18}$)alkyl; tetraacryloyloxyaryl; dihydroxy($C_1$-$C_{18}$)alkyl; trihydroxy($C_1$-$C_{18}$)alkyl; tetrahydroxy($C_1$-$C_{18}$)alkyl; diepoxy($C_1$-$C_{18}$)alkyl; diepoxyaryl; triepoxy($C_1$-$C_{18}$)alkyl; triepoxyaryl; tetraepoxy($C_1$-$C_{18}$)alkyl; tetraepoxyaryl; diglycidyloxy($C_1$-$C_{18}$)alkyl; diglycidyloxyaryl; triglycidyloxy($C_1$-$C_{18}$)alkyl; triglycidyloxyaryl; tetraglycidyloxy($C_1$-$C_{18}$)alkyl; and tetraglycidyloxyaryl.

Further, with reference to Formula I, each group Q may represent hydroxy, amino, $C_2$-$C_{18}$ alkenyl, $C_2$-$C_{18}$ alkynyl, azido, silyl, siloxy, silylhydride, (tetrahydro-2H-pyran-2-yl) oxy, thio, isocyanato, thioisocyanato, acryloyloxy, methacryloyloxy, 2-(acryloyloxy)ethylcarbamyl, 2-(methacryloyloxy)ethylcarbamyl, aziridinyl, allyloxycarbonyloxy, epoxy, carboxylic acid, carboxylic ester, acryloylamino, methacryloylamino, aminocarbonyl, $C_1$-$C_{18}$ alkyl aminocarbonyl, aminocarbonyl($C_1$-$C_{18}$)alkylene, $C_1$-$C_{18}$ alkyloxycarbonyloxy, or halocarbonyl. In certain non-limiting embodiments, the group Q may act as a reactive group such that a mesogen containing compound comprising at least one group Q may be incorporated into the backbone of a polymer or copolymer. For example, Q may be a polymerizable group, such as those described herein, including a group selected from hydroxy, acryloyloxy, methacryloyloxy, 2-(acryloyloxy)ethylcarbamyl, 2-(methacryloyloxy)ethylcarbamyl, isocyanato, thio, thioisocyanato, aziridine, allyloxycarbonyloxy, carboxylic acid or carboxylic acid derivative, and epoxy, e.g., oxiranylmethyl. As used herein, the terms "(meth)acryloxy" and "(meth)acryloyloxy" are used interchangeably and refer to a substituted or unsubstituted prop-2-en-1-oyloxy structure.

As described herein and with reference to Formula I, the groups L, (L)$_y$ or (L)$_w$ represents a linking group having a linear length of from 1 to 500 atomic bonds. That is, for the general structure F-L-E, the longest linear length of the linking group between groups F and E (where groups F and E may each generally represent any of groups P, R, Q, X or a mesogen) ranges from 1 to 500 bonds (inclusive of the intervening atoms). It should be understood that when discussing the linear length of the linking group, one of ordinary skill in the art will understand that the length of the linking group may be calculated by determining the length of each of the bonds in the linear sequence and the distance occupied by the various intervening atoms in the linear sequence of the linking group and totaling the values. In certain non-limiting embodiments, the longest linear sequence of bonds may be at least 25 bonds between the linked groups. In other non-limiting embodiments, the longest linear sequence of bonds may be at least 30 bonds. In still other non-limiting embodiments, the longest linear sequence of bonds may be at least 50 bonds. It has been determined that, in certain non-limiting embodiments, a linking group L with at least 25 bonds improves a variety of benefits for the resulting mesogen containing compound. For example, a linking group of at least 25 bonds may improve the solubilities of the additives, such as the photochromic compounds in compositions comprising the mesogen containing compounds; may provide for faster or improved alignment properties of the compositions comprising the mesogen containing compounds; and/or may lower the viscosity of a composition comprising the mesogen containing compound.

Each group L may be independently chosen for each occurrence, the same or different, from a single bond, a polysubstituted, monosubstituted, unsubstituted or branched spacer independently chosen from aryl, ($C_1$-$C_{30}$)alkyl, ($C_1$-$C_{30}$)alkylcarbonyloxy, ($C_1$-$C_{30}$)alkylamino, ($C_1$-$C_{30}$)alkoxy, ($C_1$-$C_{30}$)perfluoroalkyl, ($C_1$-$C_{30}$)perfluoroalkoxy, ($C_1$-$C_{30}$)alkylsilyl, ($C_1$-$C_{30}$)dialkylsiloxyl, ($C_1$-$C_{30}$)alkylcarbonyl, ($C_1$-$C_{30}$)alkoxycarbonyl, ($C_1$-$C_{30}$)alkylcarbonylamino, ($C_1$-$C_{30}$)alkylaminocarbonyl, ($C_1$-$C_{30}$)alkyloxycarbonyloxy, ($C_1$-$C_{30}$)alkylaminocarbonyloxy, ($C_1$-$C_{30}$)alkylaminocarbonylamino, ($C_1$-$C_{30}$)alkylurea, ($C_1$-$C_{30}$)alkylthiocarbonylamino, ($C_1$-$C_{30}$)alkylaminocarbonylthio, ($C_2$-$C_{30}$)alkenyl, ($C_1$-$C_{30}$)thioalkyl, ($C_1$-$C_{30}$)alkylsulfonyl, ($C_1$-$C_{30}$)alkylsulfinyl, or ($C_1$-$C_{30}$)alkylsulfoyloxy, wherein each substituent is independently chosen from ($C_1$-$C_{18}$)alkyl, ($C_1$-$C_{18}$)alkoxy, fluoro, chloro, bromo, cyano, ($C_1$-$C_{18}$)alkanoate ester, isocyanato, thioisocyanato, or phenyl. According to the various non-limiting embodiments, "w" may be represented by an integer from 1 to 26, "y" may be represented by an integer from 2 to 25, and "z" is either 1 or 2. It should be noted that when more than one L group occurs in sequence, for example in the structure $(L)_y$ or $(L)_w$ where "y" and/or "w" is an integer greater than 1, then the adjacent L groups may or may not have the same structure. That is, for example, in a linking group having the structure $-(L)_3-$ or -L-L-L- (i.e., where "y" or "w" is 3), each group -L- may be independently chosen from any of the groups L recited above and the adjacent -L- groups may or may not have the same structure. For example, in one exemplary non-limiting embodiment, -L-L-L- may represent $-(C_1-C_{30})$alkyl-$(C_1-C_{30})$alkyl-$(C_1-C_{30})$alkyl- (i.e., where each occurrence of -L- is represented by $(C_1-C_{30})$alkyl, where each adjacent $(C_1-C_{30})$alkyl group may have the same or different number of carbons in the alkyl group). In another exemplary non-limiting embodiment, -L-L-L- may represent -aryl-$(C_1-C_{30})$alkylsilyl-$(C_1-C_{30})$alkoxy- (i.e., where each occurrence of -L- differs from the adjacent groups -L-). Thus, the structure of $(L)_y$ or $(L)_w$ should be understood as covering all possible combinations of the various sequences of the linking groups -L-, including those where some or all of the adjacent -L- groups are the same and where all the adjacent -L- groups are different.

Still with reference to Formula I, the group R represents an end group and may be selected from hydrogen, $C_1-C_{18}$ alkyl, $C_1-C_{18}$alkoxy, $C_1-C_{18}$ alkoxycarbonyl, $C_3-C_{10}$cycloalkyl, $C_3-C_{10}$cycloalkoxy, poly($C_1-C_{18}$alkoxy), or a straight-chain or branched $C_1-C_{18}$alkyl group that is unsubstituted or substituted with cyano, fluoro, chloro, bromo, or $C_1-C_{18}$ alkoxy, or poly-substituted with fluoro, chloro, or bromo.

As noted herein, at least one of the first liquid crystal monomer of the matrix phase and the at least one liquid crystal material of the guest phase may have a structure according to Formula I. That is, in one non-limiting embodiment, the first liquid crystal monomer of the matrix phase may have a structure according to Formula I and the structure of the at least one liquid crystal material of the guest phase may be another liquid crystal material, such as a commercially available liquid crystal material. Alternatively, in another non-limiting embodiment, the first liquid crystal monomer of the matrix phase may be another liquid crystal monomer, such as a commercially available liquid crystal monomer, and the structure of the at least one liquid crystal material of the guest phase may have a structure according to Formula I. In still another non-limiting embodiment, both the first liquid crystal monomer of the matrix phase and the liquid crystal material of the guest phase may have structures represented by Formula I, however, in these non-limiting embodiments, the structures of the compounds will not be the same. That is, while both the structure of the first liquid crystal monomer and the liquid crystal material may be generally represented by Formula I, the molecular structure of the first liquid crystal monomer will be different that the molecular structure of the liquid crystal material.

With further reference to Formula I, in certain non-limiting embodiments the groups Mesogen-1 and Mesogen-2 are each independently a rigid straight rod-like liquid crystal group, a rigid bent rod-like liquid crystal, or a rigid disc-like liquid crystal group. The structures for Mesogen-1 and Mesogen-2 may be any suitable mesogenic group known in the art, for example, but not limited to, any of those recited in Demus et al., "Flüssige Kristalle in Tabellen," VEB Deutscher Verlag für Grundstoffundustrie, Leipzig, 1974 or "Flüssige Kristalle in Tabellen II," VEB Deutscher Verlag für Grundstoffundustrie, Leipzig, 1984. Further, according to certain non-limiting embodiments, the groups Mesogen-1 and Mesogen-2 may independently have a structure represented by:

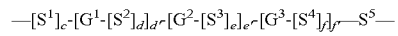

In certain non-limiting embodiments, the mesogen structure, above, is further defined such that each group each $G^1$, $G^2$, and $G^3$ may independently be chosen for each occurrence from: a divalent group chosen from: an unsubstituted or a substituted aromatic group, an unsubstituted or a substituted alicyclic group, an unsubstituted or a substituted heterocyclic group, and mixtures thereof, wherein substituents are chosen from: the group P, halogen, $C_1-C_{18}$ alkoxycarbonyl, $C_1-C_{18}$ alkylcarbonyl, $C_1-C_{18}$alkyloxycarbonyloxy, aryloxycarbonyloxy, perfluoro($C_1-C_{18}$)alkylamino, di-(perfluoro($C_1-C_{18}$) alkyl)amino, $C_1-C_{18}$ acetyl, $C_3-C_{10}$cycloalkyl, $C_3-C_{10}$cycloalkoxy, a straight-chain or branched $C_1-C_{18}$alkyl group that is mono-substituted with cyano, halo, or $C_1-C_{18}$ alkoxy, or poly-substituted with halo, and a group comprising one of the following formulae: $-M(T)_{(t-1)}$ and $-M(OT)_{(t-1)}$, wherein M is chosen from aluminum, antimony, tantalum, titanium, zirconium and silicon, T is chosen from organofunctional radicals, organofunctional hydrocarbon radicals, aliphatic hydrocarbon radicals and aromatic hydrocarbon radicals, and t is the valence of M. Further, in the mesogenic structure, "c", "d", "e", and "f" may be each independently chosen from an integer ranging from 0 to 20, inclusive and "d'", "e'" and "f'" are each independently an integer from 0 to 4 provided that a sum of d'+e'+f' is at least 1. Still with reference to the mesogenic structure above, the groups S represent spacer groups such that each of groups $S^1$, $S^2$, $S^3$, $S^4$, and $S^5$ may be independently chosen for each occurrence from a spacer unit chosen from:

(A) $-(CH_2)_g-$, $-(CF_2)_h-$, $-Si(CH_2)_g-$, or $-(Si(CH_3)_2O)_h-$, wherein "g" is independently chosen for each occurrence from 1 to 20 and "h" is a whole number from 1 to 16 inclusive;

(B) $-N(Z)-$, $-C(Z)=C(Z)-$, $-C(Z)=N-$, $-C(Z')_2-C(Z')_2-$, or a single bond, wherein Z is independently chosen for each occurrence from hydrogen, $C_1-C_{18}$ alkyl, $C_3-C_{10}$cycloalkyl and aryl, and Z' is independently chosen for each occurrence from $C_1-C_{18}$ alkyl, $C_3-C_{10}$ cycloalkyl and aryl; or (C) $-O-$, $-C(O)-$, $-C\equiv C-$, $-N=N-$, $-S-$, $-S(O)-$, $-S(O)(O)-$, $-(O)S(O)O-$, $-O(O)S(O)$ $O-$ or straight-chain or branched $C_1-C_{24}$ alkylene residue, said $C_1-C_{24}$ alkylene residue being unsubstituted, mono-substituted by cyano or halo, or poly-substituted by halo;

provided that when two spacer units comprising heteroatoms are linked together the spacer units are linked so that heteroatoms are not directly linked to each other and when $S_1$ and $S_5$ are linked to another group, they are linked so that two heteroatoms are not directly linked to each other.

According to specific non-limiting embodiments disclosed herein, in the structure of the mesogen, above, "c", "d", "e", and "f" each can be independently chosen from an integer ranging from 1 to 20, inclusive; and "d'", "e'" and "f'" each can be independently chosen from 0, 1, 2, 3, and 4, provided that the sum of d'+e'+f' is at least 1. According to other non-limiting embodiments disclosed herein, "c", "d", "e", and "f" each can be independently chosen from an integer ranging from 0 to 20, inclusive; and "d'", "e'" and "f'" each can be independently chosen from 0, 1, 2, 3, and 4, provided that the sum of d'+e'+f' is at least 2. According to still other non-limiting embodiments disclosed herein, "c", "d", "e", and "f" each can be independently chosen from an integer ranging from 0 to 20, inclusive; and "d'", "e'" and "f'" each can be independently chosen from 0, 1, 2, 3, and 4, provided that the sum of d'+e'+f' is at least 3. According to still other non-limiting embodiments disclosed herein, "c", "d", "e", and "f" each can be independently chosen from an integer ranging from 0 to 20, inclusive; and "d'", "e'" and "f'" each can be independently chosen from 0, 1, 2, 3, and 4, provided that the sum of d'+e'+f' is at least 1.

Finally, with reference to Formula I, the structure of the mesogen containing compound in the various non-limiting embodiments of the present disclosure requires that:

when the group X is represented by —R, then "w" is an integer from 1 to 25 and "z" is 1;

when the group X is represented by -(L)$_y$-R, then "w" is 1, "y" is an integer from 2 to 25, and "z" is 1;

when the group X is represented by -(L)-R, then "w" is an integer from 3 to 26 and "z" is 2;

when the group X is represented by -(L)$_w$-Q, then if the group P in Formula I is represented by the group Q, which may be the same or different than the other group Q, "w" is 1, and "z" is 1 and if the group P is other than the group Q (i.e., P is another group as defined herein), then each "w" is independently an integer from 1 to 26 and "z" is 1;

when the group X is represented by the structure

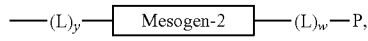

then "w" is 1, "y" is an integer from 2 to 25, and "z" is 1;

when the group X is represented by -(L)$_y$-P, then "w" is 1, "y" is an integer from 2 to 26, and "z" is 1, and -(L)$_y$- comprises a linear sequence of at least 25 bonds between the mesogen and P; and when the group X is represented by -(L)$_w$-[(L)$_w$-P]$_y$, then each "w" is independently an integer from 1 to 25, "y" is an integer from 2 to 6, and "z" is 1.

According to certain non-limiting embodiments of the mesogen containing compound, the mesogen containing compound may be a functional mono-mesogen containing compound (i.e., a mesogen containing compound that contains one mesogenic structure). According to one non-limiting embodiment, the functional mono-mesogen containing compound may have a structure represented by Formula I, wherein the group X is represented by —R, "w" is an integer from 1 to 25, and "z" is 1. According to another non-limiting embodiment, the functional mono-mesogen containing compound may have a structure represented by Formula I, wherein the group X is represented by -(L)$_y$-R, "w" is 1, "y" is an integer from 2 to 25, and "z" is 1.

According to other non-limiting embodiments of the mesogen containing compound, the mesogen containing compound may be a functional bi-mesogen containing compound (i.e., a mesogen containing compound that contains two mesogenic structures (which may be the same or different)). For the various non-limiting embodiments, the structures of the functional bi-mesogen containing compound will have a long chain linking group between the two mesogenic units. According to one non-limiting embodiment, the functional bi-mesogen containing compound may have a structure represented by Formula I, wherein the group X is represented by -(L)-R, "w" is an integer from 3 to 26, and "z" is 2. According to another non-limiting embodiment, the functional bi-mesogen containing compound may have a structure represented by Formula I, wherein the group X is represented by

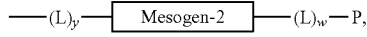

"w" is 1, "y" is an integer from 2 to 25, and "z" is 1.

In another non-limiting embodiment of the mesogen containing compound, the mesogen containing compound may be a functional mono-mesogen containing compound (i.e., a mesogen containing compound that contains one mesogenic structure). According to specific non-limiting embodiments, the functional mono-mesogen containing compound may have a structure represented by Formula I, wherein the group X is represented by -(L)$_w$-Q and if the group P in Formula I is represented by the group Q, which may be the same or different than the other group Q, "w" is 1, and "z" is 1 and if the group P is other than the group Q, then each "w" is independently and integer from 1 to 26 and "z" is 1. According to specific non-limiting embodiments, the structure of this embodiment may contain two groups Q which may be the same or different and may be reactive with one or more other monomeric units which may react to form a copolymer. According to these non-limiting embodiments, the mesogen containing compound may be a di-functional monomer that may be incorporated into a polymer backbone, for example a polymer backbone in the guest phase. That is, the mesogen containing group will be incorporated into the polymer backbone and be attached at each end to the formed polymer by the residues of the group(s) Q. In another non-limiting embodiment, the functional mono-mesogen containing compound may have a structure represented by Formula I, wherein the group X is represented by the -(L)$_y$-P, "w" is 1, "y" is an integer from 2 to 25, and "z" is 1; and -(L)$_y$-comprises a linear sequence of at least 25 bonds between the mesogen and P. In specific non-limiting embodiments, -(L)$_y$- may comprise a linear sequence of at least 50 bonds between the mesogen and P. In another non-limiting embodiment, the mesogen containing compound may have a structure according to Formula I wherein the group X is represented by the structure -(L)$_w$-[(L)$_w$-P]$_y$, each "w" is independently an integer from 1 to 25, "y" is an integer from 2 to 6, and "z" is 1. According to these embodiments, the mesogen containing compound may have from 3 to 7 reactive groups P.

Other non-limiting embodiments of suitable liquid crystal monomers for the matrix phase or liquid crystal materials for the guest phase include materials having a structure represented by Formula III:

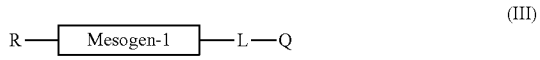

where R, Mesogen-1, L, and Q are as defined herein.

According to various non-limiting embodiments, the at least partially cured matrix phase may comprise a polymeric residue of at least a first liquid crystal monomer. According to these embodiments, the at least first liquid crystal monomer may be any of the liquid crystal monomers described herein with reference to a matrix phase of a phase-separated polymer. At least partially curing the matrix phase may include at least partially polymerizing the at least first liquid crystal monomer of the matrix phase as described herein. For example, at least a portion of the first liquid crystal monomer of the matrix phase can be at least partially polymerized and thereby separated from at least a portion of the at least one photoactive material and the at least one liquid crystal material of the guest phase to produce a matrix phase comprising the polymeric residue of at least the first liquid crystal monomer. Non-limiting methods of polymerization that can be used in conjunction with various non-limiting embodiments disclosed herein include photo-induced polymerization and thermally-induced polymerization.

According to specific non-limiting embodiments of the phase-separating polymer system of the present disclosure, the at least one liquid crystal material of the guest phase may comprise at least one second liquid crystal monomer. According to certain non-limiting embodiments where the at least one liquid crystal material comprises at least one second liquid crystal monomer, the at least one second liquid crystal monomer may be at least partially polymerized. In these non-limiting embodiments, the guest phase may comprise a residue of at least one second liquid crystal monomer, such that the guest phase is an at least partially cured guest phase. Specific non-limiting examples of the at least second liquid crystal monomer may comprise a liquid crystal monomer such as at least one mesogen containing compound represented by Formulae I or III. Other suitable liquid crystal monomers for the at least second liquid crystal monomer include the other liquid crystal monomers that are described or referenced elsewhere in this disclosure.

In specific non-limiting embodiments, the at least one second liquid crystal monomer may be different from the first liquid crystal monomer. For example, in certain non-limiting embodiments, the at least one second liquid crystal monomer may be a liquid crystal monomer that polymerizes at a different polymerization rate than the at least one first liquid crystal monomer, such as, for example at a faster polymerization rate or a slower polymerization rate compared to the polymerization rate of the at least one first liquid crystal monomer. Alternatively or in addition, the at least one second liquid crystal monomer of the guest phase may polymerize via a different polymerization initiation method or polymerization mechanism than the at least one first liquid crystal monomer of the matrix phase. For example, but not-limiting herein, at least one second liquid crystal monomer may polymerize by a thermal initiation and the at least one first liquid crystal monomer may polymerize by initiation by UV irradiation; or the at least one second liquid crystal monomer may polymerize by a free radical addition mechanism and the at least one first liquid crystal monomer may polymerize by a condensation mechanism. One having ordinary skill in the art will recognize that other initiation methods or polymerization mechanisms for the first liquid crystal monomer(s) and the second liquid crystal monomer(s) may be used in various non-limiting embodiments of the present disclosure and such methods and mechanisms are to be considered as being included in the present disclosure.

Specific non-limiting embodiments of the phase-separating polymer system comprise a guest phase comprising an at least second liquid crystal monomer, wherein the guest phase may at least partially cure at a different rate than the matrix phase. For example, according to one non-limiting embodiment, the guest phase may at least partially cure at a rate that is slower than the rate at which the matrix phase at least partially cures. According to another non-limiting embodiment, the guest phase may at least partially cure at a rate that is faster than the rate at which the matrix phase at least partially cures.

According to certain non-limiting embodiments, the phase-separating polymer system may comprise an at least second crystal monomer, where the at least second liquid crystal monomer may polymerize by a different initiation method than the at least first liquid crystal. Therefore according to this non-limiting embodiment, the guest phase may at least partially cure by a different polymerization initiation method than the matrix phase. In other non-limiting embodiments, the phase-separating polymer system may comprise an at least second crystal monomer, where the at least second liquid crystal monomer may polymerize by a different polymerization mechanism than the at least first liquid crystal. Therefore according to this non-limiting embodiment, the guest phase may at least partially cure by a different polymerization mechanism than the matrix phase.

According to various non-limiting embodiments of the phase-separating polymer system, the guest phase, for example, the uncured guest phase or the at least partially cured guest phase may have a lower Fischer microhardness compared to the at least partially cured matrix phase. Fischer microhardness, as used herein, is a measurement of the hardness (or softness) of system, a polymer, phase, or polymerized phase, such as, for example, the uncured or at least partially cured guest phase or the at least partially cured matrix phase. It is believed that the increased flexibility in the structure of the at least one liquid crystal material, for example, the mesogen containing compounds disclosed herein may impart certain desirable characteristics to a composition such as the guest phase or the at least partially cured guest phase. For example, while not wishing to be limited by any interpretation, it is believed that flexibility, such as flexibility in the at least one liquid crystal material, for example, in the one or more linking group "L" in the mesogen containing compound according to Formulae I and III or residue thereof, may result in a guest phase or the at least partially cured guest phase having a "softer" structure. As used herein, with reference to the character of one or more of the phases (including both uncured and at least partially cured phases) of the phase-separated polymer systems described herein, the term "softer" refers to compositions exhibiting a Fischer microhardness typically less than 150 Newtons/mm$^2$, e.g., from 0 to 149.9 Newtons/mm$^2$. Cured phases of the phase-separating polymer system having a softer structure may display desired or improved characteristics, for example, improved liquid crystal character, improved photochromic performance, improved dichroic performance, and/or improved photochromic-dichroic performance. For example, for uncured phases and at least partially cured phases such as a liquid crystal polymer, a liquid crystal copolymer or blends of liquid crystal (co)polymers, it may be desirable to have hard and/or soft segments or components in the polymer. The concept that cured polymers may be composed of hard and soft segments or components is known in the art (see, for example, "Structure-Property-Relationship in Polyurethanes", Polyurethane Handbook, G. Oertel, editor, 2nd ed. Hanser Publishers, 1994, pp 37-53, incorporated by reference herein). Thus, for example herein, a hard phase, segment or component may include a more crystalline or semi-crystalline region within the at least partially cured polymer structure or phase, whereas a soft phase, segment or component includes a more amorphous, non-crystalline or rubbery region. In certain non-limiting embodiments, the contribution of the structure of a component, material, monomer or monomer residue in a phase to either the hardness or softness of the resulting phase, such as the guest phase or the matrix phase, may be determined, for example, by measuring the Fischer microhardness of a cured polymer comprising component, material, monomer or monomer residue. The physical properties of the phases are derived from their molecular structure and are determined by the choice of building blocks, e.g., the choice of materials, monomers, the at least first liquid crystal monomer, the at least second liquid crystal monomer, and other reactants, additives, the ratio of hard and soft segments, and the supramolecular structures caused by atomic interactions between materials and/or polymer chains. Materials and methods for the preparation of polymers, for example, polyurethanes, are described in Ullmann's Encyclopedia of Industrial Chemistry, 5th ed., 1992, Vol. A21, pages 665-716, which description is incorporated by reference herein.

For example, in the photochromic, dichroic, and/or photochromic-dichroic compounds and cured phases, layers, and coatings described herein, it is believed that the soft segments or components of the phases in the layers and coatings, including cured layers and coatings, may provide an improved solubilizing environment for the photochromic, photochromic-dichroic, and/or dichroic compound(s) to reversibly transform from a first state to a second state, while the hard segments or components of the phases, such as the matrix phase, or coating provides structural integrity for the material or coating and/or prevent migration of the transformable compounds. In one non-limiting application for photochromic, dichroic and/or photochromic-dichroic compound(s), a balance of soft and hard materials in one or more phases may achieve desired benefits of a suitable cured material or cured layer or coating, i.e., a material, layer, or coating having a phase with a Fischer microhardness ranging from 0 to 150 Newtons/mm$^2$ that also exhibits good photochromic, dichroic and/or photochromic-dichroic response characteristics. In another non-limiting application, the photochromic, dichroic and/or photochromic-dichroic compound(s) may be located in a guest phase, such as an uncured or at least partially cured guest phase having a Fischer microhardness less than 60 Newtons/mm$^2$, e.g. from 0 to 59.9 Newtons/mm$^2$, or alternatively from 5 to 25 Newtons/mm$^2$, which may be included in a matrix phase comprising one or more harder polymeric material to provides structural strength. In a further non-limiting application, the photochromic, dichroic and/or photochromic-dichroic compound(s) may be within a soft polymeric guest phase incorporated in a hard polymeric matrix phase coating or material, e.g., a matrix phase having a Fischer microhardness greater than 150 Newtons/mm$^2$, e.g. from 150 to 200 Newtons/mm$^2$ or even higher.

According to other non-limiting embodiments of phase-separating polymer systems disclosed herein, it may be desirable to have an at least partially cured matrix phase that is softer than an at least partially cured guest phase. For example, according to certain non-limiting embodiments, the present disclosure may provide a switchable liquid crystal cell comprising a soft matrix phase and a harder guest phase. Thus, according to these non-limiting embodiments, the phase-separating polymer system may comprise an at least partially cured guest phase having a higher Fischer microhardness compared to the at least partially cured matrix phase. Non-limiting examples of hard (i.e., high) Fischer microhardness values and soft (i.e., low) Fischer microhardness are set forth above. According to these non-limiting embodiments, the at least one photoactive material may selectively concentrate in the matrix phase upon phase separation. The at least one photoactive material may display improved photochromic and/or dichroic properties in the matrix phase compared to a photoactive material in a harder guest phase.

According to certain non-limiting embodiments of the phase-separating polymer systems, the at least one photoactive material may be adapted to switch from a first state to a second state in response to at least actinic radiation and to revert back to the first state in response to thermal energy. For example, in those non-limiting embodiments where the at least one photoactive material is selected from photochromic compounds or photochromic-dichroic compounds, the at least one photoactive material may switch from a first non-colored or clear state to a second colored state in response to at least actinic radiation and revert back to the non-colored/clear state from the colored state in response to thermal energy. In other non-limiting embodiments where the at least one photoactive material is selected from dichroic compounds or photochromic-dichroic compounds, the at least one photoactive material may switch from a first non-polarized state to a second polarized state in response to at least actinic radiation and revert back to the non-polarized state from the polarized state in response to thermal energy. In other non-limiting embodiments of the dichroic compounds or photochromic-dichroic compounds, the first state may be a polarized state and the second state may be a non-polarized state. In still other non-limiting embodiments, both the first and second states of the dichroic compounds or photochromic-dichroic compounds may be polarizing, for example, polarizing in the same general direction in both states or in other non-limiting embodiments, may polarize radiation in different directions in one state compared to the other. In specific non-limiting embodiments of the phase-separating polymer systems described herein, the at least one photoactive material may have improved performance characteristics when incorporated into the guest phase than a photoactive material in the at least partially cured matrix phase. One non-limiting example of an improved performance characteristic of the photoactive material is faster kinetics. As used herein the term "faster kinetics" when used in reference to a photoactive material, such as a photochromic compound, a dichroic compound, or photochromic-dichroic compound capable of transitioning for a first state to a second state in response to absorption of at least actinic radiation and transitioning from the second state back to the first state in response to thermal energy, means that the kinetic rate of at least one of the transition from the first state to the second state or the transition from the second state back to the first state is faster (i.e., the transition takes a shorter amount of time), as measured by the T½, for a photoactive material in a first environment, such as the guest phase, compared to the photoactive material in a second environment, such as the matrix phase. As used herein the term "T½" is a measurement of the amount of time necessary for the optical density of a photoactive material to fade to a value of one half of its activated value.

According to other non-limiting embodiments of the phase-separating polymer systems of the present disclosure, at least a portion of at least one of the polymeric residue of at least the first liquid crystal monomer of the at least partially cured matrix phase and the at least one liquid crystal material of the guest phase, for example in the uncured guest phase or the at least partially cured guest phase, may be at least partially ordered. According to these non-limiting embodiments, at least a portion of the polymeric residue of at least the first liquid crystal monomer of the at least partially cured matrix phase and at least a portion of the at least one liquid crystal material of the guest phase may be at least partially ordered such that the at least partially ordered portion of the polymeric residue of at least the first liquid crystal monomer has a first general direction and the at least partially ordered portion of the at least one liquid crystal material of the guest phase has a second generally direction that is generally parallel to the first general direction. As set forth in detail elsewhere herein, in certain non-limiting embodiments, at least a portion of the polymeric residue of at least the first liquid crystal monomer of the matrix phase and at least a portion of the at least one liquid crystal material of the guest phase may be at least partially ordered prior to at least partially curing at least a portion of the matrix phase or alternatively, the polymeric residue of at least the first liquid crystal monomer of the matrix phase and at least a portion of the at least one liquid crystal material of the guest phase may be at least partially ordered subsequent to at least partially curing at least a portion of the matrix phase and even, according to specific non-limiting embodiments, after at least partially curing at least a portion of the guest phase. Methods for at least partially ordering the polymeric residue of at least the first liquid crystal monomer of the matrix phase (which may in certain non-limiting embodiments be an at least partially cured matrix phase) and at least a portion of the at least one liquid crystal material of the guest phase (which may in certain non-limiting embodiments be an at least partially cured guest phase) are set forth in detail herein and include, but are not limited to, exposing the liquid crystal materials or monomers (or residues of monomers) to at least one of a magnetic field, an electric field, linearly polarized infrared radiation, linearly polarized ultraviolet radiation, linearly polarized visible radiation, and shear force. Other non-limiting embodiments of at least partially ordering at least a portion of the liquid crystal materials or monomers (or residues of monomers) of the phases may include the use of an alignment facility or alignment material, such as described in detail herein.

According to further non-limiting embodiments of the phase-separating polymer systems described herein, at least one of the at least partially cured matrix phase and the guest phase may further comprise one or more additive selected from a liquid crystal, a liquid crystal control additive, a non-linear optical material, a dye, a dichroic dye (such as those described herein), an alignment promoter, a kinetic enhancer, a photoinitiator, a thermal initiator, a surfactant, a polymerization inhibitor, a solvent, a light stabilizer, a heat stabilizer, a mold release agent, a rheology control agent, a leveling agent, a free radical scavenger, a coupling agent, a tilt control additive, a block or non-block polymeric material or an adhesion promoter. Non-limiting examples of the one or more additives are described in detail in U.S. application Ser. No. 12/163,180, filed Jun. 27, 2008, entitled "Formulations Comprising Mesogen Containing Compounds" at paragraphs [0085]-[0105], which disclosure is incorporated by reference herein.

Still other non-limiting embodiments of the present disclosure provide for optical elements. According to various non-limiting embodiments, the optical elements may comprise a substrate and an at least partial layer or coating on at least a portion of the substrate, where the layer comprises a phase-separating polymer system, such as a liquid crystal phase-separating system, as set forth herein. As used herein the term "layer" includes layers, coatings, and films, which may be at least partially cured. According to certain non-limiting embodiments of the optical elements, the liquid crystal phase-separating polymer system may comprise an at least partially cured matrix phase comprising a polymeric residue of at least a first liquid crystal monomer, and a guest phase comprising at least one photoactive material selected from photochromic compounds, dichroic compounds, or photochromic-dichroic compounds and at least one liquid crystal material. At least a portion of the guest phase may separate from at least a portion of the matrix phase during the at least partial curing of the polymeric residue of at least the first liquid crystal monomer. Non-limiting examples of the phase-separating polymer systems are described in detail herein. For example, in one non-limiting embodiment, at least one of the first liquid crystal monomer of the matrix phase and the at least one liquid crystal material of the guest phase may be a mesogen containing material having a structure represented by Formula I:

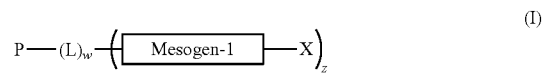

where potential structures of P, L, Mesogen-1, and X; ad values for "w" and "z" are set forth in detail herein, or a mesogen containing material having a structure represented by Formula III, as set forth herein. In other non-limiting embodiments, the first liquid crystal monomer of the matrix phase and/or the liquid crystal material of the matrix phase may comprise commercially available or known liquid crystal monomer or liquid crystal materials. Examples of optical elements include, but are not limited to, elements or devices chosen from ophthalmic elements and devices, display elements and devices, windows, mirrors, and active and passive liquid crystal cell elements and devices.

Generally speaking, substrates that are suitable for use in conjunction with various non-limiting embodiments of the optical elements disclosed herein include, but are not limited to, substrates formed from organic materials, inorganic materials, or combinations thereof (for example, composite materials). Non-limiting examples and detailed descriptions of substrates that can be used in accordance with various non-limiting embodiments disclosed herein are described in more detail in U.S. application Ser. No. 12/163,180, filed Jun. 27, 2008, entitled "Formulations Comprising Mesogen Containing Compounds" at paragraphs [0134]-[0143], which disclosure is incorporated by reference herein.

In specific non-limiting embodiments of the optical elements, at least a portion of the polymeric residue of the at least first liquid crystal monomer of the at least partially cured matrix phase and at least a portion of the at least one liquid crystal material of the guest phase are at least partially ordered. The various non-limiting embodiments may be at least partially ordered such that the at least partially ordered portion of the polymeric residue of the at least first liquid crystal monomer of the at least partially cured matrix phase has a first general direction and the at least partially ordered portion of the at least one liquid crystal material of the guest phase has a second general direction that is generally parallel to the first general direction. Methods of at least partially ordering the liquid crystal materials and monomers (including residues of monomers) of the phases are described in detail herein.

In specific non-limiting embodiments of the optical elements, the at least one liquid crystal material of the guest phase may comprise a residue of at least one second liquid crystal monomer, which may be at least partially polymerized such that the guest phase is an at least partially cured guest phase. As described herein, in certain non-limiting embodiments, the at least one second liquid crystal monomer of guest phase may polymerize at a different rate, such as a slower rate or a faster rate, than the at least first liquid crystal monomer of the matrix phase. For example, the at least one second liquid crystal monomer of guest phase may polymerize by a different initiation method or a different polymerization mechanism than the at least first liquid crystal monomer of the matrix phase. Thus, according to one non-limiting embodiments the at least a portion of the guest phase may cure at a slower rate than the at least a portion of the matrix phase and according to another non-limiting embodiments the at least a portion of the guest phase may cure at a faster rate than the at least a portion of the matrix phase.

According to other non-limiting embodiments, the at least partial layer on at least a portion of a surface of the substrate may be adapted to switch from a first state to a second state in response to at least actinic radiation and to revert back to the first state in response to thermal energy. As discussed in detail herein, the at least partial layer comprises a liquid crystal phase-separated system comprising a guest phase with at least one photoactive material therein. The at least one photoactive material may be selected from photochromic compounds, dichroic compounds, and photochromic-dichroic compounds, each of which may be adapted to switch from a first state to a second state in response to at least actinic radiation and revert back to the first state in response to thermal energy. In other non-limiting embodiments, the at least partial layer on at least a portion of a surface of the substrate may be adapted to linearly polarize at least transmitted radiation in at least one of the first state and the second state. For example, the at least one photoactive compound may comprise dichroic compounds and/or photochromic-dichroic compound such that the at least partial layer may be adapted to linearly polarize at least transmitted radiation in at least one of the first state and the second state. In other non-limiting embodiment, the at least partial layer may comprise one or more elements capable of linearly polarizing at least transmitted radiation one or both of the first and second states.

Further non-limiting embodiments of the optical elements may comprise one or more additional at least partial layers on at least a portion of a surface the substrate, where the one or more additional layers may be selected from a tie layer, a primer layer, an abrasion resistant coating, a hard coating, a protective coating, a reflective coating, a conventional photochromic coating, an anti-reflective coating, a linearly polarizing coating, a circularly polarizing coating, an elliptically polarizing coating, a transitional coating, or combinations thereof. In certain non-limiting embodiments, one or more of the additional at least partial layers may be coated onto the surface of the substrate prior to the at least partial layer comprising the liquid crystal phase-separating system. That is, the one or more additional at least partial layers may be between the substrate surface and the liquid crystal phase-separating system layer. In other non-limiting embodiments, one or more of the additional at least partial layers may be coated onto the substrate after to the at least partial layer comprising the liquid crystal phase-separating system. That is, the one or more additional at least partial layers may be coated onto at least a portion of an outer surface of the liquid crystal phase-separating system layer or alternatively on an outer surface of one or more other additional layers coated on the outer surface of the liquid crystal phase-separating system layer. In still other non-limiting embodiments, one or more of the additional layers may be on at least a different portion of the substrate, for example on a different surface of the substrate than the liquid crystal phase-separating system layer, such as an opposite surface of the substrate. Non-limiting examples of the at least one additional at least partial layers are described in detail herein and in U.S. application Ser. No. 12/163,180, filed Jun. 27, 2008, entitled "Formulations Comprising Mesogen Containing Compounds" at paragraphs [0144]-[0151], which disclosure is incorporated by reference herein.

Still other non-limiting embodiments of the present disclosure provide for articles of manufacture comprising an at least partially cured matrix phase comprising a polymeric residue of at least a first liquid crystal monomer; and a guest phase comprising at least one photoactive material and at least one liquid crystal material, such as the liquid crystal materials discussed herein, wherein at least a portion of the guest phase separates from at least a portion of the matrix phase during the at least partial curing of the polymeric residue of the first liquid crystal monomer. The at least one photoactive material may be selected from photochromic compounds, dichroic compounds, or photochromic-dichroic compounds, as detailed herein. As set forth herein, the at least one liquid crystal material may be at least one second liquid crystal monomer or residue thereof, as described herein. In specific non-limiting embodiments, at least one of the first liquid crystal monomer and the at least one liquid crystal monomer may comprise at least one mesogen containing compound having a structure represented by Formulae I or II, as described in detail herein. Non-limiting examples of articles of manufacture include molded articles, assembled articles and cast articles. For example, articles of manufacture, such as, molded assembled, or cast articles for use in applications and various related devices, such as, but not limited to, use in optical data storage applications, as photomasks, as decorative pigments; in cosmetics and for security applications (see, for example U.S. Pat. No. 6,217,948, which disclosure is incorporated by reference herein); as curable resins for medical, dental, adhesive and stereolithographic applications (see, for example, U.S. Pat. No. 7,238,831, which disclosure is incorporated by reference herein).

Other non-limiting embodiments of the present disclosure provide methods of forming the phase-separating polymer systems (such as the liquid crystal phase-separating polymer systems), the optical elements, and the articles of manufacture described herein. For example, according to certain non-limiting embodiments, the present disclosure provides methods for forming a liquid crystal phase-separating photochromic, dichroic, or photochromic-dichroic polymer system, which may be incorporated into an optical element or article of manufacture. According to these methods, forming a liquid crystal phase-separating photochromic, dichroic, or photochromic-dichroic polymer system may comprise providing a phase-separating polymer forming composition comprising a matrix phase forming material, a guest phase forming material and at least one photoactive material; at least partially ordering at least a portion of the matrix phase forming material and at least a portion of the guest phase forming material; causing at least a portion of the guest phase forming material to separate from at least a portion of the matrix phase forming material; and at least partially curing at least a portion of the matrix phase forming material to produce an at least partially cured matrix phase.

According to non-limiting embodiments of these methods, the matrix phase forming material may comprise at least a first liquid crystal monomer, such as described herein; the guest phase forming material may comprise at least one liquid crystal material, such as described herein, and the at least one photoactive material may be selected from photochromic compounds, dichroic compounds, or photochromic-dichroic compounds, as described herein.

According to these non-limiting embodiments, at least partially ordering at least a portion of the matrix phase forming material and at least a portion of the guest phase forming material may include at least partially ordering the at least first liquid crystal monomer of the matrix phase forming material and at least partially ordering the at least one liquid crystal material of the guest phase forming material such that the at least partially ordered portion of the at least first liquid crystal monomer of the matrix phase forming material has a first general direction and the at least partially ordered portion of the at least one liquid crystal material of the guest phase forming material has a second general direction that is generally parallel to the first general direction. In other non-limiting embodiments, the ordering step may further comprise at least partially ordering the at least one photoactive material, for example, when the at least one photoactive material comprises dichroic compound(s) and/or photochromic-dichroic compound(s), such that the at least one photoactive material has a third general direction that is generally parallel to the first general direction and the second general direction. Methods of at least partially ordering at least a portion of the at least first liquid crystal monomer of the matrix phase forming material, the at least a portion of the at least one liquid crystal material of the guest phase forming material, and in certain non-limiting embodiments, the at least one photoactive material are described in detail herein and may include ordering the materials by exposing at least a portion of the materials to at least one of a magnetic field, an electric field, linearly polarized infrared radiation, linearly polarized ultraviolet radiation, linearly polarized visible radiation, and shear force. Other non-limiting embodiments of at least partially ordering at least a portion of the materials may include the use of an alignment facility or alignment material, as described in detail herein.

According to specific non-limiting embodiments of the methods, the at least one liquid crystal material of the guest phase forming material may be chosen from a mesogen containing compound or a second liquid crystal monomer. Non-limiting examples of mesogen containing compounds and liquid crystal monomers that may be used in these non-limiting embodiments of the at least one liquid crystal material of the guest phase forming material are described in detail herein. In certain non-limiting embodiments of the methods, the at least one liquid crystal material of the guest phase forming material may comprise at least one mesogen containing compound having a structure represented by Formulae I and III as set forth in detail herein. In other non-limiting embodiments of the methods, the first liquid crystal monomer of the matrix phase forming material may comprise at least one mesogen containing compound having a structure represented by Formulae I and III as set forth in detail herein.

With reference to the method step of causing at least a portion of the guest phase forming material to separate from at least a portion of the matrix phase forming material, the separation of the at least a portion of the guest phase forming material from at least a portion of the matrix phase forming material may be affected by using one of polymerization induced phase-separation and solvent induced phase-separation, as described herein. In one non-limiting embodiment, causing at least a portion of the guest phase forming material to separate from at least a portion of the matrix phase forming material may cause the at least one photoactive material to selectively concentrate in the guest phase forming material, such as those portions of the guest phase forming material that has at least partially separated from the matrix phase forming material. In other non-limiting embodiments, the at least one photoactive materials may selectively concentrate in the matrix phase forming material, such that those portions of the matrix phase forming material that is at least partially separated from the guest phase forming material. In still other non-limiting embodiments, where the at least one photoactive materials comprises two or more photoactive materials, some but not all of one (or more) photoactive material(s) may selectively concentrate in the guest phase forming material, while a second (or more) photoactive material(s) may selectively concentrate in the matrix phase forming material or alternatively may be evenly dispersed in both the guest phase forming material and the matrix phase forming material.

According to one non-limiting embodiment, causing the at least a portion of the guest phase forming material to separate from at least a portion of the matrix phase forming material may be affected by a polymerization induced phase-separation. For example, in one non-limiting embodiment, causing the at least a portion of the guest phase forming material to separate from at least a portion of the matrix phase forming material may comprise at least partially polymerizing at least a portion of the at least first liquid crystal monomer of the matrix phase forming material. As discussed herein, polymerizing (or curing) at least a portion of the guest phase forming material may result in the at least one first liquid crystal monomer forming a residue of the at least one first liquid crystal monomer within the matrix phase. In another non-limiting embodiment wherein the at least one liquid crystal material of the guest phase forming material comprises at least a second liquid crystal monomer, causing the at least a portion of the guest phase forming material to separate from at least a portion of the matrix phase forming material may further comprise at least partially polymerizing at least a portion of the at least second liquid crystal monomer of the guest phase forming material. In these non-limiting embodiments, at least partially polymerizing at least a portion of the at least second liquid crystal monomer may result in a polymeric residue of the second liquid crystal monomer within at least a portion of the guest phase.

In other non-limiting embodiments where the method further comprises at least partially polymerizing at least a portion of the guest phase after causing at least a portion of the guest phase forming material to separate from at least a portion of the matrix phase forming material, the guest phase forming material may comprise a monomer that may be polymerized at a different time or rate, for example, by a different polymerization initiation method or a different polymerization mechanism, as described herein, than the at least first liquid crystal monomer of the matrix phase forming material. In one non-limiting embodiment, the at least one liquid crystal material of the guest phase forming material is at least one second liquid crystal monomer that may be polymerized at a different time or rate, for example, by a different polymerization initiation method or a different polymerization mechanism, as described herein, than the at least first liquid crystal monomer of the matrix phase forming material. According to these non-limiting embodiments, the method comprises at least partially polymerizing (or curing) the guest forming material such as by polymerizing the at least one second liquid crystal monomer or other monomer in the guest phase forming material. In specific non-limiting embodiments, the guest phase forming material may comprise another monomer, such as a non-liquid crystal monomer that may be polymerized in the guest phase after curing the matrix phase or during the curing of the matrix phase. In certain embodiments, at least partially polymerizing at least a portion of the guest phase forming material may be affected after causing at least a portion of the guest phase forming material to separate from at least a portion of the matrix phase forming material by polymerization induced phase-separation. In other embodiments, at least partially polymerizing at least a portion of the guest phase forming material may be affected after causing at least a portion of the guest phase forming material to separate from at least a portion of the matrix phase forming material by solvent induced phase-separation.

In still further non-limiting embodiments of the methods, the methods may further comprise coating at least a portion of a surface of a substrate with a liquid crystal phase-separating polymer system as described herein, such as the liquid crystal phase-separating photochromic, dichroic, or photochromic-dichroic polymer system. Coating at least a portion of a surface of the substrate may be done by a variety of methods known in the art, such as, but not limited to, imbibing, coating, overmolding, spin coating, spray coating, spray and spin coating, curtain coating, flow coating, dip coating, injection molding, casting, roll coating, spread coating, casting-coating, reverse roll-coating, transfer roll-coating, kiss/squeeze coating, gravure roll-coating, slot-die coating, blade coating, knife coating, and rod/bar coating and wire coating. Various coating methods suitable for use in certain non-limiting embodiments of the present disclosure are described in "Coating Processes", Kirk-Othmer Encyclopedia of Chemical Technology, Volume 7, pp 1-35, 2004. Methods of imbibition are described in U.S. Pat. No. 6,433,043 at column 1, line 31 to column 13, line 54. The disclosure of each of these references is incorporated in their entirety by this reference. According to certain non-limiting embodiments, the at least partially coated substrate may be part of an optical element, such as described herein. In specific non-limiting embodiments, the optical element may be an ophthalmic element, such as corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors; and may also include partially formed lenses and lens blanks. In other non-limiting embodiments, the at least partially coated substrate may be incorporated into an article of manufacture, as described herein.

In other non-limiting embodiments of the methods, the phase-separating polymer compositions described herein may further comprise at least one additive selected from a liquid crystal, a liquid crystal control additive, a non-linear optical material, a dye, an alignment promoter, a kinetic enhancer, a photoinitiator, a thermal initiator, a surfactant, a polymerization inhibitor, a solvent, a light stabilizer, a heat stabilizer, a mold release agent, a rheology control agent, a leveling agent, a free radical scavenger, a coupling agent, a tilt control additive, a block or non-block polymeric material, an adhesion promoter or combinations of any thereof. Examples of the at least one additive are described elsewhere herein. According to various non-limiting embodiments, any particular compound in the at least one additive may be found primarily in the matrix phase of the phase-separating polymer composition, primarily in the guest phase of the phase-separating polymer composition, or distributed approximately evenly through both the matrix phase and guest phase of the phase-separating polymer composition.

Further, according to the various non-limiting embodiments, the sheet comprising a liquid crystal polymer and a liquid crystal material distributed therein can be connected to at least a portion of an optical substrate by at least one of laminating, fusing, in-mold casting, and adhesively bonding at least a portion of the sheet to the optical substrate.

Another non-limiting embodiment provides a method of making an alignment facility for an optical dye comprising forming an at least partial coating comprising an interpenetrating polymer network on at least a portion of an optical substrate. As used herein the term "interpenetrating polymer network" means an entangled combination of polymers, at least one of which is cross-linked, that are not bonded to each other. Thus, as used herein, the term interpenetrating polymer network includes semi-interpenetrating polymer networks. For example, see L. H. Sperling, *Introduction to Physical Polymer Science*, John Wiley & Sons, New York (1986) at page 46. According to this non-limiting embodiment, the method comprises imparting an orientation facility on at least a portion of an optical substrate and applying a polymerizable composition and a liquid crystal material to the at least a portion of the orientation facility. Thereafter, at least a portion of the liquid crystal material can be at least partially aligned with at least a portion of the orientation facility. After at least partially aligning at least a portion of the liquid crystal material, at least a portion of the at least partial coating can be subjected to a dual curing process, wherein at least a portion of the liquid crystal material is at least partially set and at least a portion of the polymerizable composition is at least partially set. According to this non-limiting embodiment, at least partially setting at least a portion of the liquid crystal material can occur before, after, or at essentially the same time as at least partially setting the polymerizable composition.

For example, in one non-limiting embodiment at least a portion of the liquid crystal material of the interpenetrating polymer network can be exposed to ultraviolet radiation to at least partially set at least a portion of the liquid crystal material. Thereafter, at least a portion of the polymerizable composition can be at least partially set by exposure to thermal energy. Although not limiting herein, according to this non-limiting embodiment, the polymerizable composition can comprise dihydroxy and isocyanate monomers, and a liquid crystal material can comprise a liquid crystal monomer. As used herein, the term "thermal energy" means any form of heat.

In another non-limiting embodiment, at least a portion of the polymerizable composition can be exposed to thermal energy sufficient to cause at least a portion of the polymerizable composition to at least partially set prior to exposing at least a portion of the liquid crystal material to ultraviolet radiation to cause at least a portion of the liquid crystal material to at least partially set. Further, at least a portion of the liquid crystal material can be at least partially aligned before, during or after exposing at least a portion of the coating to thermal energy and prior to at least partially setting at least a portion of the liquid crystal material.

In still another non-limiting embodiment, at least partially setting at least a portion of the polymerizable composition can occur at essentially the same time as at least partially setting at least a portion of the liquid crystal material, for example, by simultaneously exposing the at least partial coating to UV and thermal energy.

Generally, the at least partial coatings comprising the interpenetrating polymer network according to various non-limiting embodiments disclosed herein can have any thickness necessary to achieve the desired thickness of the alignment facility. For example, although not limiting herein, in one non-limiting embodiment, the thickness of the at least partial coating comprising the interpenetrating polymer network can range from 1 to 100 microns. Further, according to various non-limiting embodiments disclosed herein, the polymerizable composition of the interpenetrating polymer network can be an isotropic material or an anisotropic material, provided that the at least partial coating is, on the whole, anisotropic.

Figure 2:
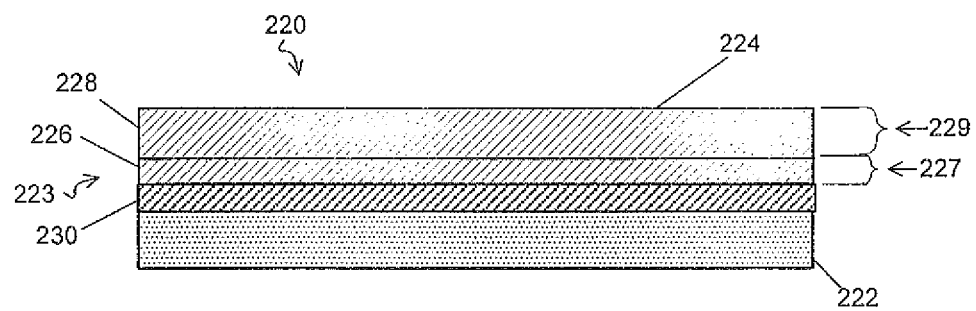
FIGS. 2 and 3 are schematic, cross-sectional views of an optical element according to various non-limiting embodiments disclosed herein.

Optical elements according to various non-limiting embodiments will now be described. Referring now to FIG. 2, one non-limiting embodiment provides an ophthalmic element, which is generally indicated 220, comprising an ophthalmic substrate 222 and an alignment facility (generally indicated 223) for an optical dye comprising at least one at least partial coating 224 comprising an at least partially ordered liquid crystal material connected to at least a portion thereof. As used herein the term "connected to" means in direct contact with an object or in indirect contact with an object through one or more other structures or materials, at least one of which is in direct contact with the object. Non-limiting methods of forming such alignment facilities are set forth above in detail. Further, non-limiting examples of optical elements and substrates, as well as ophthalmic elements and substrates, that can be used in conjunction with various non-limiting embodiments of optical elements and ophthalmic elements disclosed herein are set forth above in detail.

As discussed above, the time required to align thick, single-phase liquid crystal coatings is generally longer than the time required to align thinner coatings of the same material. Thus, although not required, according to certain non-limiting embodiments wherein optical elements having thick alignment facilities are desired, the alignment facility can comprise a plurality of at least partial coatings. For example, with continued reference to FIG. 2, according to one non-limiting embodiment, the at least one at least partial coating 224 of alignment facility 223 can comprise a first at least partial coating 226 comprising an at least partially ordered liquid crystal material and at least one additional at least partial coating 228 comprising an at least partially aligned liquid crystal material on at least a portion of the first at least partial coating 226.

Although not limiting herein, for example, according to various non-limiting embodiments, the first at least partial coating 226 can have a thickness (generally indicated 227) ranging from: 0.5 to 20 microns, 0.5 to 10 microns, and 2 to 8 microns. Further, for example and without limitation, according to various non-limiting embodiments disclosed herein, the at least one additional at least partial coating 228 can have a thickness (generally indicated 229) ranging from 1 micron to 25 microns, can further have a thickness ranging from 5 microns to 20 microns. According to still another non-limiting embodiment, at least one additional at least partial coating can have a thickness greater than 6 microns, and can further have a thickness of at least 10 microns.

Still further, according to various non-limiting embodiments disclosed herein, the first at least partial coating 226 can be thinner than the at least one additional at least partial coating 228. For example and without limitation, in one non-limiting embodiment, the first at least partial coating 226 can have a thickness ranging from 2 microns to 8 microns and the at least one additional at least partial coating 228 can have a thickness ranging from 10 microns to 20 microns. Non-limiting methods of making such coatings are described above in detail.

Further according to various non-limiting embodiments disclosed herein, the at least partial coating(s) (or sheets) of the alignment facility can further comprise at least one additive chosen from alignment promoters, kinetic enhancing additives, photoinitiators, thermal initiators, polymerization inhibitors, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, and adhesion promoters (such as hexanediol diacrylate and coupling agents).

As used herein, the term "alignment promoter" means an additive that can facilitate at least one of the rate and uniformity of the alignment of a material to which it is added. Non-limiting examples of alignment promoters that can be present in the at least partial coatings (and sheets) according to various non-limiting embodiments disclosed herein include those described in U.S. Pat. No. 6,338,808 and U.S. Patent Publication No. 2002/0039627, which are hereby specifically incorporated by reference herein.

Non-limiting examples of kinetic enhancing additives that can be present in the at least partial coatings (and sheets) according to various non-limiting embodiments disclosed herein include epoxy-containing compounds, organic polyols, and/or plasticizers. More specific examples of such kinetic enhancing additives are disclosed in U.S. Pat. No. 6,433,043 and U.S. Patent Publication No. 2003/0045612, which are hereby incorporated by reference herein.

Non-limiting examples of photoinitiators that can be present in the at least partial coatings (and sheets) according to various non-limiting embodiments disclosed herein include cleavage-type photoinitiators and abstraction-type photoinitiators. Non-limiting examples of cleavage-type photoinitiators include acetophenones, α-aminoalkylphenones, benzoin ethers, benzoyl oximes, acylphosphine oxides and bisacylphosphine oxides or mixtures of such initiators. A commercial example of such a photoinitiator is DAROCURE® 4265, which is available from Ciba Chemicals, Inc. Non-limiting examples of abstraction-type photoinitiators include benzophenone, Michler's ketone, thioxanthone, anthraquinone, camphorquinone, fluorone, ketocoumarin or mixtures of such initiators.

Another non-limiting example of a photoinitiator that can be present in the at least partial coatings (and sheets) according to various non-limiting embodiments disclosed herein is a visible light photoinitiator. Non-limiting examples of suitable visible light photoinitiators are set forth at column 12, line 11 to column 13, line 21 of U.S. Pat. No. 6,602,603, which is specifically incorporated by reference herein.

Non-limiting examples of thermal initiators include organic peroxy compounds and azobis(organonitrile) compounds. Specific non-limiting examples of organic peroxy compounds that are useful as thermal initiators include peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide and p-chlorobenzoyl peroxide; peroxyesters such as t-butylperoxy pivalate, t-butylperoxy octylate and t-butylperoxyisobutyrate; methylethylketone peroxide, and acetylcyclohexane sulfonyl peroxide. In one non-limiting embodiment the thermal initiators used are those that do not discolor the resulting polymerizate.

Non-limiting examples of azobis(organonitrile) compounds that can be used as thermal initiators include azobis (isobutyronitrile), azobis(2,4-dimethylvaleronitrile) or a mixture thereof.

Non-limiting examples of polymerization inhibitors include: nitrobenzene, 1,3,5-trinitrobenzene, p-benzoquinone, chloranil, DPPH, $FeCl_3$, $CuCl_2$, oxygen, sulfur, aniline, phenol, p-dihydroxybenzene, 1,2,3-trihydroxybenzene, and 2,4,6-trimethylphenol.

Non-limiting examples of solvents that can be present in the at least partial coating (and sheets) according to various non-limiting embodiments disclosed herein include those that will dissolve solid components of the coating, that are compatible with the coating and the elements and substrates, and/or can ensure uniform coverage of the exterior surface(s) to which the coating is applied. Potential solvents include, but are not limited to, the following: acetone, amyl propionate, anisole, benzene, butyl acetate, cyclohexane, dialkyl ethers of ethylene glycol, e.g., diethylene glycol dimethyl ether and their derivates (sold as CELLOSOLVE® industrial solvents), diethylene glycol dibenzoate, dimethyl sulfoxide, dimethyl formamide, dimethoxybenzene, ethyl acetate, isopropyl alcohol, methyl cyclohexanone, cyclopentanone, methyl ethyl ketone, methyl isobutyl ketone, methyl propionate, propylene carbonate, tetrahydrofuran, toluene, xylene, 2-methoxyethyl ether, 3-propylene glycol methyl ether, and mixtures thereof.

Further, as previously discussed, one or more optical dyes can be in contact with at least partial coatings (and sheets) of the alignment facilities according to various non-limiting embodiments disclosed herein.

Referring again to FIG. 2, in addition to the at least one at least partial coating 224 comprising the at least partially ordered liquid crystal material, the ophthalmic element 220 can further comprise an orientation facility 230 interposed between at least a portion of the at least one at least partial coating 224 of the alignment facility 223 and the ophthalmic substrate 222. Non-limiting examples of suitable orientation facilities and methods of making the same are set forth above.

Moreover, although not shown in the figures, in addition to the alignment facility, the optical elements according to various non-limiting embodiments disclosed herein can further comprise at least one at least partial primer coating interposed between at least a portion of the at least partial coating of the alignment facility and the optical substrate, or between at least a portion of an orientation facility and the optical substrate. Non-limiting examples of such coatings are set forth above in detail.

Figure 3:
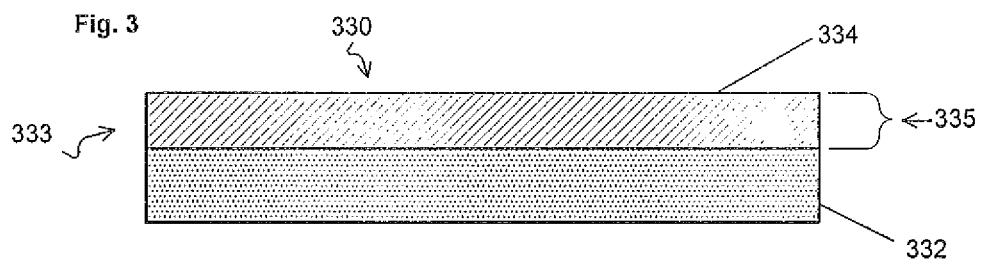

Referring now to FIG. 3, another non-limiting embodiment provides an optical element (generally indicated 330) comprising an optical substrate 332, and an alignment facility (generally indicated 333) for an optical dye connected to at least a portion of the optical substrate. According to this non-limiting embodiment, the alignment facility 333 comprises an at least partial coating 334 having a thickness (generally indicated 335) greater than 6 microns and comprising an at least partially ordered liquid crystal material. Further, according to this non-limiting embodiment, the at least partial coating 334 can have thickness 335 of at least 10 microns. According to still other non-limiting embodiments, at least partial coating 334 can have a thickness 335 ranging from 50 microns to 1000 microns or more. Non-limiting methods and material for making such coatings are described above in detail.

Another non-limiting embodiment provides an alignment facility for an optical dye comprising an at least partial coating comprising an at least partially ordered phase-separated polymer, the phase-separated polymer comprising a matrix phase comprising a liquid crystal material at least a portion of which is at least partially ordered in at least a first general direction and a guest phase comprising a liquid crystal material distributed within the matrix phase, wherein at least a portion of the liquid crystal material of the guest phase is at least partially ordered in at least a second general direction that is generally parallel to at least the first general direction. Further, according to this non-limiting embodiment, alignment facility can be connected to an optical substrate to form an optical element. For example, according to one non-limiting embodiment there is provided an optical element comprising an optical substrate and an alignment facility for an optical dye connected to at least a portion of the optical substrate, the alignment facility comprising an at least partial coating comprising an at least partially ordered phase-separated polymer. Non-limiting methods of forming such alignment facilities are described above.

Figure 4:
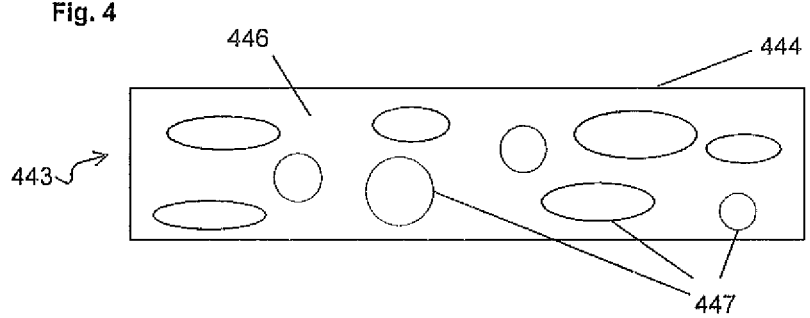
FIG. 4 is a schematic, top-plane view of an alignment facility according to one non-limiting embodiment disclosed herein.

Referring now to FIG. 4, another non-limiting embodiment provides an alignment facility (generally indicated 443) for an optical dye comprising a sheet 444 comprising at least partially ordered liquid crystal polymer 446 having at least a first general direction and an at least partially ordered liquid crystal material 447 distributed within at least a portion of the liquid crystal polymer 446, wherein the at least partially ordered liquid crystal material 447 has at least a second general direction that is generally parallel to at least the first general direction of the liquid crystal polymer 446. According to one non-limiting embodiment, the sheet 444 can be formed from a phase-separating polymer system as discussed above. Alternatively, according to another non-limiting embodiment, the sheet 444 can be formed using the imbibition techniques previously discussed.

Although not limiting herein, as discussed above, according to various non-limiting embodiments, the sheet can be connected to at least a portion of an optical substrate. Non-limiting methods of connecting the sheet to at least a portion of the optical substrate include: laminating, fusing, in-mold casting, adhesively bonding, and combinations thereof. As used herein, the term "in-mold casting" includes a variety of casting techniques, such as but not limited to: overlaying, wherein the sheet is placed in a mold and the substrate is formed (for example by casting) over at least a portion of the substrate; and injection molding, wherein the substrate is formed around the sheet.

One non-limiting embodiment provides an optical element comprising an optical substrate and an alignment facility comprising a sheet comprising an at least partially ordered liquid crystal polymer having at least a first general direction and an at least partially ordered liquid crystal material having at least a second general direction distributed within at least a portion of the at least partially ordered liquid crystal polymer matrix. Further, according to this non-limiting embodiment, at least the second general direction can be generally parallel to at least the first general direction of the liquid crystal polymer. As discussed above, a variety of methods can be used to connect the sheet of the alignment facility to the optical substrate.

Another non-limiting embodiment provides an alignment facility for an optical dye comprising an at least partial coating of interpenetrating polymer network comprising a polymer and an at least partially ordered liquid crystal material. Further, as previously discussed, the alignment facility can be connected to at least a portion of an optical substrate. For example, one non-limiting embodiment provides an optical element comprising an optical substrate and an alignment facility for an optical dye connected to at least a portion of the optical substrate, wherein the alignment facility comprises an at least partial coating of an interpenetrating polymer network comprising a polymer and an at least partially ordered liquid crystal material. Non-limiting methods of forming at least partial coatings comprising an at least partially aligned interpenetrating polymer network are set forth above.

Various non-limiting embodiments disclosed herein will now be illustrated in the following non-liming examples.

EXAMPLES

Polymerization Induced Phase Separation Examples

Liquid Crystal Monomers (LCM) 1-3 describe the preparation of the liquid crystal monomers used in the Examples. Photochromic/Dichroic (PC/DD) compound describes the preparation of PC/DD-1 used in the Examples. Photochromic Compound (PC) describes the preparation of PC-1 used in the Examples. Dichroic Dye (DD) describes DD-1 used in the Examples. Examples 1-7 and Comparative Example 1 (CE-1) describe the formulations containing the LCM prepared according to the method described with Table 2. Example 8 describes the preparation and testing of the samples coated with Examples 1-7 and CE-1.

The following abbreviations were used for the chemicals listed:

Al(OiPr)$_3$—aluminum triisopropylate
DHP—3,4-dihydro-2H-pyran
DCC—dicyclohexylcarbodiimide
DMAP—4-dimethylaminopyridine
PPTS—pyridine p-toluenesulfonate
pTSA—p-toluenesulfonic acid
NMP—N-methylpyrrolidone
BHT—butylated hydroxytoluene
THF—tetrahyrdofuran
mCPBA—3-chloroperoxybenzoic acid
DMAc—N,N-dimethylacetamide LCM-1
Step 1

To a reaction flask was added 4-hydroxybenzoic acid (90 grams (g), 0.65 mole (mol)), ethyl ether (1000 milliliters (mL)) and pTSA (2 g). The resulting suspension was stirred at room temperature. DHP (66 g, 0.8 mol) was added to the mixture. The suspension turned clear soon after the addition of DHP and a white crystalline precipitate formed. The mixture was then stirred at room temperature overnight. The resulting precipitates were collected by vacuum filtration and washed with ethyl ether. White crystals were recovered as the product (90 g, 62% yield). Nuclear Magnetic Resonance (NMR) showed that the product had a structure consistent with 4-(tetrahydro-2H-pyran-2-yloxy)benzoic acid.

Step 2

To a reaction flask was added 4-(tetrahydro-2H-pyran-2-yloxy)benzoic acid (65.5 g, 0.295 mol) from Step 1, 4-(trans-4-pentylcyclohexyl)phenol (70.3 g, 0.268 mol), DCC (66.8 g, 0.324 mol), DMAP (3.3 g) and methylene chloride (1 L). The resulting mixture was mechanically stirred at 0° C. for 30 minutes, then at room temperature for 2 hours. The resulting solids were filtered off. The solution was concentrated until white crystals started to precipitate. One liter of methanol was added into the mixture with stirring. The precipitated solid crystalline product was collected by vacuum filtration and washed with methanol. White crystals (126 g) were recovered as the product. NMR showed that the product had a structure consistent with 4-(trans-4-pentylcyclohexyl)phenyl 4-(tetrahydro-2H-pyran-2-yloxy)benzoate.

Step 3

The product from Step 2,4-(trans-4-pentylcyclohexyl)phenyl 4-(tetrahydro-2H-pyran-2-yloxy)benzoate (120 g, 0.26 mol), was dissolved in 1,2-dichloroethane (600 mL) in a reaction flask. Methanol (300 mL) and PPTS (9 g, 36 millimole (mmol)) was added. The mixture was heated to reflux and maintained at reflux for 6 hours. Upon standing at room temperature overnight, white crystals precipitated out which were collected by vacuum filtration. The mother liquid was concentrated and more white crystals precipitated out with the addition of methanol. The combined white crystalline product (90 g) was washed with methanol (about 300 mL) three times and air dried. NMR showed that the product had a structure consistent with 4-(trans-4-pentylcyclohexyl)phenyl 4-hydroxybenzoate.

Step 4

To a reaction flask was added the product of Step 3,4-(trans-4-pentylcyclohexyl)phenyl 4-hydroxybenzoate (70 g, 190 mmol), 6-chloro-1-hexanol (30 g, 220 mmol), NMP (300 mL), sodium iodide (6 g), and potassium carbonate (57 g, 410 mmol). The resulting mixture was vigorously stirred at 85-90° C. for 4 hours. The resulting mixture was extracted using 1/1 volume ratio of ethyl acetate/hexanes (1 L) and water (500 mL). The separated organic layer was washed several times with water to remove NMP and then dried over anhydrous magnesium sulfate (MgSO$_4$). After concentration, acetonitrile was added to precipitate the product. White crystals (76 g) were collected by vacuum filtration. NMR showed that the product had a structure consistent with 4-(trans-4-pentylcyclohexyl)phenyl 4-(6-hydroxyhexyloxy)benzoate.

Step 5

To a reaction flask was added the product of Step 4, 4-(trans-4-pentylcyclohexyl)phenyl 4-(6-hydroxyhexyloxy)benzoate (2 g, 4.3 mmol), epsilon-caprolactone (2.94 g, 26 mmol), Al(OiPr)$_3$ (0.26 g, 1.3 mmol) and methylene chloride (40 mL). The resulting mixture was stirred at room temperature for 8 hours. BHT (9 milligram (mg), 0.04 mmol), DMAP (0.05 g, 0.43 mmol) and N,N-diethylaniline (1.8 g, 15 mmol) was added to the mixture and the mixture was stirred for half an hour. Freshly distilled methacryloyl chloride (1.34 g, 13 mmol) was then added to the mixture. After stirring at room temperature for 8 hours, the mixture was washed with 5 weight percent NaOH aqueous solution three times, with an aqueous 1 Normal (N)HCl solution three times and then with the 5 weight percent NaOH aqueous solution one more time. Note that whenever weight percent is reported herein, it is based on the total weight of the solution. The organic layer was separated and dried over anhydrous MgSO$_4$. After concentration, a methanol washing was done by adding 100 mL of methanol to the recovered oil with stirring. After 10 minutes, the resulting cloudy mixture was left at room temperature. After the cloudiness of the mixture cleared, methanol on top of the mixture was decanted. This methanol wash was done three times. The recovered oil was re-dissolved in ethyl acetate, dried over anhydrous MgSO$_4$ and concentrated. A viscous liquid (3.9 g) was recovered as the product. NMR showed that the product had a structure consistent with 1-(6-(6-(6-(6-(6-(6-(6-(6-(4-(4-(trans-4-pentylcyclohexyl)phenoxycarbonyl)phenoxy)hexyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-2-methylprop-2-en-1-one with n having an average distribution of 8.1 as represented by the following graphic formula.

LCM-2

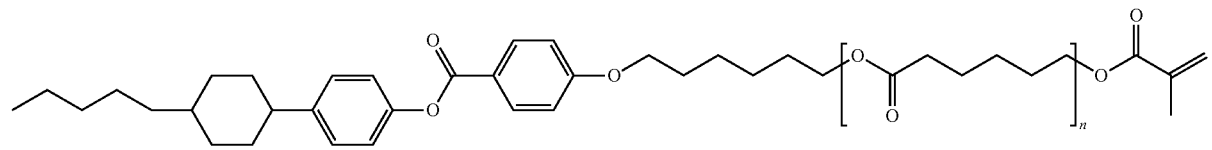

Step 1

A suspension of methyl 4-hydroxy benzoate (0.800 kilograms (Kg), 5.26 mol), 8-chloro-1-octanol (0.950 Kg, 5.76 mol), sodium iodide hydrate (97.6 g, 0.528 mol) and sodium carbonate anhydrous (1.670 Kg, 15.78 mol) in 4,000 mL of DMAc in a reaction flask was stirred and heated to about 110° C. for 10 hours. The solution was cooled to room temperature and filtered. The solid was washed with 1,400 mL of DMAc. The filtrate was concentrated under reduced pressure and the resulting residue was poured into 40 liters of water under stirring. White solid was obtained after filtration and it was washed with water. The product was used for next step without further purification.

Step 2

The crude product from Step 1 was mixed with sodium hydroxide (0.504 Kg, 12.62 mol) and 5,000 mL of ethanol and heated to reflux for 4 hours. The solution was cooled to room temperature and acidified with 6 L of 3 N HCl solution to a pH of 6-7. A large amount of white solid was formed. The solid was filtered and washed by water and dried to give 1.20 Kg of the final product. The two step yield was approximately 84.8%. NMR showed that the product had a structure consistent with 4-(8-hydroxyoctyloxy)benzoic acid.

Step 3

A suspension of 4-(8-hydroxyoctyloxy)benzoic acid from Step 2 (133.17 g, 0.500 mol) and pTSA (0.95 g, 0.005 mol) in a reaction flask containing 550 mL of THF was stirred at room temperature, and DHP (55 mL, 0.600 mol) was added over 1 hour. The reaction mixture was then heated to 50° C. After stirring for 24 hours at this temperature, DHP (37 mL, 0.400 mol) was added over 1 hour and the reaction mixture was stirred for 24 hours. The solution was cooled to room temperature and filtered through Celite, and the filtrate was concentrated. The crude product was dissolved in 100 mL of $CH_2Cl_2$ and filtered through Celite, and the filtrate was concentrated and poured into 1,000 mL of petroleum ether. The precipitates was collected by filtration and dried in vacuum to give the final product. The yield was 110.0 g (62.7%). NMR showed that the product had a structure consistent with 4-(8-(tetrahydro-2H-pyran-2-yloxy)octyloxy)benzoic acid.

Step 4

To a flask charged with nitrogen gas, was added p-hydroquinone (500 g, 4.53 mol), sodium carbonate (250 g, 2.35 mol) and water (7.5 L) and the mixture stirred at room temperature. After a solution formed, benzyl chloroformate (875 g, 5.13 mol) was added dropwise within 4 hours. The reaction mixture was then stirred overnight and during that time a suspension formed. The precipitates were separated out by filtration, washed with water, purified by recrystallization in ethanol/water (75:25 on a volume basis) and dried in vacuum to give the final product. The yield was 452 g (40.9%). NMR showed that the product had a structure consistent with benzyl 4-hydroxyphenyl carbonate.

Step 5

To a solution of benzyl 4-hydroxyphenyl carbonate from Step 4 (37.27 g, 0.15 mol), 4-(8-(tetrahydro-2H-pyran-2-yloxy)octyloxy)benzoic acid from Step 3 (52.60 g, 0.15 mol) and DMAP (a catalytic amount) in a reaction flask containing dichloromethane (300 mL), was added DCC (37.13 g, 0.18 mol) in portions at room temperature. After stirring overnight, the precipitates were removed by filtration. The filtrate was concentrated to give an oil-like product, which was then crystallized in ethyl ether and suspended in methanol with stirring for 6 hours, and after filtration the yield was 61.4 g (71.0%). NMR showed that the product had a structure consistent with 4-(benzyloxycarbonyloxy)phenyl 4-(8-(tetrahydro-2H-pyran-2-yloxy)octyloxy)benzoate.

Step 6

To a reaction flask containing a solution of 4-(benzyloxycarbonyloxy)phenyl 4-(8-(tetrahydro-2H-pyran-2-yloxy)octyloxy)benzoate from Step 5 (306.0 g, 0.53 mol) in 3 L of THF was added 15.3 g of a 50 weight percent aqueous suspension of palladium, 10 weight percent on activated carbon and the flask charged with hydrogen at ambient atmosphere. After stirring 2 days, the suspension was filtered through Celite. The filtrate was then concentrated to dryness. The crude oil-like product formed crystals in ethyl ether to give the final product. The yield was 208.5 g (88.9%). NMR showed that the product had a structure consistent with 4-hydroxyphenyl 4-(8-(tetrahydro-2H-pyran-2-yloxy)-octyloxy) benzoate.

Step 7

A mixture of 4-pentylbenzoic acid (10.0 g, 52.0 mmol), 4-hydroxyphenyl 4-(8-(tetrahydro-2H-pyran-2-yloxy)-octyloxy)benzoate from Step 6 (23.0 g, 52.0 mmol), DCC (11.8 g, 57.2 mmol), and DMAP (1.3 g, 10.4 mmol) in 400 mL of $CH_2Cl_2$ in a 500 mL single-necked, round-bottomed flask was stirred at room temperature under nitrogen atmosphere overnight. The white precipitate that formed during the reaction was removed by filtration through a Buchner funnel. The filtrate was concentrated and filtered again. The removal of the solvent yielded a white product. Precipitation from methylene chloride/methanol (1/10 on a volume basis) provided the final product, which was used for the next step without further purification. The yield was 29.0 g (90.3%). NMR showed that the product had a structure consistent with 4-(4-(8-hydroxyoctyloxy)benzoyloxy)phenyl-4-pentylbenzoate.

Step 8

To a solution of epsilon-caprolactone (2.14 g, 18.8 mmol) and the product from Step 7,4-(4-(8-hydroxyoctyloxy)benzoyloxy)phenyl 4-pentylbenzoate (5.0 g, 9.4 mmol) in 100 mL of $CH_2Cl_2$ in a 250 mL of single-necked, round bottomed flask was added Al(OiPr)$_3$ (0.58 g, 2.8 mmol). The reaction was stirred for 12 hours at room temperature under nitrogen atmosphere. The resulting solution was washed with 1 N HCl (100 mL, three times), 5 weight percent of NaOH aqueous solution (100 mL, once), and saturated brine (100 mL, three times). The resulting mixture was dried over anhydrous MgSO$_4$, flashed through a silica gel plug column, and the removal of the solvent yielded 7.0 g of a waxy solid (98%) as the product. NMR showed that the product had a structure consistent with 1-(6-(6-(4-(4-(4-pentylbenzoyloxy)phenyloxycarbonyl)phenoxy)octyloxy)-6-oxohexyloxy)-6-oxohexanol with n having an average distribution of 2 as represented by the following graphic formula.

LCM-3

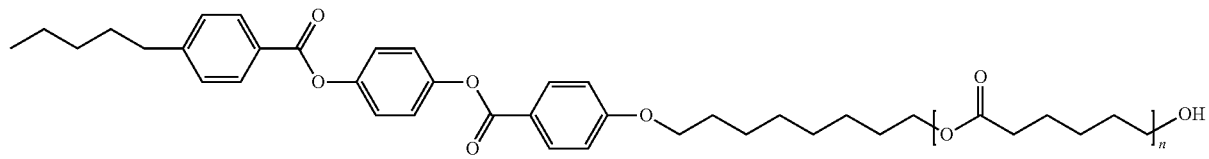

Step 1

To a solution of methyl 4-hydroxybenzoate (38.0 g, 0.25 mol), hex-5-en-1-ol (26.0 g, 0.255 mol), and triphenylphosphine (72.0 g, 0.275 mol) in a reaction flask containing 200 mL of THF was added diisopropyl diazodicarboxylate (56.0 g, 0.275 mol) dropwise. The resulting mixture was stirred at room temperature overnight. After the removal of the solvent, the crude product was purified by column chromatography on silica gel by eluting with ethyl acetate/hexane (9:1 on a volume basis) to provide a yellow liquid as the final product, which was used for the next step without further characterization.

Step 2

A mixture of the product of Step 1 and potassium hydroxide (28.0 g, 0.50 mol) in a reaction flask containing 200 mL of water/ethanol (1:1 on a volume basis) was heated to reflux for two hours. The ethanol was removed by evaporation and the concentrated solution was acidified with concentrated HCl to pH 5-6. A large amount of white precipitate formed and was collected by filtration. After washing with deionized water and drying under vacuum, a white solid was obtained. The yield was 55 g (99.6%). NMR showed that the product had a structure consistent with 4-(hex-5-enyloxy)benzoic acid.

Step 3

The mixture of 4-(hex-5-enyloxy)benzoic acid from Step 2 (6.6 g, 0.03 mol), 4-pentylphenol (4.9 g, 0.03 mol), DCC (6.2 g, 0.03 mol), and DMAP (0.4 g, 0.003 mol) in a reaction flask containing 50 mL of methylene chloride was stirred at room temperature overnight. After the removal of the solvent, the crude product was purified by column chromatography on silica gel by eluting with ethyl acetate/hexane (1:9 on a volume basis) to provide a colorless crystalline product. The yield was 7.35 g (66.8%). NMR showed that the product had a structure consistent with 4-pentylphenyl 4-(hex-5-enyloxy)benzoate.

Step 4

A solution of 4-pentylphenyl 4-(hex-5-enyloxy)benzoate from Step 3 (7.35 g, 0.02 mol) and mCPBA (6.0 g, 0.025 mol) in a reaction flask containing 50 mL of methylene chloride was stirred at room temperature overnight. A large amount of precipitate formed and was removed by filtration. The resulting filtrate was washed with a 5 weight percent sodium bicarbonate solution and water and dried over anhydrous $MgSO_4$. The removal of the solvent yielded a crude product, which was purified by column chromatography on silica gel by eluting with ethyl acetate/hexane (1:9 to 2:8 on a volume basis) to provide a colorless crystalline product. The yield was 6.5 g (85.5%). NMR showed that the product had a structure consistent with 4-pentylphenyl 4-(4-(oxiran-2-yl)butoxy)benzoate.

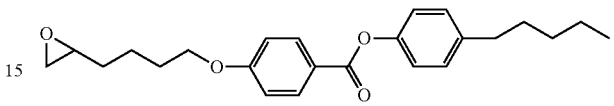

Photochromic/Dichroic Compound (PC/DD)

PC/DD-1 was prepared following the procedures of U.S. Pat. No. 7,342,112, which disclosure is incorporated herein by reference. NMR analysis showed the product to have a structure consistent with the following name:

PC/DD-1-3-(4-fluorophenyl-3-(4-piperazinophenyl)-13-ethyl-13-methoxy-6-methoxy-7-(4-(4-(4-(trans)phentylcyclohexyl)benzoyloxy)-phenyl)benzoyloxy-indeno[2',3':3,4]naphtho[1,2-b]pyran.

Photochromic Compound (PC)

PC-1 was prepared following the procedures of U.S. Pat. Nos. 5,645,767 and 6,296,785 B1, which disclosures are incorporated herein by reference. NMR analysis showed the product to have a structure consistent with the following name:

PC-1-3-(4-methoxyphenyl)-3-(4-morpholinophenyl)-13,13-dimethyl-3H,13H-indeno[2',3':3,4]naphtho[1,2-b]pyran.

Dichroic Dye (DD)

DD-1 was prepared according to the following procedure. A mixture of 4-[-(phenylazo)-1-naphthylazo]phenol (Disperse Orange 13, commercially available from Aldrich, Milwaukee, Wis.) (14.0 g, 0.04 mol), ethyl 4-(bromomethyl)benzoate (11.7 g, 0.048 mol), potassium carbonate (22.2 g, 0.16 mol), and potassium iodide (0.7 g, 0.004 mol) in a reaction flask containing 150 mL of 2-butanone was stirred and heated to reflux for 5 hours. The reaction was allowed to cool down to room temperature and filtered. The remaining solid was washed with de-ionized water three times and dried in air. Recrystallization from ethyl acetate provided the final product. The yield was 12.8 g (62%). NMR analysis showed the product to have a structure consistent with the following name:

DD-1- Ethyl 4-((4-((E)-(4-((E)-phenyldiazenyl)naphthalen-1-yl)diazenyl)phenoxy)methyl)benzoate.

Examples 1-7

Examples 1-7 were prepared according to the formulation listed in Table 1 using the specific LCM, DD, PC/DD and PC listed in Table 2. Comparative Example (CE) 1 was prepared following the same procedure except that the weight percent of the Host LCM was 60 instead of 50 percent and there was no Guest LCM.

TABLE 1

| Materials | Weight Percent (based on the total weight of the solution of the LCMs and the solvent unless specified otherwise) |
|---|---|
| Host LCMs | 50 |
| Guest LCMs | 10 |
| Solvent[1] | 40 |
| Initiator[2] | 1.5 based on LCM solids |
| Stabilizer[3] | 0.1 based on LCM solids |
| Dye when present (PC/DD, PC, or combination of PC/DD & DD) | 6.0 based on LCM solids |

[1]Solvent was 99 weight percent anisole and 1 weight percent surfactant sold as BYK ®-346 additive by BYK Chemie, USA.
[2]Initiator was IRGACURE ® 819, a photoinitiator that is available from Ciba-Geigy Corporation.
[3]Stabilizer was 2-methyl hydroquinone.

TABLE 2

| Example # | Host LCMs | Guest LCMs | Dye |
|---|---|---|---|
| 1 | RM-257[4]/RM-105[5]/RM-23[6]/RM-82[7] (1:1:1:1) | ZLI-1565 | PC/DD-1 |
| 2 | RM-257[4]/RM-105[5]/RM-23[6]/RM-82[7] (1:1:1:1) | ZLI-1565 | PC-1 |
| 3 | RM-257[4]/RM-105[5]/RM-23[6]/RM-82[7] (1:1:1:1) | ZLI-1565 | DD-1 & PC/DD-1 (1:1) |
| 4 | RM-257[4]/LCM-1 (1:1) | ZLI-1565 | PC/DD-1 |
| 5 | RM-257[4]/RM-105[5]/RM-23[6]/RM-82[7] (1:1:1:1) | LCM-2 | PC/DD-1 |
| 6 | RM-257[4]/RM-105[5]/RM-23[6]/RM-82[7] (1:1:1:1) | LCM-3 | PC/DD-1 |
| 7 | RM-257[4]/RM-105[5]/RM-23[6]/RM-82[7] (1:1:1:1) | ZLI-1565 | PC/DD-1 |
| CE-1 | RM-257[4]/RM-105[5]/RM-23[6]/RM-82[7] (1:1:1:1) | — | PC/DD-1 |

[4]RM 257 is a liquid crystal monomers available from EMD Chemicals, Inc. and is reported to have the molecular formula of $C_{33}H_{32}O_{10}$.
[5]RM 105 is a liquid crystal monomers available from EMD Chemicals, Inc. and is reported to have the molecular formula of $C_{23}H_{26}O_6$.
[6]RM 23 is a liquid crystal monomers available from EMD Chemicals, Inc. and is reported to have the molecular formula of $C_{29}H_{23}NO_5$.
[7]RM 82 is a liquid crystal monomers available from EMD Chemicals, Inc. and is reported to have the molecular formula of $C_{23}H_{26}O_6$.
[8]ZLI-1565 is a liquid crystal formulation available from Merck.

To a vial (20 mL) containing a magnetic stir bar was added each of the liquid crystal monomers, dyes, stabilizer, and initiator. Solvent was added to the contents in the vial, and the vial was capped and wrapped with aluminum foil and then positioned on a magnetic stirrer. The resulting mixture was heated to 80° C. and stirred for about 30 min until the solution became clear. The solution was cooled to room temperature and a small drop of solution was taken by a capillary for phase transition study. Afterwards, the resulting solution was cooled to room temperature and stored in darkness.

Example 8

Preparation of Samples Coated with Examples 1-7 and CE-1

Each of the Examples and CE was used in the procedure described hereinafter in Parts A-E, to prepare at least partial coatings on the surface of a substrate. Prior to preparation, the phase transitions of each example were determined by the procedure described in Part F. The Absorption Ratios and optical response measurements are described in Part G.

Part A—Substrate Cleaning

Square substrates measuring 5.08 cm by 5.08 cm by 0.318 cm (2 inches by 2 inches by 0.125 inch) prepared from CR-39® monomer were obtained from Homalite, Inc., Wilmington, Del. Each substrate was cleaned by wiping with a tissue soaked with acetone and drying with a stream of nitrogen gas.

Part B—Alignment Layer Application

A solution of a photo-orientable polymer network available as Staralign® 2200 CP10 solution from Huntsman Advanced Materials, Basel, Switzerland, was diluted to 4 weight percent in cyclopentanone. The resulting solution was applied by spin-coating to a portion of the surface of the test substrate by dispensing approximately 1.0 mL of the Staralign® solution and spinning the substrates at 1000 revolutions per minute (rpm) for 10 seconds. Afterwards, the coated substrates were placed in an oven maintained at 135° C. for 30 minutes.

For the alignment layer produced by rubbing, triacetate cellulose (TAC) was dissolved in cyclopentanone at 4 weight percent and applied by spin-coating to a portion of the surface of the test substrate by dispensing approximately 1.0 mL of the TAC solution and spinning the substrates at 500 rpm for 3 seconds followed by 1000 rpm for 10 seconds. Afterwards, the coated substrates were placed in an oven maintained at 140° C. for 60 minutes.

Part C—Orientation of the Alignment Layer

After application, the photo-orientable polymer network was at least partially ordered by exposure to linearly polarized ultraviolet radiation for 5 minute at a peak intensity of 80-100 Watts/$m^2$ of UVA (320-390 nm) as measured using International Light Research Radiometer, Model IL-1700 with a detector system comprising a Model SED033 detector, B Filter and diffuser. The output display of the radiometer was corrected (factor values set) against a Licor 1800-02 Optical Calibration Calibrator in order to display values representing Watts per square meter UVA. The source of linearly polarized UV radiation was a mercury arc lamp (Model 69910) from Newport Oriel equipped with an intensity controller Model 68951. The light source was oriented such that the radiation was linearly polarized in a plane perpendicular to the surface of the substrate. After ordering at least a portion of the photo-orientable polymer network, the substrates were cooled to room temperature and kept covered.

The substrates having the TAC layer were oriented by rubbing the coated surface with velvet uni-directionally 20 times.

Part D—Application of the Examples and Comparative Examples

Prior to application, 10 weight percent of $MgSO_4$ was added to each of the Examples and the Comparative Example and the resulting mixture was stirred for an hour at room temperature and subject to centrifuge filtration using a Millipore Ultrafree-MC (Durapore PVDF 5 um) filtration device in a Sovall Legend Micro 21 centrifuge at 10,000 rpm for 5 min. A small drop of filtrate was taken by a capillary for phase transition study. Material not used for the subsequent coating step was stored in darkness.

The Examples and Comparative Example were applied by spin-coating to the aligned layer on the substrates by spin-coating to a portion of the surface of the test substrate by dispensing 400 μL of the solution and spinning the substrates at 400 rpm for 9 seconds followed by 800 rpm for 15 seconds. Afterwards, the coated substrates were placed in a convection oven maintained at 50° C. to 100° C. lower than the corresponding clearing temperature (the temperature at which the liquid crystals transform into the isotropic state, as indicated in Table 3) for 10 to 15 minutes followed by curing under an ultraviolet lamp in the Irradiation Chamber BS-03 from Dr.

Gröbel UV-Elektronik GmbH, Ettlingen, Germany, in a nitrogen atmosphere for 30 minutes.

Part E—Application of Acrylate-Based Film

An acrylate-based film prepared according to the disclosure in U.S. Pat. No. 7,410,691, which disclosure is incorporated herein by reference, was applied by spin-coating onto the cured Example and Comparative Example coatings by dispensing approximately 1 mL of the acrylate-based coating solution and spinning the substrates at 2000 rpm for 10 seconds. Afterwards, the coated substrate was cured under an ultraviolet lamp in the Irradiation Chamber BS-03 from Dr. Gröbel UV-Elektronik GmbH in a nitrogen atmosphere for 15 minutes.

Part F—Measurement of Liquid Crystal Phase Transition Temperatures

Phase transition temperatures were determined by using a Leica DM 2500 M polarized optical microscope equipped with a Linkam LTS120 hot stage and a Linkam PE 94 temperature controller. A small drop of solution from a capillary pipet was placed on a microscope glass slide, and a stream of nitrogen was used to evaporate the solvent. The glass slide was mounted on the sample stage so that the liquid crystal residue spot was in the optical path of the microscope. Phase transition temperatures were measured by observing the samples during heating at a rate of 10° C./min starting at 25° C. Phase below 25° C. was not determined. The sample was heated until it reached the isotropic phase and then cooled at 10° C./min to 25° C. to determine the phase transition temperatures during the cooling process as indicated in Table 3. The phases of the liquid crystals were determined according to the texture that appeared during the heating and cooling processes. Textures of Liquid Crystals by Dietrich Demus and Lothar Richter, published by Verlag Chemie, Weinheim & New York in 1978 was used in the identification of the different liquid crystal phases listed in Table 3. This text, in its entirety, is incorporated herein by reference.

The following abbreviations were used in Table 3: N represents the Nematic phase; I represents the Isotropic phase. Note that all numbers represent the temperature in ° C. at which the adjacent phase abbreviation occurred. Each phase measured is separated by meaning that the phase extended until the next temperature or temperature range listed. For example, 25 N // 37 I, indicates that the Nematic phase was present from 25° C. to about 37° C. when the Isotropic phase occurred. Observation of the sample's phase started at room temperature (25° C.) and reported the next phase transition temperature.

TABLE 3

| Example # | Phase Transition temperature |
|---|---|
| 1 | 25 N // 78 I // 73 N |
| 2 | 25 N // 67 I // 64 N |
| 3 | 25 N // 90 I // 81 N |
| 4 | 25 N // 49 I // 42 N |
| 5 | 25 N // 81 I // 70 N |
| 6 | 25 N // 69 I // 64 N |
| 7 | 25 N // 78 I // 73 N |
| CE-1 | 25 N // 82 I // 74 N |

Part G—Absorption Ratio and Optical Response Measurements

Absorption ratios for each coated substrates with dichroic dyes (DD) were determined as follows. A CARY 6000i UV-Visible spectrophotometer was equipped with a self-centering sample holder mounted on a rotation stage (Model M-060-PD from Polytech, PI) and the appropriate software. A polarizer analyzer (Moxtek ProFlux™ polarizer) was placed in the sample beam before the sample. The instrument was set with the following parameters: Scan speed=600 nm/min; Data interval=1.0 nm; Integration time=100 ms; Absorbance range=0–6.5; Y mode=absorbance; X-mode=nanometers and the scanning range was 380 to 800 nm. Options were set for 3.5 SBW (slit band width), and double for beam mode. Baseline options were set for Zero/baseline correction. Also, 1.1 and 1.5 (~2.6 together) Screen Neutral Density filters were in the reference path for all scans. The coated substrate samples were tested in air, at room temperature (22.8° C.±2.8° C. (73° F.±5° F.)) maintained by the lab air conditioning system.

Orientation of the sample polarizer to be parallel and perpendicular to the analyzer polarizer was accomplished in the following manner. The Cary 6000i was set to 443 nm for samples containing DD-1 and the absorbance was monitored as the sample was rotated in small increments (0.1 to 5 degrees, e.g., 5,1, 0.5 and 0.1 degrees). The rotation of the sample was continued until the absorbance was maximized. This position was defined as the perpendicular or 90 degree position. The parallel position was obtained by rotating the stage 90 degrees clockwise or counter-clockwise. Alignment of the samples was achieved to ±0.1°.

The absorption spectra were collected at both 90 and 0 degrees for each sample. Data analysis was handled with the Igor Pro software available from WaveMetrics. The spectra were loaded into Igor Pro and the absorbances were used to calculate absorption ratios at 443 nm. The calculated absorption ratios are listed in Table 4.

The $\lambda_{max\text{-}vis}$ in the visible light range is the wavelength in the visible spectrum at which the maximum absorption of the activated form of the photochromic compound or dichroic dye occurs. The $\lambda_{max\text{-}vis}$ was determined by testing the coated substrate in a CARY 6000i UV-Visible spectrophotometer.

Prior to response testing on an optical bench, the substrates having photochromic compounds in the coatings were conditioned by exposing them to 365 nm ultraviolet light for 10 minutes at a distance of about 14 cm from the source in order to pre-activate the photochromic molecules. The UVA irradiance at the sample was measured with a Licor Model Li-1800 spectroradiometer and found to be 22.2 Watts per square meter. The samples were then placed under a halogen lamp (500 W, 120V) for about 10 minutes at a distance of about 36 cm from the lamp in order to bleach, or inactivate, the photochromic compound in the samples. The illuminance at the sample was measured with the Licor spectroradiometer and found to be 21.9 Klux. The samples were then kept in a dark environment for at least 1 hour prior to testing in order to cool and continue to fade back to a ground state.

An optical bench was used to measure the optical properties of the coated substrates and derive the absorption ratio and photochromic properties. Each test sample was placed on the optical bench with an activating light source (a Newport/Oriel Model 66485 300-Watt Xenon arc lamp fitted with a Uniblitz VS-25 high-speed computer controlled shutter that momentarily closed during data collection so that stray light would not interfere with the data collection process, a Schott 3 mm KG-1 band-pass filter, which removed short wavelength radiation, neutral density filter(s) for intensity attenuation and a condensing lens for beam collimation) positioned at a 30° to 35° angle of incidence to the surface of the test sample. The arc lamp was equipped with a light intensity controller (Newport/Oriel model 68950).

A broadband light source for monitoring response measurements was positioned in a perpendicular manner to a surface of the test sample. Increased signal of shorter visible wavelengths was obtained by collecting and combining separately filtered light from a 100-Watt tungsten halogen lamp (controlled by a Lambda UP60-14 constant voltage powder supply) with a split-end, bifurcated fiber optical cable. Light from one side of the tungsten halogen lamp was filtered with a Schott KG1 filter to absorb heat and a Hoya B-440 filter to allow passage of the shorter wavelengths. The other side of the light was either filtered with a Schott KG1 filter or unfiltered. The light was collected by focusing light from each side of the lamp onto a separate end of the split-end, bifurcated fiber optic cable, and subsequently combined into one light source emerging from the single end of the cable. A 4" light pipe was attached to the single end of the cable to insure proper mixing. The broad band light source was fitted with a Uniblitz VS-25 high-speed computer controlled shutter that momentarily opened during data collection.

Polarization of the light source was achieved by passing the light from the single end of the cable through a Moxtek, Proflux Polarizer held in a computer driven, motorized rotation stage (Model M-061-PD from Polytech, PI). The monitoring beam was set so that the one polarization plane (0°) was perpendicular to the plane of the optical bench table and the second polarization plane (90°) was parallel to the plane of the optical bench table. The samples were run in air, at 23° C.±0.1° C. (73.4° F.±0.2° F.) maintained by a temperature controlled air cell.

To align each sample, a second polarizer was added to the optical path. The second polarizer was set to 90° of the first polarizer. The sample was placed in an air cell in a self-centering holder mounted on a rotation stage (Model No M-061.PD from Polytech, PI). A laser beam (Coherent-ULN 635 diode laser) was directed through the crossed polarizers and sample. The sample was rotated (in 3° steps as course moves and in 0.1° steps as fine moves) to find the minimum transmission. At this point the sample was aligned either parallel or perpendicular to the Moxtek polarizer and the second polarizer as well as the diode laser beam was removed from the optical path. The sample was aligned ±0.2° prior to any activation.

To conduct the measurements, each test sample containing a photochromic dye was exposed to 6.7 W/m$^2$ of UVA from the activating light source for 10 to 20 minutes to activate the photochromic compound. An International Light Research Radiometer (Model IL-1700) with a detector system (Model SED033 detector, B Filter, and diffuser) was used to verify exposure at the beginning of each day. Light from the monitoring source that was polarized to the 0° polarization plane was then passed through the coated sample and focused into a 1" integrating sphere, which was connected to an Ocean Optics S2000 spectrophotometer using a single function fiber optic cable. The spectral information, after passing through the sample, was collected using Ocean Optics OOIBase32 and OOIColor software, and PPG propriety software. While the photochromic material was activated, the position of the polarizing sheet was rotated back and forth to polarize the light from the monitoring light source to the 90° polarization plane and back. Data was collected for approximately 600 to 1200 seconds at 5-second intervals during activation. For each test, rotation of the polarizers was adjusted to collect data in the following sequence of polarization planes: 0°, 90°, 90°, 0°, etc.

Absorption spectra were obtained and analyzed for each test sample using the Igor Pro software (available from WaveMetrics). The change in the absorbance in each polarization direction for each test sample was calculated by subtracting out the 0 time (i.e., unactivated) absorption measurement for the samples at each wavelength tested. Average absorbance values were obtained in the region of the activation profile where the photochromic response of the photochromic compound was saturated or nearly saturated (i.e., the regions where the measured absorbance did not increase or did not increase significantly over time) for each sample by averaging absorbance at each time interval in this region. The average absorbance values in a predetermined range of wavelengths corresponding $\lambda_{max\text{-}vis}$+/−5 nm were extracted for the 0° and 90° polarizations, and the absorption ratio for each wavelength in this range was calculated by dividing the larger average absorbance by the small average absorbance. For each wavelength extracted, 5 to 100 data points were averaged. The average absorption ratio for the photochromic compound was calculated by averaging these individual absorption ratios.

Change in optical density (ΔOD) from the bleached state to the darkened state was determined by establishing the initial transmittance, opening the shutter from the Xenon lamp to provide ultraviolet radiation to change the test lens from the bleached state to an activated (i.e., darkened) state. Data was collected at selected intervals of time, measuring the transmittance in the activated state, and calculating the change in optical density according to the formula: ΔOD=log(% Tb/% Ta), where % Tb is the percent transmittance in the bleached state, % Ta is the percent transmittance in the activated state and the logarithm is to the base 10.

The fade half life (T½) is the time interval in seconds for the ΔOD of the activated form of the photochromic compound in the test samples to reach one half the ΔOD measured after fifteen minutes, or after saturation or near-saturation was achieved, at room temperature after removal of the source of activating light, e.g., by closing the shutter. The results of these tests are presented in Table 4 below. Examination of the results in Table 4 shows that Examples 1-7 demonstrated a lower fade half life than Comparative Example 1.

TABLE 4

| Example # | $\lambda_{max\text{-}vis}$ (nm) | Absorption Ratio | T½ (seconds) |
|---|---|---|---|
| 1 | 616 | 2.97 | 518 |
| 2 | 589 | 1.35 | 165 |
| 3 | 616 | 5.73 | 184 |
| 4 | 610 | 1.89 | 60 |
| 5 | 614 | 5.55 | 153 |
| 6 | 611 | 4.89 | 620 |
| 7* | 613 | 4.03 | 517 |
| CE-1 | 620 | 4.27 | >1800 |

*Example # denotes a sample having an alignment layer of rubbed TAC.

It is to be understood that the present description and examples illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments or examples disclosed, but is intended to cover modifications that are within the spirit and scope of the invention, as defined by the appended claims.

We claim:
1. A phase-separating polymer system comprising:
an at least partially cured matrix phase comprising:
a polymeric residue of at least a first liquid crystal monomer; and a guest phase comprising:
- at least one photoactive material selected from the group consisting of photochromic compounds, photochromic-dichroic compounds, and mixtures thereof, wherein the photoactive material is adapted to switch from a first state to a second state in response to at least actinic radiation, and to revert back to the first state in response to thermal energy; and
- at least one liquid crystal material, wherein at least a portion of the guest phase separates from at least a portion of the matrix phase during at least partial curing of the polymeric residue of the at least first liquid crystal monomer.

2. The phase-separating polymer system of claim 1, wherein at least one of the first liquid crystal monomer of the matrix phase and the at least one liquid crystal material of the guest phase comprises at least one mesogen containing compound having a structure represented by Formula I:

(I)

where,
a) each X is independently:
  i) a group R,
  ii) a group represented by -(L)$_y$-R,
  iii) a group represented by -(L)-R,
  iv) a group represented by -(L)$_w$-Q;
  v) a group represented by

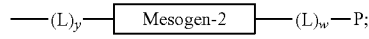

vi) a group represented by -(L)$_y$-P; or
  vii) a group represented by -(L)$_w$-[(L)$_w$-P]$_y$;
b) each P is a reactive group independently selected from a group Q, hydrogen, aryl, hydroxy($C_1$-$C_{18}$)alkyl, $C_1$-$C_{18}$ alkyl, $C_1$-$C_{18}$ alkoxy, amino($C_1$-$C_{18}$)alkylene, $C_1$-$C_{18}$ alkylamino, di-($C_1$-$C_{18}$)alkylamino, $C_1$-$C_{18}$ alkyl($C_1$-$C_{18}$)alkoxy, $C_1$-$C_{18}$ alkoxy($C_1$-$C_{18}$)alkoxy, nitro, poly($C_1$-$C_{18}$)alkyl ether, ($C_1$-$C_{18}$)alkyl($C_1$-$C_{18}$)alkoxy($C_1$-$C_{18}$)alkylene, polyethyleneoxy, polypropyleneoxy, ethylene, acryloyl, acryloyloxy($C_1$-$C_{18}$)alkylene, methacryloyl, methacryloyloxy($C_1$-$C_{18}$)alkylene, 2-chloroacryloyl, 2-phenylacryloyl, acryloylphenylene, 2-chloroacryloylamino, 2-phenylacryloylaminocarbonyl, oxetanyl, glycidyl, cyano, isocyanato($C_1$-$C_{18}$)alkyl, itaconic acid ester, vinyl ether, vinyl ester, a styrene derivative, main-chain and side-chain liquid crystal polymers, siloxane derivatives, ethyleneimine derivatives, maleic acid derivatives, fumaric acid derivatives, unsubstituted cinnamic acid derivatives, cinnamic acid derivatives that are substituted with at least one of methyl, methoxy, cyano and halogen, or substituted or unsubstituted chiral or non-chiral monovalent or divalent groups chosen from steroid radicals, terpenoid radicals, alkaloid radicals and mixtures thereof, wherein the substituents are independently chosen from $C_1$-$C_{18}$ alkyl, $C_1$-$C_{18}$ alkoxy, amino, $C_3$-$C_{10}$ cycloalkyl, $C_1$-$C_{18}$ alkyl($C_1$-$C_{18}$) alkoxy, fluoro($C_1$-$C_{18}$)alkyl, cyano, cyano($C_1$-$C_{18}$) alkyl, cyano($C_1$-$C_{18}$)alkoxy or mixtures thereof, or P is a structure having from 2 to 4 reactive groups or P is an unsubstituted or substituted ring opening metathesis polymerization precursor;

c) the group Q is hydroxy, amino, $C_2$-$C_{18}$ alkenyl, $C_2$-$C_{18}$ alkynyl, azido, silyl, siloxy, silylhydride, (tetrahydro-2H-pyran-2-yl)oxy, thio, isocyanato, thioisocyanato, acryloyloxy, methacryloyloxy, 2-(acryloyloxy)ethylcarbamyl, 2-(methacryloyloxy)ethylcarbamyl, aziridinyl, allyloxycarbonyloxy, epoxy, carboxylic acid, carboxylic ester, acryloylamino, methacryloylamino, aminocarbonyl, $C_1$-$C_{18}$ alkyl aminocarbonyl, aminocarbonyl($C_1$-$C_{18}$)alkylene, $C_1$-$C_{18}$ alkyloxycarbonyloxy, or halocarbonyl;

d) each L is independently chosen for each occurrence, the same or different, from a single bond, a polysubstituted, monosubstituted, unsubstituted or branched spacer independently chosen from aryl, ($C_1$-$C_{30}$)alkyl, ($C_1$-$C_{30}$)alkylcarbonyloxy, ($C_1$-$C_{30}$)alkylamino, ($C_1$-$C_{30}$) alkoxy, ($C_1$-$C_{30}$)perfluoroalkyl, ($C_1$-$C_{30}$)perfluoroalkoxy, ($C_1$-$C_{30}$)alkylsilyl, ($C_1$-$C_{30}$)dialkylsiloxy, ($C_1$-$C_{30}$)alkylcarbonyl, ($C_1$-$C_{30}$)alkoxycarbonyl, ($C_1$-$C_{30}$)alkylcarbonylamino, ($C_1$-$C_{30}$)alkylaminocarbonyl, ($C_1$-$C_{30}$)alkyloxycarbonyloxy, ($C_1$-$C_{30}$)alkylaminocarbonyloxy, ($C_1$-$C_{30}$)alkylaminocarbonylamino, ($C_1$-$C_{30}$)alkylurea, ($C_1$-$C_{30}$)alkylthiocarbonylamino, ($C_1$-$C_{30}$)alkylaminocarbonylthio, ($C_2$-$C_{30}$)alkenyl, ($C_1$-$C_{30}$)thioalkyl, ($C_1$-$C_{30}$)alkylsulfonyl, ($C_1$-$C_{30}$)alkylsulfinyl, or ($C_1$-$C_{30}$)alkylsulfoyloxy wherein each substituent is independently chosen from ($C_1$-$C_{18}$)alkyl, ($C_1$-$C_{18}$) alkoxy, fluoro, chloro, bromo, cyano, ($C_1$-$C_{18}$)alkanoate ester, isocyanato, thioisocyanato, or phenyl;

e) the group R is selected from hydrogen, $C_1$-$C_{18}$ alkyl, $C_1$-$C_{18}$ alkoxy, $C_1$-$C_{18}$ alkoxycarbonyl, $C_3$-$C_{10}$ cycloalkyl, $C_3$-$C_{10}$ cycloalkoxy, poly($C_1$-$C_{18}$ alkoxy), or a straight-chain or branched $C_1$-$C_{18}$ alkyl group that is unsubstituted or substituted with cyano, fluoro, chloro, bromo, or $C_1$-$C_{18}$ alkoxy, or poly-substituted with fluoro, chloro, or bromo; and f) the groups Mesogen-1 and Mesogen-2 are each independently a rigid straight rod-like liquid crystal group, a rigid bent rod-like liquid crystal group, or a rigid disc-like liquid crystal group; and where w is an integer from 1 to 26, y is an integer from 2 to 25, z is 1 or 2, provided that when:
the group X is represented by R, then w is an integer from 1 to 25, and z is 1;
the group X is represented by -(L)$_y$-R, then w is 1, y is an integer from 2 to 25, and z is 1;
the group X is represented by -(L)-R, then w is an integer from 3 to 26, and z is 2;
the group X is represented by -(L)$_w$-Q; then if P is represented by the group Q, then w is 1, and z is 1; and if P is other than the group Q, then each w is independently an integer from 1 to 26 and z is 1;
the group X is represented by

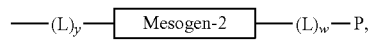

then w is 1, y is an integer from 2 to 25, and z is 1;
the group X is represented by -(L)$_y$-P, then w is 1, y is an integer from 2 to 25, and z is 1 and -(L)$_y$- comprises a linear sequence of at least 25 bonds between the mesogen and P; and
the group X is represented by -(L)$_w$-[(L)$_w$-P]$_y$, then each w is independently an integer from 1 to 25, y is an integer from 2 to 6, and z is 1.

3. The phase-separating polymer system of claim 2, wherein the groups Mesogen-1 and Mesogen-2 each independently have a structure represented by:

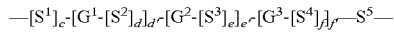

where:
(i) each $G^1$, $G^2$, and $G^3$ is independently chosen for each occurrence from: a divalent group chosen from: an unsubstituted or a substituted aromatic group, an unsubstituted or a substituted alicyclic group, an unsubstituted or a substituted heterocyclic group, and mixtures thereof, wherein substituents are chosen from: the group P, halogen, $C_1$-$C_{18}$alkoxycarbonyl, $C_1$-$C_{18}$ alkylcarbonyl, $C_1$-$C_{18}$ alkyloxycarbonyloxy, aryloxycarbonyloxy, perfluoro($C_1$-$C_{18}$)alkylamino, di-(perfluoro($C_1$-$C_{18}$)alkyl)amino, $C_1$-$C_{18}$ acetyl, $C_3$-$C_{10}$ cycloalkyl, $C_3$-$C_{10}$cycloalkoxy, a straight-chain or branched $C_1$-$C_{18}$ alkyl group that is mono-substituted with cyano, halo, or $C_1$-$C_{18}$ alkoxy, or poly-substituted with halo, and a group comprising one of the following formulae: -M(T)$_{(t-1)}$ and -M(OT)$_{(t-1)}$, wherein M is chosen from aluminum, antimony, tantalum, titanium, zirconium and silicon, T is chosen from organofunctional radicals, organofunctional hydrocarbon radicals, aliphatic hydrocarbon radicals and aromatic hydrocarbon radicals, and t is the valence of M;
(ii) c, d, e, and f are each independently chosen from an integer ranging from 0 to 20, inclusive; d', e' and f' are each independently an integer from 0 to 4 provided that a sum of d'+e'+f' is at least 1; and each $S^1$, $S^2$, $S^3$, $S^4$, and $S^5$ is independently chosen for each occurrence from a spacer unit chosen from:
(A) —$(CH_2)_g$—, —$(CF_2)_h$—, —$Si(CH_2)_g$—, or -(Si$(CH_3)_2O)_h$—, wherein g is independently chosen for each occurrence from 1 to 20 and h is a whole number from 1 to 16 inclusive;
(B) —N(Z)-, —C(Z)=C(Z)-, —C(Z)=N—, —C(Z')$_2$—C(Z')$_2$-, or a single bond, wherein Z is independently chosen for each occurrence from hydrogen, $C_1$-$C_{18}$ alkyl, $C_3$-$C_{10}$ cycloalkyl and aryl, and Z' is independently chosen for each occurrence from $C_1$-$C_{18}$ alkyl, $C_3$-$C_{10}$ cycloalkyl and aryl; or
(C) —O—, —C(O)—, —C≡C—, —N=N—, —S—, —S(O)—, —S(O)(O)—, —(O)S(O) O—, —O(O)S(O)O— or straight-chain or branched $C_1$-$C_{24}$ alkylene residue, said $C_1$-$C_{24}$ alkylene residue being unsubstituted, mono-substituted by cyano or halo, or poly-substituted by halo;
provided that when two spacer units comprising heteroatoms are linked together the spacer units are linked so that heteroatoms are not directly linked to each other and when $S_1$ and $S_5$ are linked to another group, they are linked so that two heteroatoms are not directly linked to each other.

4. The phase-separating polymer system of claim 1, wherein at least one of the at least partially cured matrix phase and the guest phase further comprises one or more additive selected from a liquid crystal, a liquid crystal control additive, a non-linear optical material, a dye, a dichroic dye, an alignment promoter, a kinetic enhancer, a photoinitiator, a thermal initiator, a surfactant, a polymerization inhibitor, a solvent, a light stabilizer, a heat stabilizer, a mold release agent, a rheology control agent, a leveling agent, a free radical scavenger, a coupling agent, a tilt control additive, a block or non-block polymeric material, or an adhesion promoter.

5. An optical element comprising:
a substrate; and
an at least partial layer on at least a portion of a surface of the substrate, the layer comprising a liquid crystal phase-separated system comprising:
an at least partially cured matrix phase comprising:
a polymeric residue of at least a first liquid crystal monomer; and
a guest phase comprising:
at least one photoactive material selected from the group consisting of photochromic compounds, photochromic-dichroic compounds, and mixtures thereof, wherein the photoactive material is adapted to switch from a first state to a second state in response to at least actinic radiation, and to revert back to the first state in response to thermal energy; and
at least one liquid crystal material
wherein at least one of the first liquid crystal monomer of the matrix phase and the at least one liquid crystal material of the guest phase comprises a mesogen containing compound having a structure represented by Formula I:

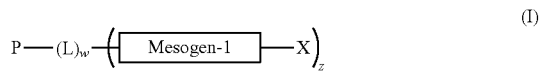

where,
a) each X is independently:
i) a group R,
ii) a group represented by -(L)$_y$-R,
iii) a group represented by -(L)-R,
iv) a group represented by -(L)$_w$-Q;
v) a group represented by

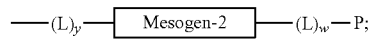

vi) a group represented by -(L)$_y$-P; or
vii) a group represented by -(L)$_w$-[(L)$_w$-P]$_y$;
b) each P is a reactive group independently selected from a group Q, hydrogen, aryl, hydroxy($C_1$-$C_{18}$)alkyl, $C_1$-$C_{18}$ alkyl, $C_1$-$C_{18}$ alkoxy, amino($C_1$-$C_{18}$)alkylene, $C_1$-$C_{18}$ alkylamino, di-($C_1$-$C_{18}$)alkylamino, $C_1$-$C_{18}$ alkyl($C_1$-$C_{18}$)alkoxy, $C_1$-$C_{18}$ alkoxy($C_1$-$C_{18}$)alkoxy, nitro, poly($C_1$-$C_{18}$)alkyl ether, ($C_1$-$C_{18}$)alkyl($C_1$-$C_{18}$)alkoxy($C_1$-$C_{18}$)alkylene, polyethyleneoxy, polypropyleneoxy, ethylene, acryloyl, acryloyloxy($C_1$-$C_{18}$)alkylene, methacryloyl, methacryloyloxy($C_1$-$C_{18}$)alkylene, 2-chloroacryloyl, 2-phenylacryloyl, acryloylphenylene, 2-chloroacryloylamino, 2-phenylacryloylaminocarbonyl, oxetanyl, glycidyl, cyano, isocyanato($C_1$-$C_{18}$)alkyl, itaconic acid ester, vinyl ether, vinyl ester, a styrene derivative, main-chain and side-chain liquid crystal polymers, siloxane derivatives, ethyleneimine derivatives, maleic acid derivatives, fumaric acid derivatives, unsubstituted cinnamic acid derivatives, cinnamic acid derivatives that are substituted with at least one of methyl, methoxy, cyano and halogen, or substituted or unsubstituted chiral or non-chiral monovalent or divalent groups chosen from steroid radicals, terpenoid radicals, alkaloid radicals and mixtures thereof, wherein the substituents are independently chosen from $C_1$-$C_{18}$ alkyl, $C_1$-$C_{18}$ alkoxy, amino, $C_3$-$C_{10}$ cycloalkyl, $C_1$-$C_{18}$ alkyl($C_1$-$C_{18}$) alkoxy, fluoro($C_1$-$C_{18}$)alkyl, cyano, cyano($C_1$-$C_{18}$)

alkyl, cyano($C_1$-$C_{18}$)alkoxy or mixtures thereof, or P is a structure having from 2 to 4 reactive groups or P is an unsubstituted or substituted ring opening metathesis polymerization precursor;
c) the group Q is hydroxy, amino, $C_2$-$C_{18}$ alkenyl, $C_2$-$C_{18}$ alkynyl, azido, silyl, siloxy, silylhydride, (tetrahydro-2H-pyran-2-yl)oxy, thio, isocyanato, thioisocyanato, acryloyloxy, methacryloyloxy, 2-(acryloyloxy)ethylcarbamyl, 2-(methacryloyloxy)ethylcarbamyl, aziridinyl, allyloxycarbonyloxy, epoxy, carboxylic acid, carboxylic ester, acryloylamino, methacryloylamino, aminocarbonyl, $C_1$-$C_{18}$ alkyl aminocarbonyl, aminocarbonyl($C_1$-$C_{18}$)alkylene, $C_1$-$C_{18}$ alkyloxycarbonyloxy, or halocarbonyl;
d) each L is independently chosen for each occurrence, the same or different, from a single bond, a polysubstituted, monosubstituted, unsubstituted or branched spacer independently chosen from aryl, ($C_1$-$C_{30}$)alkyl, ($C_1$-$C_{30}$)alkylcarbonyloxy, ($C_1$-$C_{30}$)alkylamino, ($C_1$-$C_{30}$) alkoxy, ($C_1$-$C_{30}$)perfluoroalkyl, ($C_1$-$C_{30}$)perfluoroalkoxy, ($C_1$-$C_{30}$)alkylsilyl, ($C_1$-$C_{30}$)dialkylsiloxyl, ($C_1$-$C_{30}$)alkylcarbonyl, ($C_1$-$C_{30}$)alkoxycarbonyl, ($C_1$-$C_{30}$)alkylcarbonylamino, ($C_1$-$C_{30}$)alkylaminocarbonyl, ($C_1$-$C_{30}$)alkyloxycarbonyloxy, ($C_1$-$C_{30}$) alkylaminocarbonyloxy, ($C_1$-$C_{30}$) alkylaminocarbonylamino, ($C_1$-$C_{30}$)alkylurea, ($C_1$-$C_{30}$) alkylthiocarbonylamino, ($C_1$-$C_{30}$) alkylaminocarbonylthio, ($C_2$-$C_{30}$)alkenyl, ($C_1$-$C_{30}$) thioalkyl, ($C_1$-$C_{30}$)alkylsulfonyl, ($C_1$-$C_{30}$)alkylsulfinyl, or ($C_1$-$C_{30}$)alkylsulfoyloxy wherein each substituent is independently chosen from ($C_1$-$C_{18}$)alkyl, ($C_1$-$C_{18}$) alkoxy, fluoro, chloro, bromo, cyano, ($C_1$-$C_{18}$)alkanoate ester, isocyanato, thioisocyanato, or phenyl;
e) the group R is selected from hydrogen, $C_1$-$C_{18}$ alkyl, $C_1$-$C_{18}$ alkoxy, $C_1$-$C_{18}$ alkoxycarbonyl, $C_3$-$C_{10}$cycloalkyl, $C_3$-$C_{10}$ cycloalkoxy, poly($C_1$-$C_{18}$ alkoxy), or a straight-chain or branched $C_1$-$C_{18}$ alkyl group that is unsubstituted or substituted with cyano, fluoro, chloro, bromo, or $C_1$-$C_{18}$ alkoxy, or poly-substituted with fluoro, chloro, or bromo; and
f) the groups Mesogen-1 and Mesogen-2 are each independently a rigid straight rod-like liquid crystal group, a rigid bent rod-like liquid crystal group, or a rigid disc-like liquid crystal group; and
where w is an integer from 1 to 26, y is an integer from 2 to 25, z is 1 or 2, provided that when:
the group X is represented by R, then w is an integer from 1 to 25, and z is 1;
the group X is represented by -(L)$_y$-R, then w is 1, y is an integer from 2 to 25, and z is 1;
the group X is represented by -(L)-R, then w is an integer from 3 to 26, and z is 2;
the group X is represented by -(L)$_w$-Q; then if P is represented by the group Q, then w is 1, and z is 1; and if P is other than the group Q, then each w is independently an integer from 1 to 26 and z is 1;
the group X is represented by

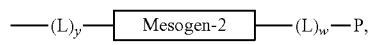

then w is 1, y is an integer from 2 to 25, and z is 1;
the group X is represented by -(L)$_y$-P, then w is 1, y is an integer from 2 to 25, and z is 1 and -(L)$_y$- comprises a linear sequence of at least 25 bonds between the mesogen and P; and the group X is represented by -(L)$_w$-[(L)$_w$-P]$_y$, then each w is independently an integer from 1 to 25, y is an integer from 2 to 6, and z is 1, and
wherein at least a portion of the guest phase separates from at least a portion of the matrix phase during the at least partial curing of the polymeric residue of the at least the first liquid crystal monomer.
6. The optical element of claim 5, wherein at least a portion of the at least first liquid crystal monomer of the at least partially cured matrix phase and at least a portion of the at least one liquid crystal material of the guest phase are at least partially ordered such that the at least partially ordered portion of the at least first liquid crystal monomer of the at least partially cured matrix phase has a first general direction and the at least partially ordered portion of the at least one liquid crystal material of the guest phase has a second general direction that is generally parallel to the first general direction.
7. The optical element of claim 5, wherein the at least one liquid crystal material of the guest phase comprises a residue of at least one second liquid crystal monomer, such that the guest phase is an at least partially cured guest phase.
8. The optical element of claim 5, wherein the optical element is chosen from an ophthalmic element, a display element, a window, a mirror, and an active and a passive liquid crystal cell element.
9. The optical element of claim 5, wherein the at least partial layer is adapted to linearly polarize at least transmitted radiation in at least one of the first state and the second state.
10. The optical element of claim 5, further comprising one or more additional at least partial layers on at least a portion of a surface of the substrate, the one or more additional layers selected from a tie layer, a primer layer, an abrasion resistant coating, a hard coating, a protective coating, a reflective coating, a conventional photochromic coating, an anti-reflective coating, a linearly polarizing coating, a circularly polarizing coating, an elliptically polarizing coating, a transitional coating, or combinations thereof.
11. An article of manufacture comprising:
an at least partially cured matrix phase comprising:
a polymeric residue of at least a first liquid crystal monomer; and
a guest phase comprising:
at least one photoactive material selected from the group consisting of photochromic compounds photochromic-dichroic compounds; and mixtures thereof, wherein the photoactive material is adapted to switch from a first state to a second state in response to at least actinic radiation, and to revert back to the first state in response to thermal energy; and
at least one second liquid crystal monomer or residue thereof,
wherein at least one of the first liquid crystal monomer of the matrix phase and the at least one second liquid crystal monomer of the guest phase comprises at least one mesogen containing compound having a structure represented by Formula I:

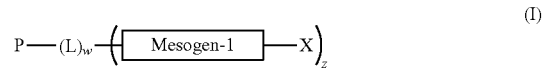

where,
a) each X is independently:
i) a group R,
ii) a group represented by -(L)$_y$-R, iii) a group represented by -(L)-R,
iv) a group represented by -(L)$_w$-Q;
v) a group represented by

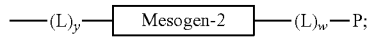

vi) a group represented by -(L)$_y$-P; or
vii) a group represented by -(L)$_w$-[(L)$_w$-P]$_y$;
b) each P is a reactive group independently selected from a group Q, hydrogen, aryl, hydroxy(C$_1$-C$_{18}$)alkyl, C$_1$-C$_{18}$ alkyl, C$_1$-C$_{18}$ alkoxy, amino(C$_1$-C$_{18}$)alkylene, C$_1$-C$_{18}$ alkylamino, di-(C$_1$-C$_{18}$)alkylamino, C$_1$-C$_{18}$ alkyl(C$_1$-C$_{18}$)alkoxy, C$_1$-C$_{18}$ alkoxy(C$_1$-C$_{18}$)alkoxy, nitro, poly(C$_1$-C$_{18}$)alkyl ether, (C$_1$-C$_{18}$)alkyl(C$_1$-C$_{18}$)alkoxy(C$_1$-C$_{18}$)alkylene, polyethyleneoxy, polypropyleneoxy, ethylene, acryloyl, acryloyloxy(C$_1$-C$_{18}$)alkylene, methacryloyl, methacryloyloxy(C$_1$-C$_{18}$)alkylene, 2-chloroacryloyl, 2-phenylacryloyl, acryloylphenylene, 2-chloroacryloylamino, 2-phenylacryloylaminocarbonyl, oxetanyl, glycidyl, cyano, isocyanato(C$_1$-C$_{18}$)alkyl, itaconic acid ester, vinyl ether, vinyl ester, a styrene derivative, main-chain and side-chain liquid crystal polymers, siloxane derivatives, ethyleneimine derivatives, maleic acid derivatives, fumaric acid derivatives, unsubstituted cinnamic acid derivatives, cinnamic acid derivatives that are substituted with at least one of methyl, methoxy, cyano and halogen, or substituted or unsubstituted chiral or non-chiral monovalent or divalent groups chosen from steroid radicals, terpenoid radicals, alkaloid radicals and mixtures thereof, wherein the substituents are independently chosen from C$_1$-C$_{18}$ alkyl, C$_1$-C$_{18}$ alkoxy, amino, C$_3$-C$_{10}$ cycloalkyl, C$_1$-C$_{18}$ alkyl(C$_1$-C$_{18}$) alkoxy, fluoro(C$_1$-C$_{18}$)alkyl, cyano, cyano(C$_1$-C$_{18}$) alkyl, cyano(C$_1$-C$_{18}$)alkoxy or mixtures thereof, or P is a structure having from 2 to 4 reactive groups or P is an unsubstituted or substituted ring opening metathesis polymerization precursor;
c) the group Q is hydroxy, amino, C$_2$-C$_{18}$ alkenyl, C$_2$-C$_{18}$ alkynyl, azido, silyl, siloxy, silylhydride, (tetrahydro-2H-pyran-2-yl)oxy, thio, isocyanato, thioisocyanato, acryloyloxy, methacryloyloxy, 2-(acryloyloxy)ethylcarbamyl, 2-(methacryloyloxy)ethylcarbamyl, aziridinyl, allyloxycarbonyloxy, epoxy, carboxylic acid, carboxylic ester, acryloylamino, methacryloylamino, aminocarbonyl, C$_1$-C$_{18}$ alkyl aminocarbonyl, aminocarbonyl(C$_1$-C$_{18}$)alkylene, C$_1$-C$_{18}$ alkyloxycarbonyloxy, or halocarbonyl;
d) each L is independently chosen for each occurrence, the same or different, from a single bond, a polysubstituted, monosubstituted, unsubstituted or branched spacer independently chosen from aryl, (C$_1$-C$_{30}$)alkyl, (C$_1$-C$_{30}$)alkylcarbonyloxy, (C$_1$-C$_{30}$)alkylamino, (C$_1$-C$_{30}$) alkoxy, (C$_1$-C$_{30}$)perfluoroalkyl, (C$_1$-C$_{30}$)perfluoroalkoxy, (C$_1$-C$_{30}$)alkylsilyl, (C$_1$-C$_{30}$)dialkylsiloxyl, (C$_1$-C$_{30}$)alkylcarbonyl, (C$_1$-C$_{30}$)alkoxycarbonyl, (C$_1$-C$_{30}$)alkylcarbonylamino, (C$_1$-C$_{30}$)alkylaminocarbonyl, (C$_1$-C$_{30}$)alkyloxycarbonyloxy, (C$_1$-C$_{30}$) alkylaminocarbonyloxy, (C$_1$-C$_{30}$) alkylaminocarbonylamino, (C$_1$-C$_{30}$)alkylurea, (C$_1$-C$_{30}$) alkylthiocarbonylamino, (C$_1$-C$_{30}$) alkylaminocarbonylthio, (C$_2$-C$_{30}$)alkenyl, (C$_1$-C$_{30}$) thioalkyl, (C$_1$-C$_{30}$)alkylsulfonyl, (C$_1$-C$_{30}$)alkylsulfinyl, or (C$_1$-C$_{30}$)alkylsulfoyloxy wherein each substituent is independently chosen from (C$_1$-C$_{18}$)alkyl, (C$_1$-C$_{18}$) alkoxy, fluoro, chloro, bromo, cyano, (C$_1$-C$_{18}$)alkanoate ester, isocyanato, thioisocyanato, or phenyl;
e) the group R is selected from hydrogen, C$_1$-C$_{18}$ alkyl, C$_1$-C$_{18}$ alkoxy, C$_1$-C$_{18}$ alkoxycarbonyl, C$_3$-C$_{10}$ cycloalkyl, C$_3$-C$_{10}$ cycloalkoxy, poly(C$_1$-C$_{18}$ alkoxy), or a straight-chain or branched C$_1$-C$_{18}$ alkyl group that is unsubstituted or substituted with cyano, fluoro, chloro, bromo, or C$_1$-C$_{18}$ alkoxy, or poly-substituted with fluoro, chloro, or bromo; and
f) the groups Mesogen-1 and Mesogen-2 are each independently a rigid straight rod-like liquid crystal group, a rigid bent rod-like liquid crystal group, or a rigid disc-like liquid crystal group; and
where w is an integer from 1 to 26, y is an integer from 2 to 25, z is 1 or 2, provided that when:
the group X is represented by R, then w is an integer from 1 to 25, and z is 1;
the group X is represented by -(L)$_y$-R, then w is 1, y is an integer from 2 to 25, and z is 1;
the group X is represented by -(L)-R, then w is an integer from 3 to 26, and z is 2;
the group X is represented by -(L)$_w$-Q; then if P is represented by the group Q, then w is 1, and z is 1; and if P is other than the group Q, then each w is independently an integer from 1 to 26 and z is 1;
the group X is represented by

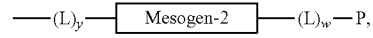

then w is 1, y is an integer from 2 to 25, and z is 1;
the group X is represented by -(L)$_y$-P, then w is 1, y is an integer from 2 to 25, and z is 1 and -(L)$_y$- comprises a linear sequence of at least 25 bonds between the mesogen and P; and
the group X is represented by -(L)$_w$-[(L)$_w$-P]$_y$, then each w is independently an integer from 1 to 25, y is an integer from 2 to 6, and z is 1, and
wherein at least a portion of the guest phase separates from at least a portion of the matrix phase during the at least partial curing of the polymeric residue of at least the first liquid crystal monomer.
12. A phase-separating polymer system comprising:
an at least partially cured matrix phase comprising:
a polymeric residue of at least a first liquid crystal monomer; and
a guest phase comprising:
at least one photoactive material comprising at least one photochromic-dichroic compound, and optionally at least one photochromic compound, wherein the photoactive material is adapted to switch from a first state to a second state in response to at least actinic radiation, and to revert back to the first state in response to thermal energy; and
at least one liquid crystal material,
wherein at least a portion of the guest phase separates from at least a portion of the matrix phase during at least partial curing of the polymeric residue of the at least first liquid crystal monomer.
13. The phase-separating polymer system of claim 12, wherein the at least one liquid crystal material of the guest phase comprises a residue of at least one second liquid crystal monomer, such that the guest phase is an at least partially cured guest phase.

14. The phase-separating polymer system of claim 13, wherein the guest phase at least partially cures at a slower rate than the matrix phase.

15. The phase-separating polymer system of claim 13, wherein the guest phase at least partially cures by a different polymerization initiation method or a different polymerization mechanism than the matrix phase.

16. The phase-separating polymer system of claim 13, wherein the at least partially cured guest phase has a lower Fischer microhardness compared to the at least partially cured matrix phase.

17. The phase-separating polymer system of claim 13, wherein the at least partially cured guest phase has a higher Fischer microhardness compared to the at least partially cured matrix phase.

18. The phase-separating polymer system of claim 12, wherein the at least one photoactive material has faster kinetics in the guest phase than a photoactive material in the at least partially cured matrix phase.

19. The phase-separating polymer system of claim 12, wherein at least a portion of at least one of the at least first liquid crystal monomer of the at least partially cured matrix phase and the at least one liquid crystal material of the guest phase is at least partially ordered.

20. The phase-separating polymer system of claim 19, wherein at least a portion of the at least first liquid crystal monomer of the at least partially cured matrix phase and at least a portion of the at least one liquid crystal material of the guest phase are at least partially ordered such that the at least partially ordered portion of the at least first liquid crystal monomer of the at least partially cured matrix phase has a first general direction and the at least partially ordered portion of the at least one liquid crystal material of the guest phase has a second general direction that is generally parallel to the first general direction.

21. An article of manufacture comprising:
an at least partially cured matrix phase comprising:
a polymeric residue of at least a first liquid crystal monomer; and
a guest phase comprising:
at least one photoactive material comprising at least one photochromic-dichroic compound, and optionally at least one photochromic compound, wherein the photoactive material is adapted to switch from a first state to a second state in response to at least actinic radiation, and to revert back to the first state in response to thermal energy; and
at least one second liquid crystal monomer or residue thereof,
wherein at least one of the first liquid crystal monomer of the matrix phase and the at least one second liquid crystal monomer of the guest phase comprises at least one mesogen containing compound having a structure represented by Formula I:

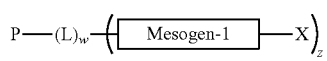

(I)

where,
a) each X is independently:
i) a group R,
ii) a group represented by -(L)$_y$-R,
iii) a group represented by -(L)-R,
iv) a group represented by -(L)$_w$-Q;
v) a group represented by

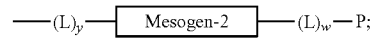

vi) a group represented by -(L)$_y$-P; or
vii) a group represented by -(L)$_w$-[(L)$_w$-P]$_y$;
b) each P is a reactive group independently selected from a group Q, hydrogen, aryl, hydroxy(C$_1$-C$_{18}$)alkyl, C$_1$-C$_{18}$ alkyl, C$_1$-C$_{18}$ alkoxy, amino(C$_1$-C$_{18}$)alkylene, C$_1$-C$_{18}$ alkylamino, di-(C$_1$-C$_{18}$)alkylamino, C$_1$-C$_{18}$ alkyl(C$_1$-C$_{18}$)alkoxy, C$_1$-C$_{18}$ alkoxy(C$_1$-C$_{18}$)alkoxy, nitro, poly(C$_1$-C$_{18}$)alkyl ether, (C$_1$-C$_{18}$)alkyl(C$_1$-C$_{18}$)alkoxy(C$_1$-C$_{18}$)alkylene, polyethyleneoxy, polypropyleneoxy, ethylene, acryloyl, acryloyloxy(C$_1$-C$_{18}$)alkylene, methacryloyl, methacryloyloxy(C$_1$-C$_{18}$)alkylene, 2-chloroacryloyl, 2-phenylacryloyl, acryloylphenylene, 2-chloroacryloylamino, 2-phenylacryloylaminocarbonyl, oxetanyl, glycidyl, cyano, isocyanato(C$_1$-C$_{18}$)alkyl, itaconic acid ester, vinyl ether, vinyl ester, a styrene derivative, main-chain and side-chain liquid crystal polymers, siloxane derivatives, ethyleneimine derivatives, maleic acid derivatives, fumaric acid derivatives, unsubstituted cinnamic acid derivatives, cinnamic acid derivatives that are substituted with at least one of methyl, methoxy, cyano and halogen, or substituted or unsubstituted chiral or non-chiral monovalent or divalent groups chosen from steroid radicals, terpenoid radicals, alkaloid radicals and mixtures thereof, wherein the substituents are independently chosen from C$_1$-C$_{18}$ alkyl, C$_1$-C$_{18}$ alkoxy, amino, C$_3$-C$_{10}$ cycloalkyl, C$_1$-C$_{18}$ alkyl(C$_1$-C$_{18}$)alkoxy, fluoro(C$_1$-C$_{18}$)alkyl, cyano, cyano(C$_1$-C$_{18}$)alkyl, cyano(C$_1$-C$_{18}$)alkoxy or mixtures thereof, or P is a structure having from 2 to 4 reactive groups or P is an unsubstituted or substituted ring opening metathesis polymerization precursor;
c) the group Q is hydroxy, amino, C$_2$-C$_{18}$ alkenyl, C$_2$-C$_{18}$ alkynyl, azido, silyl, siloxy, silylhydride, (tetrahydro-2H-pyran-2-yl)oxy, thio, isocyanato, thioisocyanato, acryloyloxy, methacryloyloxy, 2-(acryloyloxy)ethylcarbamyl, 2-(methacryloyloxy)ethylcarbamyl, aziridinyl, allyloxycarbonyloxy, epoxy, carboxylic acid, carboxylic ester, acryloylamino, methacryloylamino, aminocarbonyl, C$_1$-C$_{18}$ alkyl aminocarbonyl, aminocarbonyl(C$_1$-C$_{18}$)alkylene, C$_1$-C$_{18}$ alkyloxycarbonyloxy, or halocarbonyl;
d) each L is independently chosen for each occurrence, the same or different, from a single bond, a polysubstituted, monosubstituted, unsubstituted or branched spacer independently chosen from aryl, (C$_1$-C$_{30}$)alkyl, (C$_1$-C$_{30}$)alkylcarbonyloxy, (C$_1$-C$_{30}$)alkylamino,(C$_1$-C$_{30}$)alkoxy, (C$_1$-C$_{30}$)perfluoroalkyl, (C$_1$-C$_{30}$)perfluoroalkoxy, (C$_1$-C$_{30}$)alkylsilyl, (C$_1$-C$_{30}$)dialkylsiloxyl, (C$_1$-C$_{30}$)alkylcarbonyl, (C$_1$-C$_{30}$)alkoxycarbonyl, (C$_1$-C$_{30}$)alkylcarbonylamino, (C$_1$-C$_{30}$)alkylaminocarbonyl, (C$_1$-C$_{30}$)alkyloxycarbonyloxy, (C$_1$-C$_{30}$)alkylaminocarbonyloxy, (C$_1$-C$_{30}$)alkylaminocarbonylamino, (C$_1$-C$_{30}$)alkylurea, (C$_1$-C$_{30}$)alkylthiocarbonylamino, (C$_1$-C$_{30}$)alkylaminocarbonylthio, (C$_2$-C$_{30}$)alkenyl, (C$_1$-C$_{30}$)thioalkyl, (C$_1$-C$_{30}$)alkylsulfonyl, (C$_1$-C$_{30}$)alkylsulfinyl, or (C$_1$-C$_{30}$)alkylsulfoyloxy wherein each substituent is independently chosen from (C$_1$-C$_{18}$)alkyl, (C$_1$-C$_{18}$)alkoxy, fluoro, chloro, bromo, cyano, (C$_1$-C$_{18}$)alkanoate ester, isocyanato, thioisocyanato, or phenyl;

e) the group R is selected from hydrogen, $C_1$-$C_{18}$ alkyl, $C_1$-$C_{18}$ alkoxy, $C_1$-$C_{18}$ alkoxycarbonyl, $C_3$-$C_{10}$ cycloalkyl, $C_3$-$C_{10}$ cycloalkoxy, poly($C_1$-$C_{18}$ alkoxy), or a straight-chain or branched $C_1$-$C_{18}$ alkyl group that is unsubstituted or substituted with cyano, fluoro, chloro, bromo, or $C_1$-$C_{18}$ alkoxy, or poly-substituted with fluoro, chloro, or bromo; and f) the groups Mesogen-1 and Mesogen-2 are each independently a rigid straight rod-like liquid crystal group, a rigid bent rod-like liquid crystal group, or a rigid disc-like liquid crystal group; and where w is an integer from 1 to 26, y is an integer from 2 to 25, z is 1 or 2, provided that when:

the group X is represented by R, then w is an integer from 1 to 25, and z is 1;

the group X is represented by $-(L)_y$-R, then w is 1, y is an integer from 2 to 25, and z is 1;

the group X is represented by -(L)-R, then w is an integer from 3 to 26, and z is 2;

the group X is represented by $-(L)_w$-Q; then if P is represented by the group Q, then w is 1, and z is 1; and if P is other than the group Q, then each w is independently an integer from 1 to 26 and z is 1;

the group X is represented by

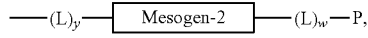

then w is 1, y is an integer from 2 to 25, and z is 1;

the group X is represented by $-(L)_y$-P, then w is 1, y is an integer from 2 to 25, and z is 1 and $-(L)_y$- comprises a linear sequence of at least 25 bonds between the mesogen and P; and the group X is represented by $-(L)_w$-$[(L)_w$-P$]_y$, then each w is independently an integer from 1 to 25, y is an integer from 2 to 6, and z is 1, and wherein at least a portion of the guest phase separates from at least a portion of the matrix phase during the at least partial curing of the polymeric residue of at least the first liquid crystal monomer.

22. The phase-separating polymer system of claim 1, wherein the at least one photoactive material is selected from the group consisting of:
(i) photochromic compounds adapted to switch from a first clear state to a second colored state in response to at least actinic radiation, and revert back to the first clear state in response to thermal energy;
(ii) photochromic-dichroic compound adapted to switch from a first clear state to a second color and linearly polarizing state in response to at least actinic radiation, and revert back to the first clear state in response to thermal energy; and
(iii) mixtures thereof.

23. The optical element of claim 5, wherein the at least one photoactive material is selected from the group consisting of:
(i) photochromic compounds adapted to switch from a first clear state to a second color state in response to at least actinic radiation, and revert back to the first clear state in response to thermal energy;
(ii) photochromic-dichroic compounds adapted to switch from a clear state to a second colored and lineary polarizing state in response to at least actinic radiation, and revert back to the first clear state in response to thermal energy; and
(iii) mixtures thereof.

* * * * *